(12) United States Patent
Suzuki et al.

(10) Patent No.: US 10,558,292 B2
(45) Date of Patent: Feb. 11, 2020

(54) DISPLAY DEVICE

(71) Applicant: Japan Display Inc., Tokyo (JP)

(72) Inventors: Takafumi Suzuki, Tokyo (JP);
Yasuyuki Teranishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 52 days.

(21) Appl. No.: 15/913,235

(22) Filed: Mar. 6, 2018

(65) Prior Publication Data
US 2018/0260069 A1 Sep. 13, 2018

(30) Foreign Application Priority Data

Mar. 8, 2017 (JP) .................. 2017-044229

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 3/0412* (2013.01)

(58) Field of Classification Search
CPC combination set(s) only.
See application file for complete search history.

(56) References Cited

U.S. PATENT DOCUMENTS

| | | | |
|---|---|---|---|
| 7,183,152 B1* | 2/2007 | Dakshina-Murthy | ........................ H01L 21/84 257/E21.703 |
| 8,062,963 B1* | 11/2011 | van Dal | ............ H01L 21/02381 257/E21.103 |
| 8,173,551 B2* | 5/2012 | Bai | ........................ C30B 25/183 438/758 |
| 8,557,646 B2* | 10/2013 | Chen | ................. H01L 29/66666 438/192 |
| 8,673,723 B1* | 3/2014 | Na | .................... H01L 29/66795 438/296 |
| 8,743,330 B2* | 6/2014 | Maede | .............. G02F 1/134363 349/110 |
| 8,753,942 B2* | 6/2014 | Kuhn | ..................... B82Y 10/00 438/285 |
| 9,012,284 B2* | 4/2015 | Glass | ................ H01L 29/66545 438/275 |
| 9,099,388 B2* | 8/2015 | Lin | ........................ H01L 29/267 |
| 9,569,035 B1* | 2/2017 | Lee | ........................ G06F 3/0416 |

(Continued)

FOREIGN PATENT DOCUMENTS

| | | |
|---|---|---|
| JP | 2017-162174 A | 12/2003 |
| JP | 2009-244958 A | 11/2014 |

*Primary Examiner* — Jose R Soto Lopez
(74) *Attorney, Agent, or Firm* — K&L Gates LLP

(57) ABSTRACT

A display device includes a substrate, pixel electrodes, first electrodes, gate lines, signal lines, switching elements, a conductor, and a driver. The pixel electrodes are arrayed in a display region of the substrate. The first electrodes are separated from the pixel electrodes in a direction perpendicular to the substrate. The gate lines are disposed between the substrate and the first electrodes in the direction perpendicular to the substrate and extend in a plane parallel to the surface of the substrate. The signal lines intersect the gate lines in planar view. The switching elements are provided at the intersections of the gate lines and the signal lines. The conductor is provided opposite to the gate lines and the signal lines across the substrate in the direction perpendicular to the substrate.

15 Claims, 31 Drawing Sheets

(56) References Cited

U.S. PATENT DOCUMENTS

| | | | |
|---|---|---|---|
| 9,619,083 B1* | 4/2017 | Kang | G06F 3/0412 |
| 9,658,722 B2* | 5/2017 | Schwartz | G06F 3/0418 |
| 2002/0093609 A1* | 7/2002 | Baek | G02F 1/133555 |
| | | | 349/113 |
| 2004/0150629 A1* | 8/2004 | Lee | G06F 3/041 |
| | | | 345/173 |
| 2004/0227743 A1* | 11/2004 | Brown | G02F 1/13338 |
| | | | 345/204 |
| 2008/0007539 A1* | 1/2008 | Hotelling | G06F 3/044 |
| | | | 345/173 |
| 2010/0182273 A1 | 7/2010 | Noguchi et al. | |
| 2011/0025635 A1* | 2/2011 | Lee | G06F 1/3203 |
| | | | 345/173 |
| 2011/0157504 A1* | 6/2011 | Kimura | G02F 1/133707 |
| | | | 349/38 |
| 2011/0267295 A1* | 11/2011 | Noguchi | G06F 3/0416 |
| | | | 345/173 |
| 2011/0267296 A1* | 11/2011 | Noguchi | G06F 3/0412 |
| | | | 345/173 |
| 2012/0044203 A1* | 2/2012 | Ishizaki | G06F 3/0412 |
| | | | 345/174 |
| 2012/0062508 A1* | 3/2012 | Liu | G06F 3/044 |
| | | | 345/174 |
| 2012/0069257 A1* | 3/2012 | Oh | G02F 1/13338 |
| | | | 349/42 |
| 2012/0075237 A1* | 3/2012 | Ikeda | G06F 3/044 |
| | | | 345/174 |
| 2012/0229420 A1* | 9/2012 | Liu | G06F 3/041 |
| | | | 345/174 |
| 2012/0262389 A1* | 10/2012 | Kida | G06F 3/0412 |
| | | | 345/173 |
| 2013/0088448 A1* | 4/2013 | Seo | G06F 3/0488 |
| | | | 345/173 |
| 2013/0234954 A1* | 9/2013 | Koide | G06F 3/0488 |
| | | | 345/173 |
| 2013/0234985 A1* | 9/2013 | Huang | G06F 3/044 |
| | | | 345/174 |
| 2013/0265244 A1* | 10/2013 | Kim | G06F 3/044 |
| | | | 345/173 |
| 2013/0270607 A1* | 10/2013 | Doornbos | H01L 29/205 |
| | | | 257/192 |
| 2013/0314369 A1* | 11/2013 | Liu | G06F 3/0412 |
| | | | 345/174 |
| 2013/0335376 A1* | 12/2013 | Lee | G06F 3/0416 |
| | | | 345/174 |
| 2014/0043288 A1* | 2/2014 | Kurasawa | G06F 3/0412 |
| | | | 345/174 |
| 2014/0118639 A1* | 5/2014 | Matsushima | G02F 1/13338 |
| | | | 349/12 |
| 2014/0146094 A1* | 5/2014 | Koide | G09G 3/3648 |
| | | | 345/690 |
| 2014/0152613 A1* | 6/2014 | Ishizaki | G06F 3/0412 |
| | | | 345/174 |
| 2014/0152616 A1* | 6/2014 | Kida | G06F 3/0418 |
| | | | 345/174 |
| 2014/0152617 A1* | 6/2014 | Kida | G06F 3/044 |
| | | | 345/174 |
| 2014/0152621 A1* | 6/2014 | Okayama | G06F 3/0416 |
| | | | 345/174 |
| 2014/0168151 A1* | 6/2014 | Noguchi | G06F 3/0412 |
| | | | 345/174 |
| 2014/0184944 A1* | 7/2014 | Ma | G02F 1/134363 |
| | | | 349/12 |
| 2014/0198268 A1* | 7/2014 | Sugita | G06F 3/044 |
| | | | 349/12 |
| 2014/0210779 A1* | 7/2014 | Katsuta | G06F 3/044 |
| | | | 345/174 |
| 2014/0252475 A1* | 9/2014 | Xu | H01L 29/785 |
| | | | 257/347 |
| 2014/0292713 A1* | 10/2014 | Koito | G06F 3/0412 |
| | | | 345/174 |
| 2015/0076450 A1* | 3/2015 | Weman | B82Y 10/00 |
| | | | 257/29 |
| 2015/0144998 A1* | 5/2015 | Ching | H01L 29/785 |
| | | | 257/190 |
| 2015/0160761 A1* | 6/2015 | Lee | G06F 3/041 |
| | | | 345/174 |
| 2015/0170610 A1* | 6/2015 | Kurasawa | G09G 5/18 |
| | | | 345/174 |
| 2015/0193082 A1* | 7/2015 | Ludden | G06F 3/044 |
| | | | 345/174 |
| 2015/0205433 A1* | 7/2015 | Mizuhashi | G06F 3/0416 |
| | | | 345/174 |
| 2015/0254491 A1* | 9/2015 | Mo | G06F 3/0416 |
| | | | 345/174 |
| 2015/0293630 A1* | 10/2015 | Ishizaki | G06F 3/044 |
| | | | 345/174 |
| 2015/0355763 A1* | 12/2015 | Miyake | G06F 3/0412 |
| | | | 345/174 |
| 2016/0187694 A1* | 6/2016 | Kim | G06F 3/0412 |
| | | | 349/12 |
| 2016/0282995 A1* | 9/2016 | Lee | G06F 3/044 |
| 2016/0328061 A1* | 11/2016 | Chiang | G06F 3/0412 |
| 2016/0334660 A1* | 11/2016 | Lin | G02F 1/13338 |
| 2016/0334934 A1* | 11/2016 | Mo | G02F 1/13338 |
| 2017/0004798 A1* | 1/2017 | Park | G09G 3/3648 |
| 2017/0045964 A1* | 2/2017 | Huang | G06F 3/0412 |
| 2017/0045992 A1* | 2/2017 | Lee | G06F 3/0416 |
| 2017/0090624 A1* | 3/2017 | Kwon | G06F 3/0416 |
| 2017/0090637 A1* | 3/2017 | Yoon | H04M 1/0266 |
| 2017/0090643 A1* | 3/2017 | Kim | G06F 3/0412 |
| 2017/0090673 A1* | 3/2017 | Kim | G06F 3/0418 |
| 2017/0102825 A1* | 4/2017 | Kim | G06F 3/0418 |
| 2017/0115775 A1* | 4/2017 | Wu | G02F 1/13454 |
| 2017/0192573 A1* | 7/2017 | Kim | G09G 3/2092 |
| 2017/0205953 A1* | 7/2017 | Sun | G09G 3/3648 |
| 2017/0220182 A1* | 8/2017 | Schwartz | G06F 3/0416 |
| 2017/0262093 A1 | 9/2017 | Noguchi | |
| 2017/0285804 A1* | 10/2017 | Li | G06F 3/044 |
| 2017/0322657 A1* | 11/2017 | Wang | G06F 3/0414 |
| 2017/0371462 A1* | 12/2017 | Kim | G06F 3/0412 |
| 2018/0018052 A1* | 1/2018 | Yang | H01L 27/323 |
| 2018/0107300 A1* | 4/2018 | Lin | G02F 1/133514 |
| 2018/0143711 A1* | 5/2018 | Ono | G06F 3/044 |
| 2018/0188865 A1* | 7/2018 | Jang | H03F 3/45179 |
| 2018/0224959 A1* | 8/2018 | Yang | G06F 3/044 |

* cited by examiner

DISPLAY DEVICE

CROSS-REFERENCE TO RELATED APPLICATIONS

This application claims priority from Japanese Application No. 2017-044229, filed on Mar. 8, 2017, the contents of which are incorporated by reference herein in its entirety.

BACKGROUND

1. Technical Field

The present disclosure relates to a display device.

2. Description of the Related Art

Touch detection apparatuses, what are called touch panels, capable of detecting an external proximity object have recently been attracting attention. Touch panels are mounted on or integrated with a display device, such as a liquid crystal display device, and used as display devices with a touch detection function (e.g., Japanese Patent Application Laid-open Publication No. 2009-244958 (JP-A-2009-244958)). In the display device with a touch detection function described in JP-A-2009-244958, capacitance is generated between common electrodes and sensor detection electrodes. The display device with a touch detection function described in JP-A-2009-244958 detects a change in the capacitance caused by a detected object, such as a finger, in contact with or in proximity to a detection surface. Based on the capacitance change, the display device with a touch detection function performs touch detection.

When water adheres to the detection surface in such capacitance touch panels, a capacitance change occurs at the position where the water adheres. As a result, it may possibly be difficult to accurately detect the position of the detected object.

SUMMARY

A display device according to one embodiment includes a substrate, a plurality of pixel electrodes arrayed in a display region of the substrate, first electrodes separated from the pixel electrodes in a direction perpendicular to the substrate, gate lines disposed between the substrate and the first electrodes in the direction perpendicular to the substrate and extending in a plane parallel to a surface of the substrate, signal lines intersecting the gate lines in planar view, switching elements provided at intersections of the gate lines and the signal lines, a conductor provided opposite to the gate lines and the signal lines across the substrate in the direction perpendicular to the substrate, and a driver configured to supply a first drive signal to at least one of the gate lines and the signal lines and supply a guard signal synchronized with the first drive signal to the first electrodes.

A display device according to one embodiment includes a substrate, a plurality of pixel electrodes arrayed in a display region of the substrate, first electrodes separated from the pixel electrodes in a direction perpendicular to the substrate, gate lines disposed between the substrate and the first electrodes in the direction perpendicular to the substrate and extending in a plane parallel to a surface of the substrate, signal lines intersecting the gate lines in planar view, switching elements provided at intersections of the gate lines and the signal lines, second electrodes disposed opposite to the gate lines and the signal lines across the first electrodes in the direction perpendicular to the substrate, a conductor provided opposite to the gate lines and the signal lines across the substrate in the direction perpendicular to the substrate, a driver configured to supply a first drive signal to at least one of the gate lines and the signal lines and supply a guard signal synchronized with the first drive signal to the first electrodes, and a controller configured to control an operation of the first electrodes, the second electrodes, the gate lines, and the signal lines.

DETAILED DESCRIPTION

Figure 1:
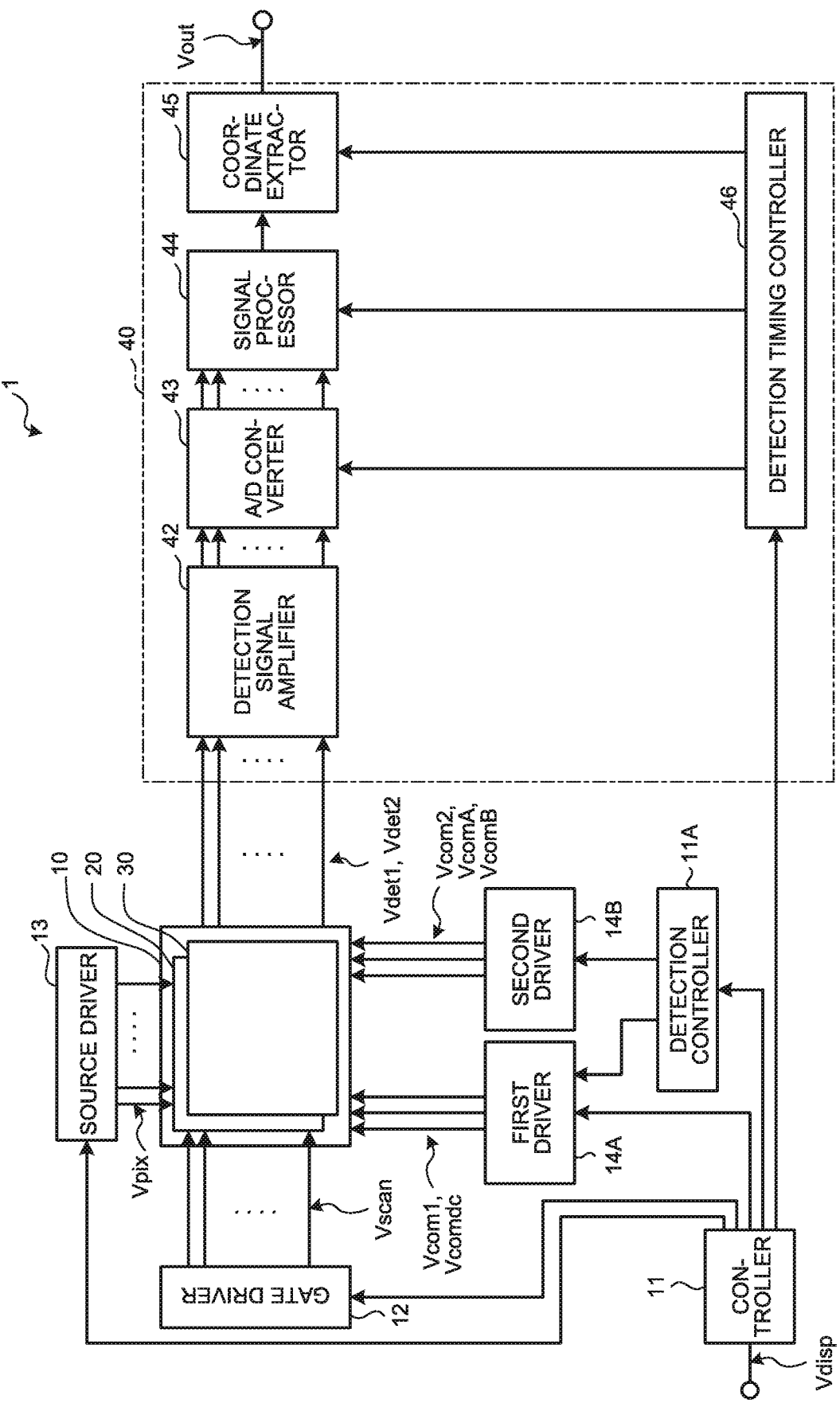
FIG. 1 is a block diagram of an exemplary configuration of a display device according to a first embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. The disclosure is given by way of example only, and appropriate modifications made without departing from the spirit of the disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the disclosure. In the present specification and the figures, components similar to those previously described with reference to previous figures are denoted by like reference numerals, and overlapping explanation thereof may be appropriately omitted.

First Embodiment

FIG. 1 is a block diagram of an exemplary configuration of a display device according to a first embodiment. As illustrated in FIG. 1, a display device 1 includes a display panel 10, a controller 11, a detection controller 11A, a gate driver 12, a source driver 13, a first driver 14A, a second driver 14B, and a detection device 40. The display panel 10 includes a display portion 20 and a touch sensor 30. The display portion 20 displays an image. The touch sensor 30 is a detection apparatus that detects touch input.

The display panel 10 is a display device in which the display portion 20 and the touch sensor 30 are integrated. Specifically, in the display panel 10, part of members, such as electrodes and substrates, of the display portion 20 are also used as electrodes and substrates of the touch sensor 30.

The display portion 20 includes liquid crystal display elements serving as display elements. The display portion 20 includes a plurality of pixels including the display elements and has a display surface facing the pixels. The display portion 20 receives video signals Vdisp to display an image composed of the pixels on the display surface. The display panel 10 may be an apparatus in which the touch sensor 30 is mounted on the display portion 20. The display portion 20 may be an organic electroluminescence (EL) display panel, for example. Alternatively, the display portion 20 may be an electrophoretic display panel including electrophoretic elements serving as display elements.

The controller 11 supplies control signals to the gate driver 12, the source driver 13, the first driver 14A, the detection controller 11A, and the detection device 40 based on the video signals Vdisp supplied from the outside. The controller 11 is a circuit that mainly controls a display operation performed by the display device 1. The detection controller 11A supplies control signals to the first driver 14A and the second driver 14B based on the control signals supplied from the controller 11. The detection controller 11A is a circuit that mainly controls a detection operation performed by the display device 1.

The gate driver 12 supplies scanning signals Vscan to one horizontal line to be a target of display drive in the display panel 10 based on the control signals supplied from the controller 11. As a result, one horizontal line to be a target of display drive is sequentially or simultaneously selected.

The source driver 13 is a circuit that supplies pixel signals Vpix to respective sub-pixels SPix (refer to FIG. 10) of the display portion 20. Part of the functions of the source driver 13 may be mounted on the display panel 10. In this case, the controller 11 may generate the pixel signals Vpix and supply them to the source driver 13.

The first driver 14A is a circuit that supplies display drive signals Vcomdc to first electrodes COML of the display panel 10. In mutual capacitance touch detection, the first driver 14A supplies detection drive signals Vcom1 to the first electrodes COML. In self-capacitance touch detection, the second driver 14B supplies drive signals Vcom2 to at least one of the first electrodes COML and second electrodes TDL. In self-capacitance touch detection, the second driver 14B also supplies drive signals VcomA to signal lines SGL (refer to FIG. 10) and supplies drive signals VcomB to gate lines GCL (refer to FIG. 10).

The controller 11 according to the present embodiment causes the display portion 20 to perform a display operation of performing display and causes the touch sensor 30 to perform a detection operation of detecting a detected object in a time-division manner. The touch sensor 30 performs touch detection based on the basic principle of touch detection by a mutual capacitance method (also referred to as a mutual method). When detecting a detected object in a contact state, the touch sensor 30 outputs detection signals Vdet1 to the detection device 40. The touch sensor 30 can also perform touch detection based on the basic principle of touch detection by a self-capacitance method (also referred to as a self-method). When detecting a detected object in a contact state by the self-capacitance method, the touch sensor 30 outputs detection signals Vdet2 to the detection device 40.

The display device 1 according to the present embodiment has three touch detection modes, that is, a first detection mode, a second detection mode, and a third detection mode. The touch detection modes are switched based on the control signals supplied from the controller 11. In the first detection mode, the display device 1 performs mutual capacitance touch detection. In the second detection mode, the display device 1 performs self-capacitance touch detection using the first electrodes COML and the second electrodes TDL. In the third detection mode, the display device 1 performs self-capacitance touch detection using the signal lines SGL and the gate lines GCL.

In the present specification, a "contact state" indicates a state where the detected object is in contact with the display surface or in proximity to the display surface to the extent that it is close enough to consider it in contact therewith. A "non-contact state" indicates a state where the detected object is neither in contact with the display surface nor in proximity to the display surface to the extent that it is close enough to consider it in contact therewith.

The detection device 40 is a circuit that determines whether a touch is made by the detected object on the display surface of the display panel 10 based on the control signals supplied from the controller 11 and on the detection signals Vdet1 output from the display panel 10 in mutual capacitance touch detection. The detection device 40 also determines whether a touch is made by the detected object on the display surface of the display panel 10 based on the control signals supplied from the controller 11 and on the detection signals Vdet2 output from the display panel 10 in self-capacitance touch detection. If a touch is detected, the detection device 40 calculates coordinates at which the touch input is performed, for example.

The detection device 40 includes a detection signal amplifier 42, an analog/digital (A/D) converter 43, a signal processor 44, a coordinate extractor 45, and a detection timing controller 46. The detection timing controller 46 performs control such that the A/D converter 43, the signal processor 44, and the coordinate extractor 45 operate synchronously with one another based on the control signals supplied from the controller 11.

In touch detection, the detection signal amplifier 42 amplifies the detection signals Vdet1 and Vdet2 supplied from the display panel 10. The A/D converter 43 samples analog signals output from the detection signal amplifier 42 at a timing synchronized with the drive signals Vcom1 and Vcom2, thereby converting the analog signals into digital signals.

The signal processor 44 is a logic circuit that determines whether a touch is made on the display panel 10 based on the output signals from the A/D convertor 43. The signal processor 44 performs processing of extracting a signal (absolute value $|\Delta V|$) of the difference between the detection signals caused by a finger. The signal processor 44 compares the absolute value $|\Delta V|$ with a predetermined threshold voltage. If the absolute value $|\Delta V|$ is lower than the threshold voltage, the signal processor 44 determines that the detected object is in the non-contact state. By contrast, if the absolute value $|\Delta V|$ is equal to or higher than the threshold voltage, the signal processor 44 determines that the detected object is in the contact state or a proximity state. The detection device 40 thus can perform touch detection.

The coordinate extractor 45 is a logic circuit that calculates, when the signal processor 44 detects a touch, the touch panel coordinates of the touch. The coordinate extractor 45 outputs the touch panel coordinates as output signals Vout. The coordinate extractor 45 may output the output signals Vout to the controller 11. The controller 11 can perform a predetermined display operation or a predetermined detection operation based on the output signals Vout.

The detection signal amplifier 42, the A/D converter 43, the signal processor 44, the coordinate extractor 45, and the detection timing controller 46 of the detection device 40 are mounted on the display device 1. The configuration is not limited thereto, and all or part of the functions of the detection device 40 may be mounted on an external control board, an external processor, or the like. The coordinate extractor 45, for example, may be mounted on an external processor provided independently of the display device 1. In this case, the detection device 40 may output the signals processed by the signal processor 44 as the output signals Vout. Alternatively, the signal processor 44 and the coordinate extractor 45 may be mounted on an external processor. In this case, the detection device 40 may output the digital signals processed by the A/D converter 43 as the output signals Vout.

Figure 2:
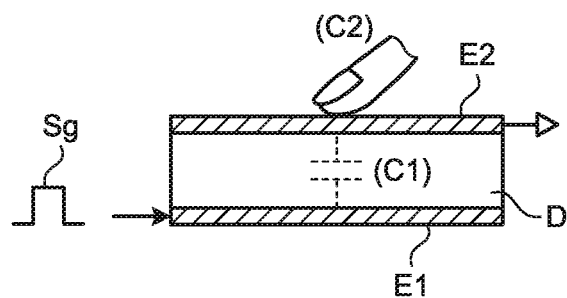
FIG. 2 is a diagram for explaining the basic principle of mutual capacitance touch detection.
Figure 3:
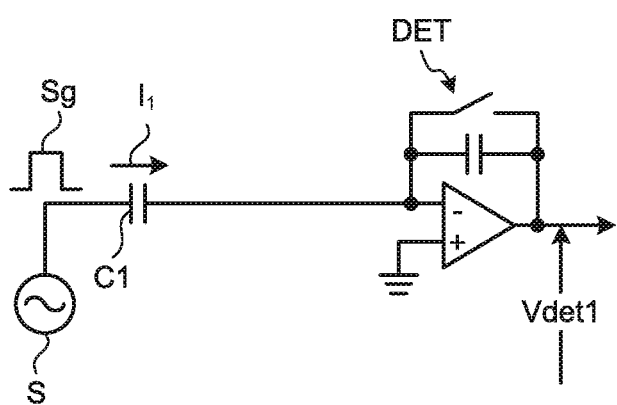
FIG. 3 is a diagram for explaining an example of an equivalent circuit in mutual capacitance touch detection.
Figure 4:
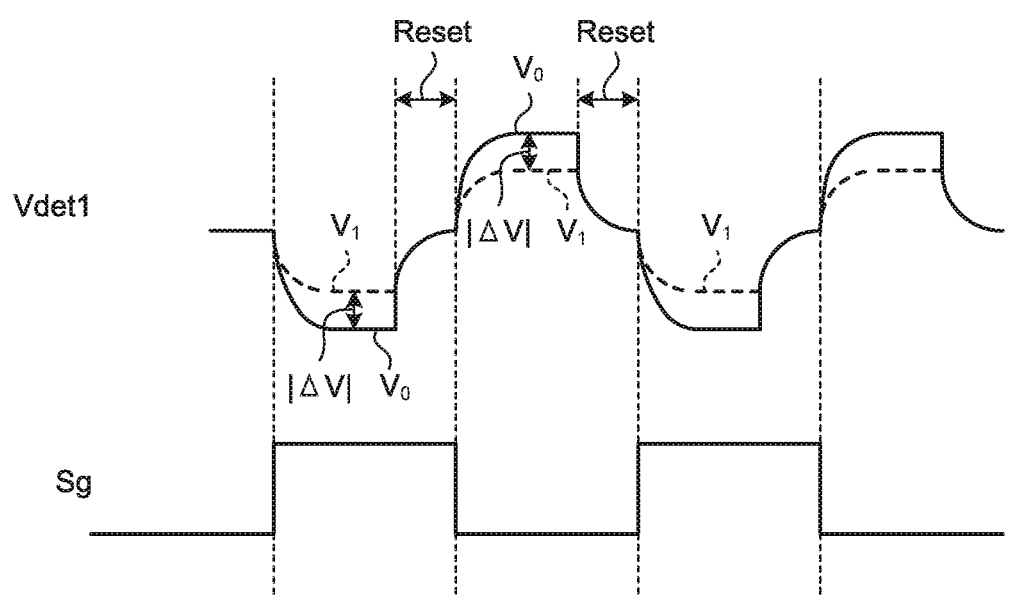
FIG. 4 is a diagram of an example of waveforms of a drive signal and a detection signal in mutual capacitance touch detection.

The following describes the basic principle of mutual capacitance touch detection performed by the display device 1 according to the present embodiment with reference to FIGS. 2 to 4. FIG. 2 is a diagram for explaining the basic principle of mutual capacitance touch detection. FIG. 3 is a diagram for explaining an example of an equivalent circuit in mutual capacitance touch detection. FIG. 4 is a diagram of an example of waveforms of a drive signal and a detection signal in mutual capacitance touch detection. While the following describes a case where a finger is in contact with or in proximity to a detection electrode, the detected object is not limited to a finger and may be a stylus, for example.

As illustrated in FIG. 2, a capacitance element C1 includes a pair of electrodes, that is, a drive electrode E1 and a detection electrode E2 facing each other with a dielectric D interposed therebetween. The capacitance element C1 generates fringe lines of electric force extending from ends of the drive electrode E1 to the upper surface of the detection electrode E2 besides lines of electric force (not illustrated) generated between the facing surfaces of the drive electrode E1 and the detection electrode E2. As illustrated in FIG. 3, a first end of the capacitance element C1 is coupled to an alternating-current (AC) signal source (drive signal source) S, and a second end thereof is coupled to a voltage detector DET. The voltage detector DET is an integration circuit included in the detection signal amplifier 42 illustrated in FIG. 1, for example.

When the AC signal source S applies an AC rectangular wave Sg at a predetermined frequency (e.g., approximately several kilohertz to several hundred kilohertz) to the drive electrode E1 (first end of the capacitance element C1), an output waveform (detection signal Vdet1) illustrated in FIG. 4 is generated via the voltage detector DET.

In the non-contact state, an electric current depending on the capacitance value of the capacitance element C1 flows. The voltage detector DET illustrated in FIG. 3 converts fluctuations in the electric current depending on the AC rectangular wave Sg into fluctuations in the voltage (waveform $V_0$ indicated by the solid line (refer to FIG. 4)).

In the contact state, as illustrated in FIGS. 2 and 3, capacitance C2 generated by the finger is in contact with the detection electrode E2 or in proximity to the detection electrode E2 to the extent that it is close enough to consider it in contact therewith. The fringe lines of electric force between the drive electrode E1 and the detection electrode E2 are blocked by a conductor (finger). As a result, the capacitance element C1 acts as a capacitance element having a capacitance value smaller than that in the non-contact state. The voltage detector DET converts fluctuations in an electric current $I_1$ depending on the AC rectangular wave Sg into fluctuations in the voltage (waveform $V_1$ indicated by the dotted line (refer to FIG. 4)).

In this case, the waveform $V_1$ has amplitude smaller than that of the waveform $V_0$. Consequently, the absolute value $|\Delta V|$ of the voltage difference between the waveform $V_0$ and the waveform $V_1$ varies depending on an effect of an external object, such as a finger, in contact with or in proximity to the detection electrode from the outside. The voltage detector DET resets charge and discharge of a capacitor based on the frequency of the AC rectangular wave Sg by switching in the circuit. With the period Reset, the voltage detector DET can accurately detect the absolute value $|\Delta V|$ of the voltage difference.

As described above, the detection device 40 compares the absolute value $|\Delta V|$ with the predetermined threshold voltage, thereby determining whether the external proximity object is in the non-contact state or in the contact or proximity state. The detection device 40 thus can perform touch detection based on the basic principle of mutual capacitance touch detection.

Figure 5:
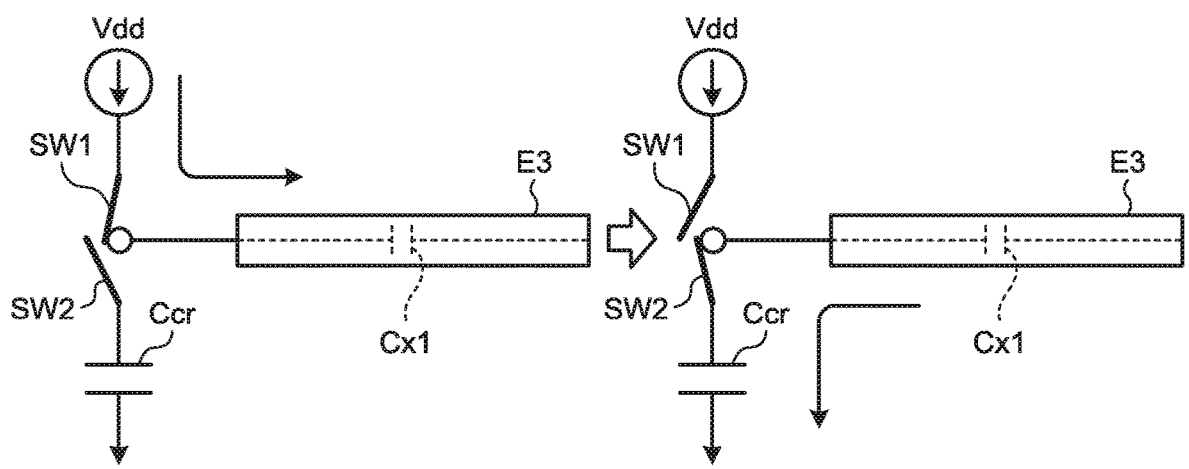
FIG. 5 is a diagram for explaining the basic principle of self-capacitance touch detection and illustrating a non-contact state.
Figure 6:
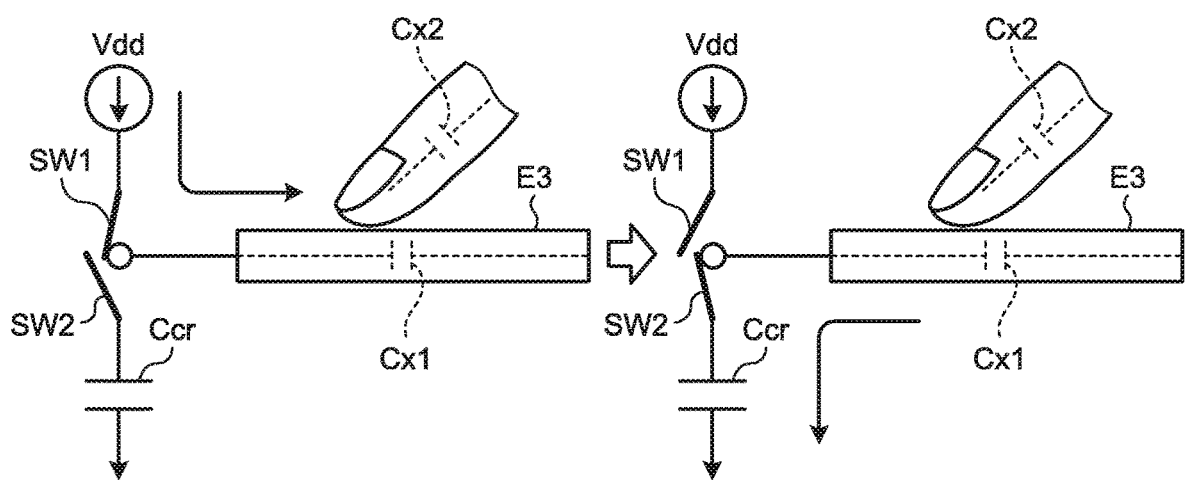
FIG. 6 is a diagram for explaining the basic principle of self-capacitance touch detection and illustrating a contact state.
Figure 7:
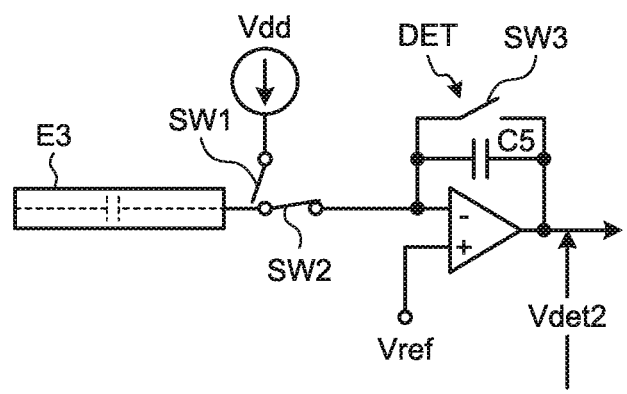
FIG. 7 is a diagram for explaining an example of an equivalent circuit in self-capacitance touch detection.
Figure 8:
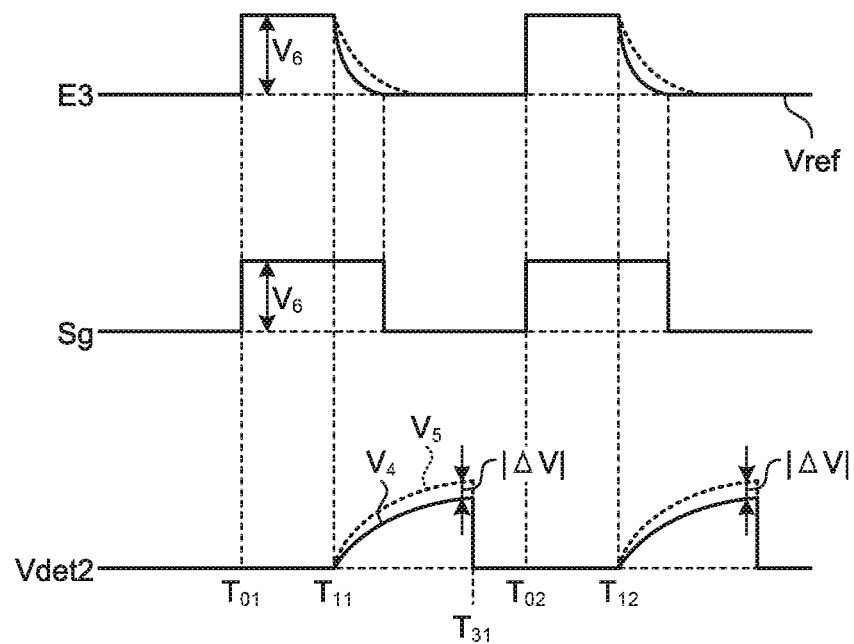
FIG. 8 is a diagram of an example of waveforms of a drive signal and a detection signal in self-capacitance touch detection.

The following describes the basic principle of self-capacitance touch detection with reference to FIGS. 5 to 8. FIG. 5 is a diagram for explaining the basic principle of self-capacitance touch detection and illustrating a non-contact state. FIG. 6 is a diagram for explaining the basic principle of self-capacitance touch detection and illustrating a contact state. FIG. 7 is a diagram for explaining an example of an equivalent circuit in self-capacitance touch detection. FIG. 8 is a diagram of an example of waveforms of a drive signal and a detection signal in self-capacitance touch detection.

The left figure in FIG. 5 illustrates a state where a detection electrode E3 is coupled to a power source Vdd by a switch SW1 but is not coupled to a capacitor Ccr by a switch SW2 in the non-contact state. In this state, capacitance Cx1 in the detection electrode E3 is charged. The right figure in FIG. 5 illustrates a state where the detection electrode E3 is not coupled to the power source Vdd by the switch SW1 but is coupled to the capacitor Ccr by the switch SW2. In this state, an electric charge in the capacitance Cx1 is discharged via the capacitor Ccr.

The left figure in FIG. 6 illustrates a state where the detection electrode E3 is coupled to the power source Vdd by the switch SW1 but is not coupled to the capacitor Ccr by the switch SW2 in the contact state. In this state, capacitance Cx2 generated by the finger in proximity to the detection electrode E3 is also charged besides the capacitance Cx1 in the detection electrode E3. The right figure in FIG. 6 illustrates a state where the detection electrode E3 is not coupled to the power source Vdd by the switch SW1 but is coupled to the capacitor Ccr by the switch SW2. In this state, an electric charge in the capacitance Cx1 and an electric charge in the capacitance Cx2 are discharged via the capacitor Ccr.

Because of the capacitance Cx2, the voltage change characteristics of the capacitor Ccr in discharging (contact state) illustrated in the right figure in FIG. 6 are clearly different from those of the capacitor Ccr in discharging (non-contact state) illustrated in the right figure in FIG. 5. Consequently, the self-capacitance method determines whether an input operation is performed by a finger or the like using the fact that the voltage change characteristics of the capacitor Ccr vary depending on the presence of the capacitance Cx2.

Specifically, an AC rectangular wave Sg (refer to FIG. 8) at a predetermined frequency (e.g., approximately several kilohertz to several hundred kilohertz) is applied to the detection electrode E3. The voltage detector DET illustrated in FIG. 7 converts fluctuations in the electric current depending on the AC rectangular wave Sg into fluctuations in the voltage (waveforms $V_4$ and $V_5$).

In FIG. 8, the voltage level of the AC rectangular wave Sg rises by an amount corresponding to voltage $V_6$ at time $T_{01}$. At this time, the switch SW1 is turned on, and the switch SW2 is turned off. As a result, the electric potential of the detection electrode E3 also rises to voltage $V_6$. Subsequently, the switch SW1 is turned off before time $T_{11}$. While the detection electrode E3 is in a floating state at this time, the electric potential of the detection electrode E3 is maintained at voltage $V_6$ by the capacitance Cx1 (or Cx1+Cx2, refer to FIG. 6) of the detection electrode E3. Subsequently, the voltage detector DET performs a reset operation before time $T_{11}$.

Subsequently, when the switch SW2 is turned on at time $T_{11}$, the electric charge accumulated in the capacitance Cx1 (or Cx1+Cx2) of the detection electrode E3 moves to capacitance C5 in the voltage detector DET. As a result, output from the voltage detector DET increases (refer to the detection signal Vdet2 in FIG. 8). In the non-contact state, the output (detection signal Vdet2) from the voltage detector DET corresponds to the waveform $V_4$ indicated by the solid line, and Vdet2=Cx1×$V_6$/C5 is satisfied. In the contact state, the output corresponds to the waveform $V_5$ indicated by the dotted line, and Vdet2=(Cx1+Cx2)×$V_6$/C5 is satisfied.

Subsequently, at time $T_{31}$, the switch SW2 is turned off, and the switch SW1 and a switch SW3 are turned on. As a result, the electric potential of the detection electrode E3 is reduced to a low level equal to the electric potential of the AC rectangular wave Sg, and the voltage detector DET is reset. The operation described above is repeated at a predetermined frequency (e.g., approximately several kilohertz to several hundred kilohertz). The detection device 40 thus can perform touch detection based on the basic principle of self-capacitance touch detection.

Figure 9:
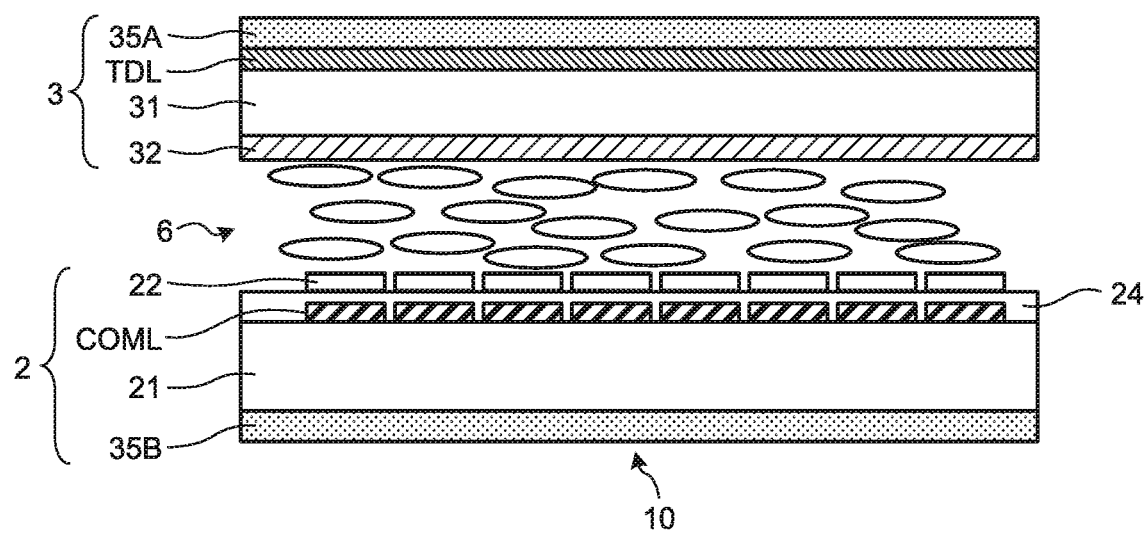
FIG. 9 is a sectional view of a schematic sectional structure of the display device according to the first embodiment.

The following describes an exemplary configuration of the display device 1 according to the present embodiment in greater detail. FIG. 9 is a sectional view of a schematic sectional structure of the display device according to the embodiment. As illustrated in FIG. 9, the display panel 10 includes a pixel substrate 2, a counter substrate 3, and a liquid crystal layer 6 serving as a display functional layer. The counter substrate 3 is disposed facing the pixel substrate 2 in a direction perpendicular to the surface of the pixel substrate 2. The liquid crystal layer 6 is provided between the pixel substrate 2 and the counter substrate 3.

The pixel substrate 2 includes a first substrate 21, pixel electrodes 22, the first electrodes COML, and a polarizing plate 35B. The first substrate 21 is provided with circuits, such as a gate scanner included in the gate driver 12, switching elements, such as thin film transistors (TFTs), and various kinds of wiring (not illustrated in FIG. 9), such as the gate lines GCL and the signal lines SGL.

The first electrodes COML are provided on the upper side of the first substrate 21. The pixel electrodes 22 are provided above the first electrodes COML with an insulating layer 24 interposed therebetween. The first electrodes COML are separated from the pixel electrodes 22 in a direction perpendicular to the surface of the first substrate 21. The pixel electrodes 22 are disposed in a matrix (row-column configuration) in planar view. The polarizing plate 35B is provided below the first substrate 21. While the pixel electrodes 22 according to the present embodiment are provided above the first electrodes COML, the configuration is not limited thereto. The first electrodes COML may be provided above the pixel electrodes 22. In other words, the pixel electrodes 22 and the first electrodes COML are separated from each other in the direction perpendicular to the surface of the first substrate 21 with the insulating layer 24 interposed therebetween. One of the pixel electrodes 22 and the first electrodes COML are provided above the other thereof.

In the present specification, "above" indicates a direction from the first substrate 21 toward a second substrate 31 in the direction perpendicular to the surface of the first substrate 21, and "below" indicates a direction from the second substrate 31 toward the first substrate 21. The "planar view" indicates a view seen in the direction perpendicular to the surface of the first substrate 21.

The pixel electrodes 22 are provided corresponding to the respective sub-pixels SPix constituting each pixel Pix in the display panel 10. The pixel electrodes 22 are supplied with the pixel signals Vpix for performing a display operation from the source driver 13 (refer to FIG. 1). In the display operation, the first electrodes COML are supplied with the display drive signals Vcomdc serving as direct-current (DC) voltage signals. As a result, the first electrodes COML serve as common electrodes for a plurality of pixel electrodes 22. The first electrodes COML also serve as drive electrodes in touch detection in the first detection mode (mutual capacitance method). The first electrodes COML also serve as detection electrodes in touch detection in the second detection mode (self-capacitance method). The first electrodes COML also serve as guard electrodes in touch detection in the third detection mode (self-capacitance method).

The pixel electrodes 22 and the first electrodes COML according to the present embodiment are made of a translucent conductive material, such as indium tin oxide (ITO).

The counter substrate 3 includes the second substrate 31, a color filter 32, the second electrodes TDL, and a polarizing plate 35A. The color filter 32 is provided to a first surface of the second substrate 31. The second electrodes TDL are provided to a second surface of the second substrate 31. A plurality of the second electrodes TDL are provided above the second substrate 31. The second electrodes TDL serve as detection electrodes in touch detection in the first detection mode and the second detection mode.

The second electrodes TDL according to the present embodiment are made of a translucent conductive material, such as ITO. Alternatively, the second electrodes TDL may be metal thin wires having a mesh-shaped, zigzag-line-shaped, or wavy-line-shaped pattern. In this case, the second electrodes TDL are metal layers made of one or more of aluminum (Al), copper (Cu), silver (Ag), molybdenum (Mo), chromium (Cr), and tungsten (W).

The color filter 32 faces the liquid crystal layer 6 in the direction perpendicular to the first substrate 21. The color filter 32 may be disposed above the first substrate 21. The first substrate 21 and the second substrate 31 according to the present embodiment are glass substrates or resin substrates, for example.

The first substrate 21 and the second substrate 31 are disposed facing each other with a predetermined space interposed therebetween. The liquid crystal layer 6 is provided between the first substrate 21 and the second substrate 31. The liquid crystal layer 6 modulates light passing therethrough depending on the state of an electric field. The liquid crystal layer 6, for example, includes liquid crystals in a lateral electric-field mode, such as the in-plane switching (IPS) mode including the fringe field switching (FFS) mode. An orientation film (not illustrated in FIG. 9) is provided between the liquid crystal layer 6 and the pixel substrate 2 and between the liquid crystal layer 6 and the counter substrate 3 illustrated in FIG. 9.

An illuminator (backlight 102 (refer to FIG. 14)), which is not illustrated, is provided below the first substrate 21. The backlight 102 includes a light source, such as a light emitting diode (LED), and outputs light from the light source to the first substrate 21. The light from the backlight 102 passes through the pixel substrate 2 and is modulated depending on the state of the liquid crystals at the corresponding position. The state of light transmission to the display surface varies depending on the positions. With this mechanism, an image is displayed on the display surface.

Figure 10:
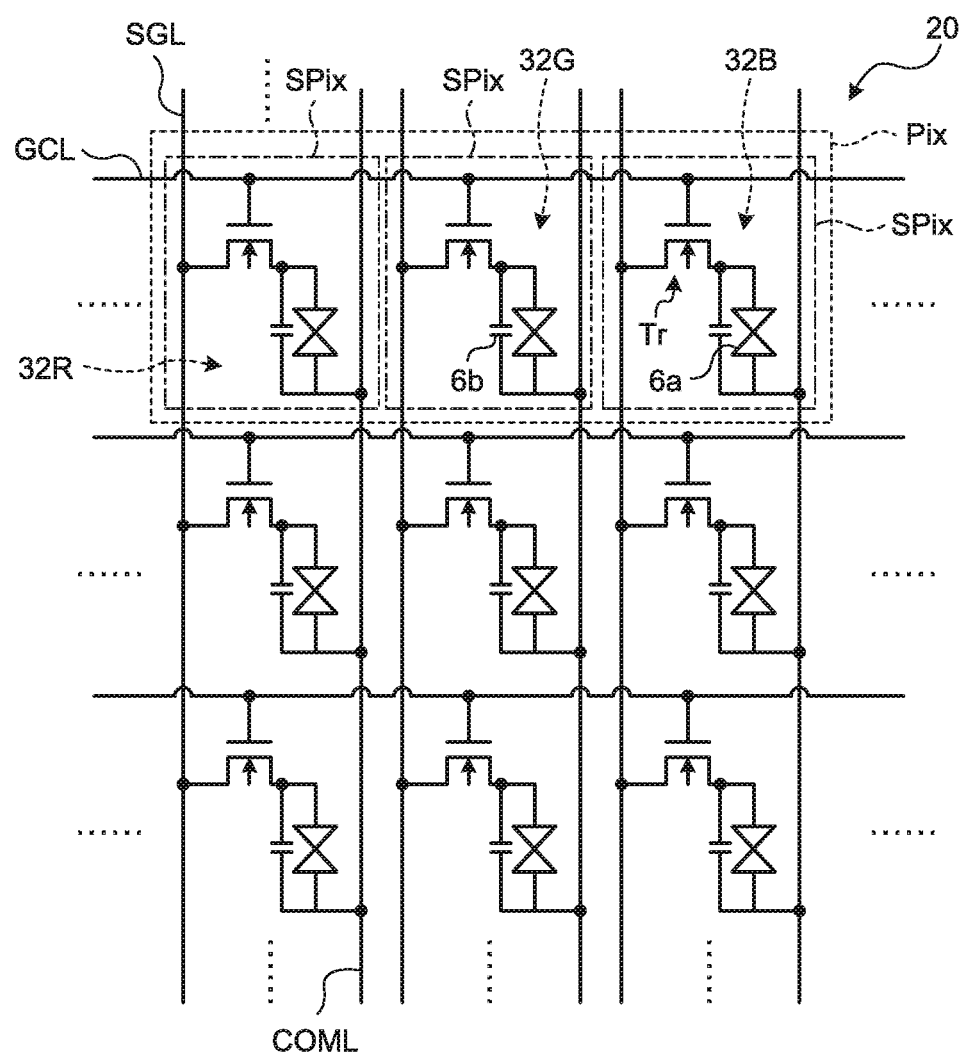
FIG. 10 is a circuit diagram of a pixel array in a display portion.

The following describes a display operation performed by the display panel 10. FIG. 10 is a circuit diagram of a pixel array in the display portion according to the embodiment. The first substrate 21 (refer to FIG. 9) is provided with switching elements Tr of the respective sub-pixels SPix, the signal lines SGL, the gate lines GCL, and other components as illustrated in FIG. 10. The signal lines SGL and the gate lines GCL are electrically coupled to the switching elements Tr. The switching elements Tr are provided at respective intersections of the signal lines SGL and the gate lines GCL. The signal lines SGL are wiring that supplies the pixel signals Vpix to the pixel electrodes 22. The gate lines GCL are wiring that supplies drive signals for driving the switching elements Tr. The signal lines SGL and the gate lines GCL extend on a plane parallel to the surface of the first substrate 21.

The display portion 20 illustrated in FIG. 10 includes a plurality of sub-pixels SPix arrayed in a matrix (row-column configuration). The sub-pixels SPix each include the switching element Tr and a liquid crystal element 6a. The switching element Tr is a thin-film transistor and is an n-channel metal oxide semiconductor (MOS) TFT in this example. The insulating layer 24 is provided between the pixel electrodes 22 and the first electrodes COML to form holding capacitance 6b illustrated in FIG. 10.

The gate driver 12 illustrated in FIG. 1 sequentially selects the gate lines GCL. The gate driver 12 applies the scanning signals Vscan to the gates of the switching elements Tr of the respective sub-pixels SPix via the selected gate line GCL. As a result, one row (one horizontal line) out of the sub-pixels SPix is sequentially selected as a target of display drive. The source driver 13 supplies the pixel signals Vpix to the selected sub-pixels SPix via the signal lines SGL. The sub-pixels SPix perform display in units of one horizontal line based on the supplied pixel signals Vpix.

To perform the display operation, the first driver 14A illustrated in FIG. 1 applies the display drive signals Vcomdc to the first electrodes COML. The display drive signals Vcomdc are voltage signals serving as a common potential for the sub-pixels SPix. As a result, the first electrodes COML serve as common electrodes for the pixel electrodes 22 in the display operation. To perform display, the first driver 14A applies the drive signals Vcomdc to all the first electrodes COML in a display region Ad.

The color filter 32 illustrated in FIG. 9 may include periodically arrayed color areas of the color filter 32 in three colors of red (R), green (G), and blue (B), for example. Color areas 32R, 32G, and 32B in the three colors of R, G, and B, respectively, serve as a set and correspond to the respective sub-pixels SPix illustrated in FIG. 10. A pixel Pix is composed of a set of sub-pixels SPix corresponding to the respective color areas 32R, 32G, and 32B in the three colors. The color filter 32 may include color areas in four or more colors.

Figure 11:
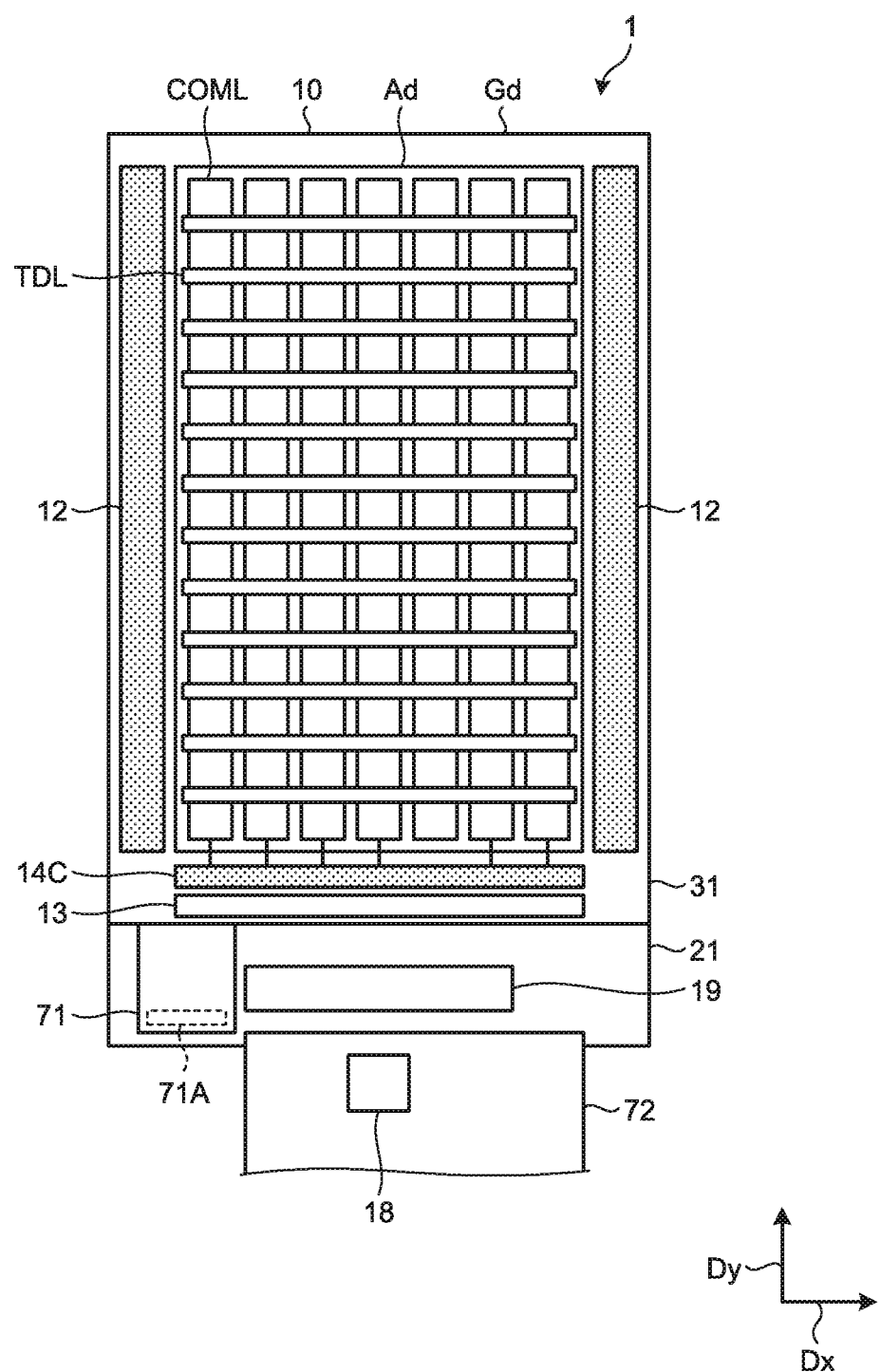
FIG. 11 is a plan view schematically illustrating the display device according to the first embodiment.

The following describes the configuration of the first electrodes COML and the second electrodes TDL and a touch detection operation. FIG. 11 is a plan view schematically illustrating the display device according to the first embodiment. FIG. 11 schematically illustrates the relation between the positions of the first electrodes COML, the second electrodes TDL, and various kinds of circuits.

As illustrated in FIG. 11, the display device 1 has the display region Ad and a peripheral region Gd. In the present specification, the display region Ad is an area for displaying an image and where a plurality of pixels Pix (sub-pixels SPix) overlap therewith. The peripheral region Gd is an area positioned on the inner side than the outer periphery of a cover substrate 101 (refer to FIG. 14) and on the outer side than the display region Ad. The peripheral region Gd may have a frame shape surrounding the display region Ad. In this case, the peripheral region Gd may also be referred to as a frame area.

As illustrated in FIG. 11, the first electrodes COML and the second electrodes TDL are provided in the display region Ad. The first electrodes COML extend in a second direction Dy and a plurality of the first electrodes COML are arrayed in a first direction Dx. In other words, the first electrodes COML extend along the long side of the display region Ad and a plurality of the first electrodes COML are arrayed along the short side of the display region Ad. The first electrodes COML have a rectangular shape with their long side extending in the second direction Dy.

The first direction Dx according to the present embodiment extends along one side of the display region Ad. The second direction Dy intersects the first direction Dx. The first direction Dx and the second direction Dy are not limited thereto, and the second direction Dy may intersect the first direction Dx at an angle other than 90 degrees. The plane defined by the first direction Dx and the second direction Dy is parallel to the surface of the first substrate 21. The direction orthogonal to the first direction Dx and the second direction Dy is the thickness direction of the first substrate 21.

The second electrodes TDL extend in the first direction Dx and a plurality of the second electrodes TDL are arrayed in the second direction Dy. The second electrodes TDL intersect the first electrodes COML in planar view. Capacitance is generated at the intersections of the first electrodes COML and the second electrodes TDL.

To perform touch detection in the first detection mode (mutual capacitance method), the first driver 14A sequentially scans the first electrodes COML in a time-division manner to supply the drive signals Vcom1 thereto. Sensor output signals Vs depending on a change in the capacitance between the first electrodes COML and the second electrodes TDL are output to the voltage detector DET. The display device 1 thus performs touch detection on the display region Ad.

To perform touch detection in the second detection mode (self-capacitance method), the second driver 14B supplies the drive signals Vcom2 to the first electrodes COML simultaneously or in a time-division manner. Sensor output signals depending on a change in the capacitance of the first electrodes COML are output to the voltage detector DET. The display device 1 thus can detect the position of the detected object in the first direction Dx. Similarly, the second driver 14B supplies the drive signals Vcom2 to the second electrodes TDL simultaneously or in a time-division manner. Sensor output signals depending on a change in the capacitance of the second electrodes TDL are output to the voltage detector DET. The display device 1 thus can detect the position of the detected object in the second direction Dy.

As illustrated in FIG. 11, a flexible substrate 72 is provided to the peripheral region Gd of the first substrate 21. A scanner 14C, the source driver 13, and a display integrated circuit (IC) 19 are provided to the peripheral region Gd between the ends of the first electrodes COML and the flexible substrate 72. The scanner 14C is a scanner circuit that sequentially selects the first electrodes COML to be driven. The gate drivers 12 are provided to the peripheral region Gd along the extending direction of the first electrodes COML, that is, on the long sides of the peripheral region Gd of the first substrate 21. A detection IC 18 is provided to the flexible substrate 72.

A flexible substrate 71 is provided to the peripheral region Gd of the second substrate 31. The flexible substrate 71 is electrically coupled to the display IC 19 or the flexible substrate 72 of the first substrate 21 via a coupling terminal 71A. The second electrodes TDL are electrically coupled to the detection IC 18 via the flexible substrate 71.

In touch detection in the third detection mode, the scanner 14C according to the present embodiment selects the signal lines SGL and the gate lines GCL simultaneously or in a time-division manner to couple them to the detection IC 18.

The display IC 19 serves as the controller 11 illustrated in FIG. 1. Part of the functions of the detection device 40 may be included in the detection IC 18 or provided as functions of an external micro-processing unit (MPU). The configuration of the display IC 19 or the detection IC 18 is not limited thereto, and the display IC 19 or the detection IC 18 may be provided to an external control substrate outside the module, for example. The first driver 14A illustrated in FIG. 1 is included in the display IC 19. The second driver 14B is included in the detection IC 18. The configuration is not limited thereto, and the first driver 14A and the second driver 14B may be provided to the first substrate 21 or an external control substrate.

In the display device 1 according to the present embodiment, the first electrodes COML extend in the direction intersecting the gate lines GCL (refer to FIG. 10) in planar view. With this configuration, wiring (not illustrated) coupled to the first electrodes COML and circuits, such as the scanner 14C, can be provided to the peripheral region Gd at a position different from the position where the gate drivers 12 are provided. Specifically, as illustrated in FIG.

11, for example, the gate drivers 12 are provided on the long sides of the peripheral region Gd. The circuits, such as the scanner 14C, and the display IC 19 are provided on the short side of the peripheral region Gd. Consequently, the display device 1 according to the present embodiment can make the peripheral region Gd along the first electrodes COML narrower. The configuration is not limited thereto, the first electrodes COML may extend in the direction intersecting the signal lines SGL (refer to FIG. 10), that is, in the first direction Dx. In this case, the second electrodes TDL extend in the second direction Dy in a manner intersecting the first electrodes COML.

Figure 12:
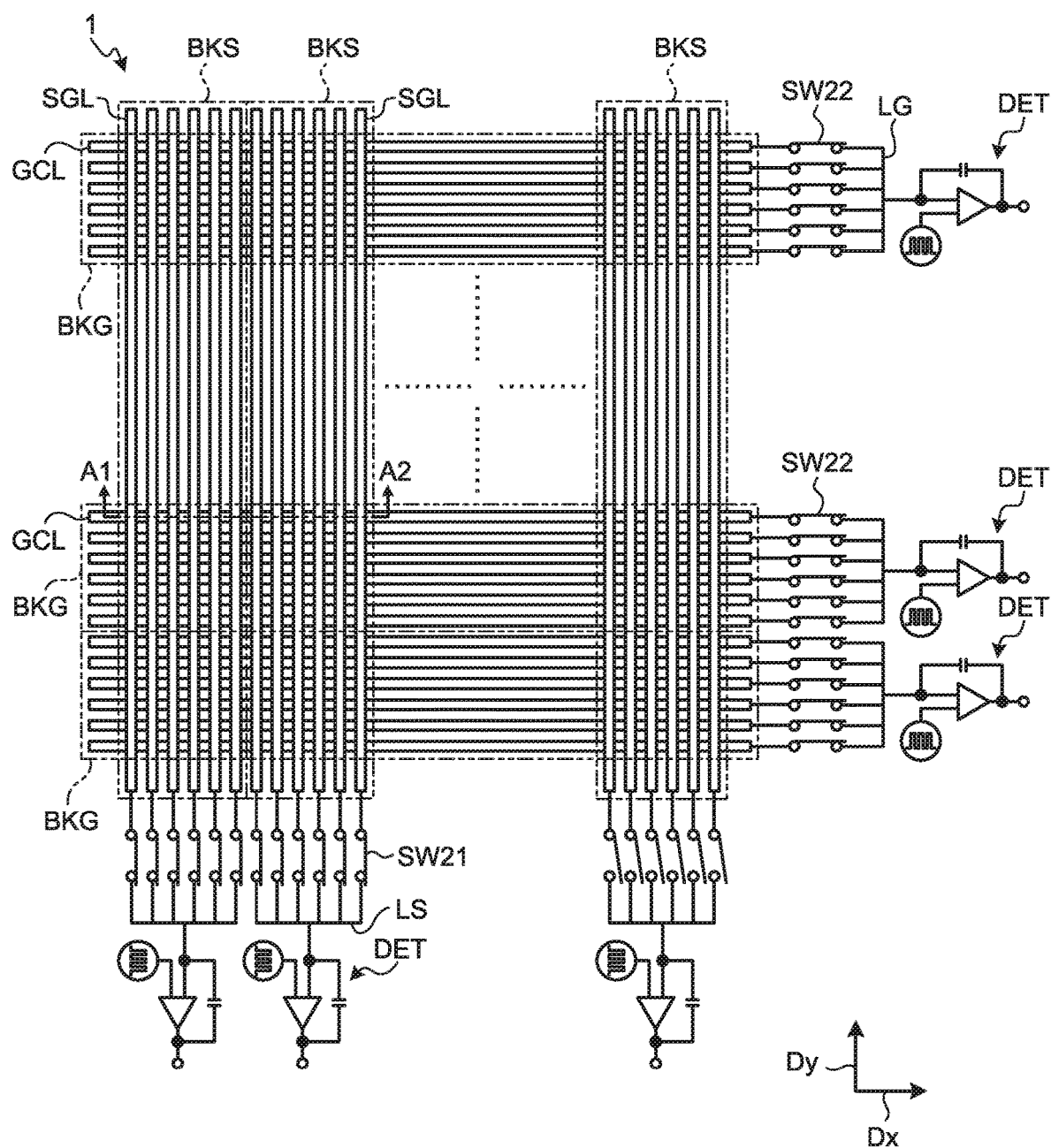
FIG. 12 is a plan view of signal lines and gate lines.
Figure 13:
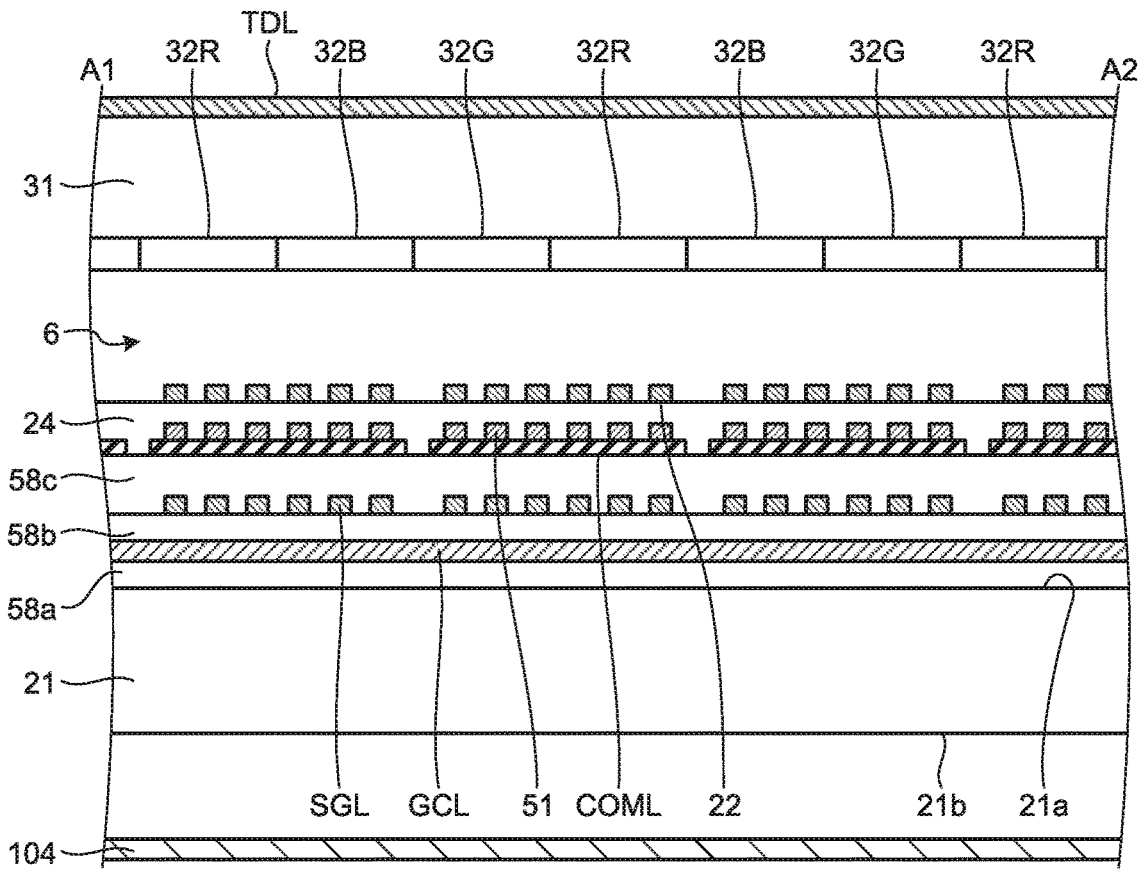
FIG. 13 is a sectional view along line A1-A2 in FIG. 12.
Figure 14:
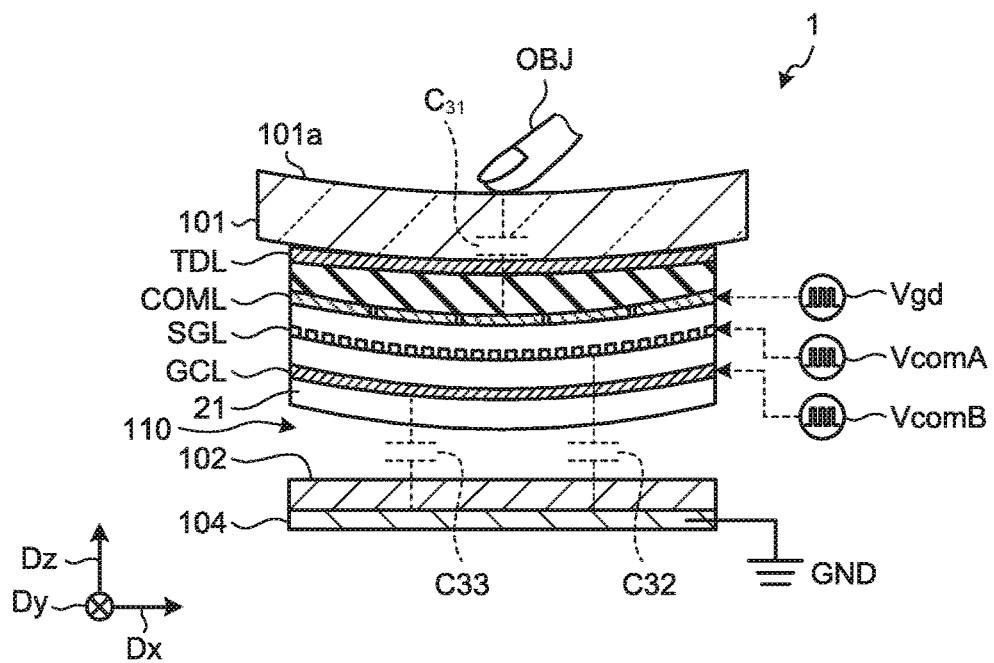
FIG. 14 is a sectional view schematically illustrating an exemplary operation in a third detection mode.

The following describes the configuration of the signal lines SGL and the gate lines GCL and touch detection in the third detection mode. FIG. 12 is a plan view of the signal lines and the gate lines. FIG. 13 is a sectional view along line A1-A2 in FIG. 12. FIG. 14 is a sectional view schematically illustrating an exemplary operation in the third detection mode.

As illustrated in FIG. 12, the signal lines SGL extend in the second direction Dy and a plurality of the signal lines SGL are arrayed in the first direction Dx. In other words, the signal lines SGL are provided along the longitudinal direction of the first electrodes COML illustrated in FIG. 11. The gate lines GCL extend in the first direction Dx and a plurality of the gate lines GCL are arrayed in the second direction Dy. In other words, the gate lines GCL are provided along the longitudinal direction of the second electrodes TDL illustrated in FIG. 11.

Signal line blocks BKS each including a plurality of signal lines SGL are arrayed in the first direction Dx. The signal lines SGL are coupled to respective switches SW21. A plurality of switches SW21 are coupled to one wire LS. In the third detection mode, the switches SW21 are turned on. As a result, the signal lines SGL included in each of the signal line blocks BKS are electrically coupled to one another via the switches SW21 and the wire LS. The signal line blocks BKS are coupled to the respective voltage detectors DET and the second driver 14B (not illustrated in FIG. 12) via the switches SW21 and the respective wires LS.

In the third detection mode, the second driver 14B supplies the drive signals VcomA to the signal line block BKS via the wire LS and the switches SW21. The signal line block BKS outputs sensor output signals depending on a change in the capacitance of the signal line block BKS to the voltage detector DET. The second driver 14B sequentially supplies the drive signals VcomA to all the signal line blocks BKS simultaneously or in a time-division manner. The display device 1 thus can detect the position of the detected object in the first direction Dx. As described above, each of the signal line blocks BKS including the signal lines SGL serves as one detection electrode in the third detection mode.

In a display period for performing a display operation, the switches SW21 are turned off. The signal lines SGL are coupled to the source driver 13 (refer to FIG. 1) or the display IC 19. As a result, the pixel signals Vpix are supplied to the sub-pixels SPix via the signal lines SGL.

Gate line blocks BKG each including a plurality of gate lines GCL are arrayed in the second direction Dy. The gate lines GCL are coupled to respective switches SW22. A plurality of switches SW22 are coupled to one wire LG. In the third detection mode, the switches SW22 are turned on. As a result, the gate lines GCL included in each of the gate line blocks BKG are electrically coupled to one another via the switches SW22 and the wire LG. The gate line blocks BKG are coupled to the respective voltage detectors DET and the second driver 14B (not illustrated in FIG. 12) via the switches SW22 and the respective wires LG.

In the third detection mode, the second driver 14B supplies the drive signals VcomB to the gate line block BKG via the wire LG and the switches SW22. The gate line block BKG outputs sensor output signals depending on a change in the capacitance of the gate line block BKG to the voltage detector DET. The second driver 14B sequentially supplies the drive signals VcomB to all the gate line blocks BKG simultaneously or in a time-division manner. The display device 1 thus can detect the position of the detected object in the second direction Dy. As described above, each of the gate line blocks BKG including the gate lines GCL serves as one detection electrode in the third detection mode.

In the display period for performing a display operation, the switches SW22 are turned off. The gate lines GCL are coupled to the gate driver 12 (refer to FIG. 1) or the display IC 19. As a result, the scanning signals Vscan are supplied to the switching elements Tr via the gate lines GCL.

In the example illustrated in FIG. 12, the signal line block BKS includes six signal lines SGL. The configuration illustrated in FIG. 12 is given by way of example only. The signal line block BKS may include five or less signal lines SGL or seven or more signal lines SGL. Similarly, the gate line block BKG may include five or less gate lines GCL or seven or more gate lines GCL. The number of signal lines SGL included in the signal line block BKS may be different from that of the gate lines GCL included in the gate line block BKG.

As illustrated in FIG. 13, the first substrate 21 has a first surface 21a and a second surface 21b opposite to the first surface 21a. The gate lines GCL are provided above the first surface 21a of the first substrate 21 with an insulating layer 58a interposed therebetween. An insulating layer 58b is provided on the gate lines GCL. The signals lines SGL are provided on the insulating layer 58b. A planarization layer 58c is provided on the signal lines SGL. The first electrodes COML are provided on the planarization layer 58c. Conductive wires 51 are provided on the first electrodes COML. The insulating layer 24 is provided on the first electrodes COML and the conductive wires 51. The pixel electrodes 22 are provided on the insulating layer 24.

The second substrate 31 and the second electrodes TDL are provided above the pixel electrodes 22 via the liquid crystal layer 6 interposed therebetween. A conductor 104 is provided facing the second surface 21b of the first substrate 21. The conductor 104 is separated from the first substrate 21. In other words, the first electrodes COML are disposed between the second electrodes TDL and the signal lines SGL in the direction perpendicular to the first surface 21a of the first substrate 21. The first electrodes COML are disposed between the second electrodes TDL and the gate lines GCL. The second electrodes TDL are disposed opposite to the conductor 104, the gate lines GCL, and the signal lines SGL across the first electrodes COML. The conductor 104 is disposed opposite to the gate lines GCL and the signal lines SGL across the first substrate 21.

The conductive wires 51 are provided overlapping the respective signal lines SGL in planar view and extend along the signal lines SGL. The conductive wires 51 are made of a metal material including at least one of Al, Cu, Ag, Mo, and an alloy of these metals. With the conductive wires 51, apparent resistances of the first electrodes COML (total resistances of the first electrodes COML and the conductive wires 51) are reduced compared with a case where the first electrodes COML alone are provided.

As illustrated in FIG. 14, the display device 1 further includes the cover substrate 101 and the backlight 102. The cover substrate 101 is provided above the second substrate 31. The cover substrate 101 is a protective member that protects the display device 1 and is a translucent glass substrate or a translucent resin substrate, for example. A surface of the cover substrate 101 serves as a detection surface 101a that detects a detected object OBJ, such as a finger.

The backlight 102 is provided below the first substrate 21. As described above, the backlight 102 outputs light from the light source, such as an LED, to the first substrate 21. The backlight 102 may be a publicly known illuminator and have various configurations. In a case where the display portion 20 of the display device 1 is a reflective liquid crystal display device, the backlight 102 is not necessarily provided. The reflective liquid crystal display device includes reflective electrodes in the pixel substrate 2. Light entering from the cover substrate 101 is reflected by the reflective electrodes, passes through the cover substrate 101, and reaches the eyes of an observer. The reflective liquid crystal display device may include a front light instead of the backlight 102.

As illustrated in FIG. 14, the conductor 104 is provided facing the signal lines SGL. With this configuration, capacitance C32 is generated between the conductor 104 and the signal lines SGL. The conductor 104 is provided facing the gate lines GCL. With this configuration, capacitance C33 is generated between the conductor 104 and the gate lines GCL.

When the detected object OBJ comes into contact with the detection surface 101a of the cover substrate 101, force is applied to the detection surface 101a. The cover substrate 101 is deformed in a manner slightly bent toward the conductor 104 by the force applied from the detected object OBJ. The first substrate 21 is bent together with the cover substrate 101, thereby reducing the space (distance in the perpendicular direction) between the signal lines SGL and the conductor 104. As a result, the capacitance C32 increases.

As illustrated in FIG. 14, the space between the signal lines SGL and the conductor 104 differs between the position where the detected object OBJ is in contact with the detection surface 101a and the position where the detected object OBJ is not in contact therewith. As a result, there is a variation in the capacitance change in the signal lines SGL. Similarly, the space between the gate lines GCL and the conductor 104 decreases at the position where the detected object OBJ is in contact with the detection surface 101a, whereby the capacitance C33 increases. Also in the gate lines GCL, there is a variation in the capacitance change in the gate lines GCL. Based on the capacitance changes, the display device 1 can detect the position where the detected object OBJ is in contact with the detection surface 101a.

Specifically, the second driver 14B supplies the drive signals VcomA to the signal lines SGL. A change in the space between the signal lines SGL and the conductor 104 changes the capacitance C32. When being supplied with the drive signals VcomA, the signal lines SGL output the sensor output signals depending on the capacitance change caused by the change in the space between the signal lines SGL and the conductor 104 to the voltage detectors DET. The second driver 14B supplies the drive signals VcomB to the gate lines GCL simultaneously with the timing when it supplies the drive signals VcomA to the signal lines SGL or in a time-division manner. A change in the space between the gate lines GCL and the conductor 104 changes the capacitance C33. When being supplied with the drive signals VcomB, the gate lines GCL output the sensor output signals depending on the capacitance change caused by the change in the space between the gate lines GCL and the conductor 104 to the voltage detectors DET. Based on the sensor output signals from the signal lines SGL and the gate lines GCL, the display device 1 can detect the position of the detected object OBJ.

When supplying the drive signals VcomA to the signal lines SGL, the second driver 14B according to the present embodiment also supplies guard signals Vgd to the first electrodes COML. When supplying the drive signals VcomB to the gate lines GCL, the second driver 14B also supplies the guard signals Vgd to the first electrodes COML. The guard signals Vgd are voltage signals synchronized with and having the same amplitude as that of the drive signals VcomA and VcomB. As a result, the first electrodes COML are driven at the same electric potential as that of the signal lines SGL and the gate lines GCL. This mechanism suppresses a change in the capacitance between the first electrodes COML and the signal lines SGL. This mechanism also suppresses a change in the capacitance between the first electrodes COML and the gate lines GCL.

As illustrated in FIG. 14, capacitance C31 is generated between the first electrodes COML and the detected object OBJ in the third detection mode. Because the first electrodes COML according to the present embodiment are supplied with the guard signals Vgd, they serve as guard electrodes. This configuration suppresses a change in the capacitance C32 and the capacitance C33 caused by the capacitance C31. Specifically, even when a conductor, such as the detected object OBJ, is present opposite to the signal lines SGL and the gate lines GCL across the first electrodes COML, this configuration suppresses a change in the capacitance C32 and the capacitance C33 caused by the conductor. Consequently, the capacitance C32 and the capacitance C33 change depending on the force applied from the detected object OBJ.

When a conductor, such as water, adheres to the detection surface 101a, for example, the capacitance between the first electrodes COML and the second electrodes TDL changes. In the first detection mode by the mutual capacitance method, the display device 1 may erroneously detect the capacitance change caused by the water as the detected object OBJ. In the second detection mode by the self-capacitance method, the display device 1 can detect the detected object OBJ because no capacitance change occurs as long as the water adhering to the detection surface 101a is in a floating state. However, if a large amount of water adheres to the detection surface 101a, and the detection surface 101a is covered with the water by an area equal to or larger than a predetermined area, the display device 1 may possibly fail to detect the detected object OBJ.

In the third detection mode, the first electrodes COML serve as guard electrodes. Even when water adheres to the detection surface 101a or even when part or the whole of the detection surface 101a is submerged in water, this configuration suppresses a change in the capacitance C32 and the capacitance C33 caused by the water. As a result, the signal lines SGL and the gate lines GCL do not detect the water on the detection surface 101a but detect a change in the capacitance C32 and the capacitance C33 caused by the force applied from the detected object OBJ. Consequently, the display device 1 according to the present embodiment can accurately perform touch detection even when water adheres to the detection surface 101a.

The conductor 104 simply needs to be made of a material that generates capacitance between the signal lines SGL and the conductor 104 and between the gate lines GCL and the conductor 104. The conductor 104 simply needs to be a fixed member facing the first substrate 21 with a space interposed therebetween and hardly deformed by the force applied from the detected object OBJ.

Figure 15:
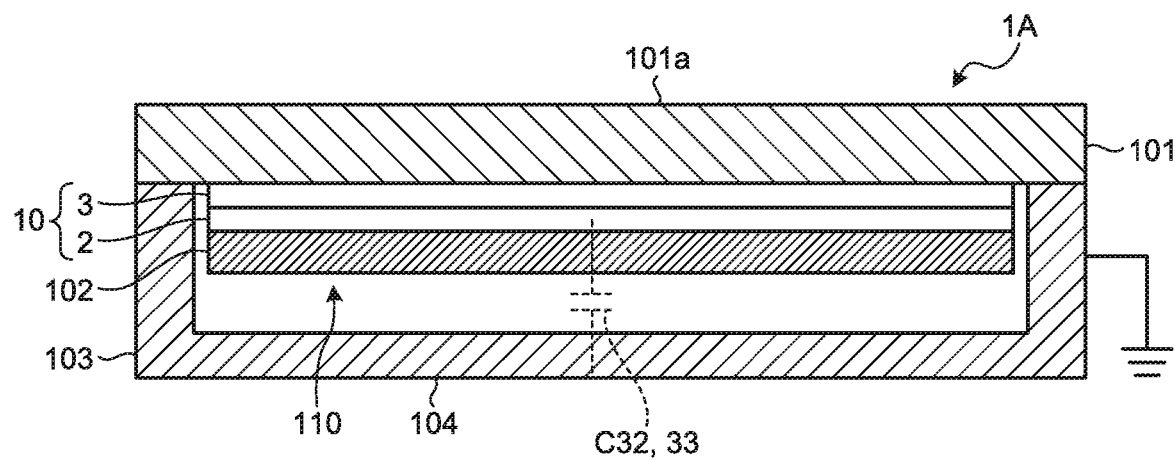
FIG. 15 is a sectional view of an example of a conductor included in the display device according to the present embodiment.
Figure 16:
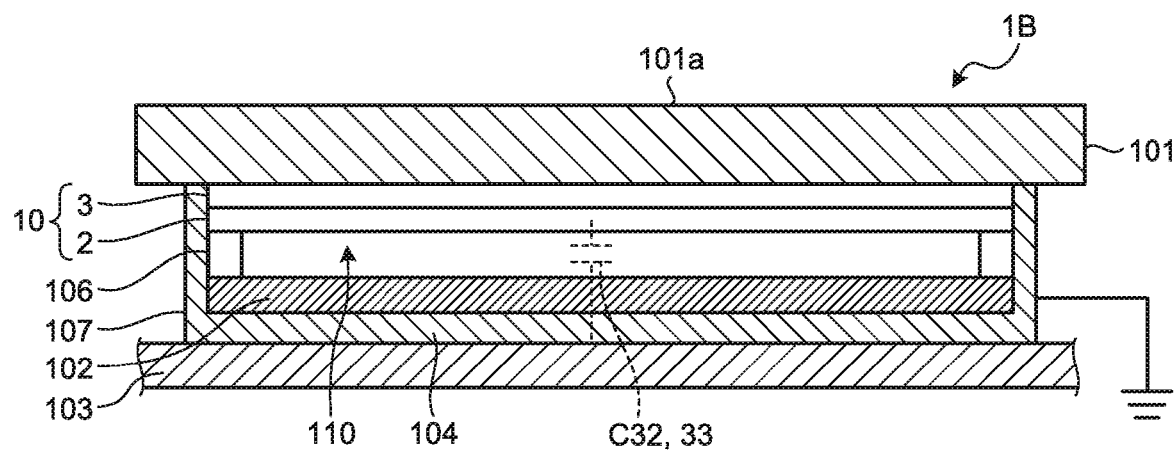
FIG. 16 is a sectional view of another example of the conductor included in the display device according to the present embodiment.

FIG. 15 is a sectional view of an example of a conductor included in the display device according to the present embodiment. FIG. 16 is a sectional view of another example of the conductor included in the display device according to the present embodiment.

As illustrated in FIG. 15, a display device 1A may include a housing 103. The housing 103 is a box-like member having an opening at its upper part. The cover substrate 101 is provided to cover the opening of the housing 103. The display panel 10, the backlight 102, and other components are accommodated in the internal space formed by the housing 103 and the cover substrate 101. As illustrated in FIG. 15, the display panel 10 and the backlight 102 are disposed on the cover substrate 101 side, and a space 110 is formed between the backlight 102 and the bottom of the housing 103. The housing 103 is made of a conductive material, such as a metal. The bottom of the housing 103 serves as the conductor 104 of the display device 1. The housing 103 is electrically coupled to the ground. With this configuration, the capacitance C32 and the capacitance C33 are respectively generated between the signal lines SGL and the conductor 104 and between the gate lines GCL and the conductor 104, respectively, in the display device 1.

The space 110 between the backlight 102 and the bottom of the housing 103 may be provided with an elastic body, such as a sponge and an elastic rubber, that can be deformed by an applied force. The material of the housing 103 is not limited to a conductive material, such as a metal, and may be an insulating material, such as a resin. In this case, a metal layer may be provided to at least the bottom of the housing 103 to serve as the conductor 104.

In a display device 1B illustrated in FIG. 16, the display panel 10 is provided to the surface of the cover substrate 101 opposite to the detection surface 101a. The backlight 102 is provided to the bottom of the housing 103. A spacer 106 is provided between the display panel 10 and the backlight 102 to form the space 110 between the display panel 10 and the backlight 102. The housing 103 is fixed to an electronic apparatus housing 107. The electronic apparatus housing 107 is a housing or part of the housing of an electronic apparatus on which the display device 1 is mounted.

The housing 103 according to the present embodiment is made of a conductive material, such as a metal. As a result, the bottom of the housing 103 serves as the conductor 104. In a case where the housing 103 is made of a resin material, the electronic apparatus housing 107 may serve as the conductor 104. Alternatively, the conductor 104 may be provided to the backlight 102.

Figure 17:
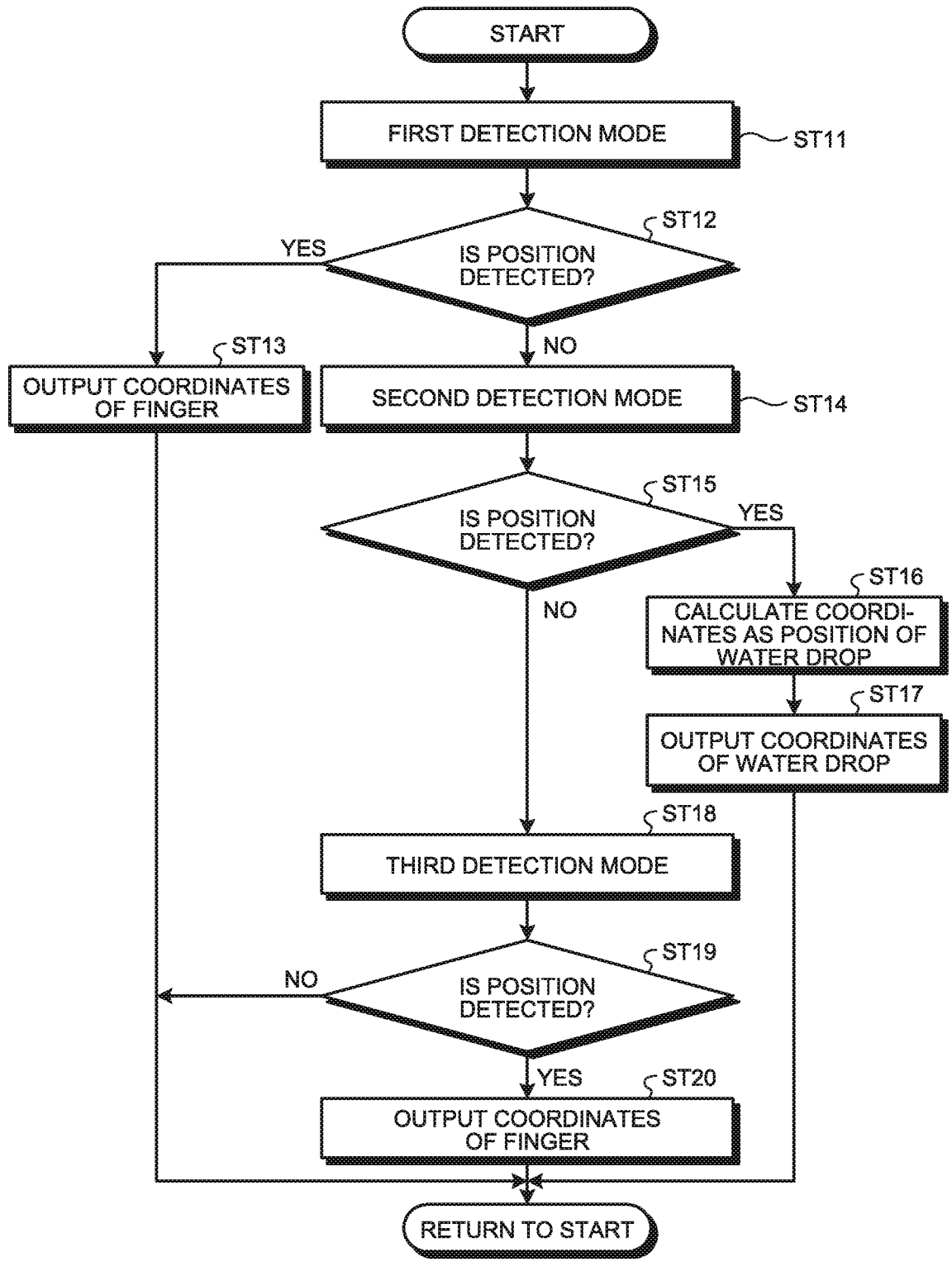
FIG. 17 is a flowchart of an exemplary operation performed by the display device according to the first embodiment.

The following describes an exemplary operation performed by the display device 1 according to the present embodiment. FIG. 17 is a flowchart of an exemplary operation performed by the display device according to the first embodiment. As described above, the display device 1 according to the present embodiment has three touch detection modes, that is, the first detection mode, the second detection mode, and the third detection mode. The controller 11 (refer to FIG. 1) performs touch detection in the first detection mode first (Step ST11). In the touch detection in the first detection mode, the display device 1 detects a finger based on a change in the capacitance between the first electrodes COML and the second electrodes TDL by the mutual capacitance method. The signal processor 44 of the detection device 40 determines whether the position of a finger is detected (Step ST12). In the following example, a finger is in contact with or in proximity to the detection surface 101a. The detected object OBJ is not limited thereto and may be a stylus instead of a finger, for example.

If the signal processor 44 detects the position of a finger (Yes at Step ST12), the coordinate extractor 45 (refer to FIG. 1) outputs the coordinates of the finger (Step ST13). The coordinate extractor 45 calculates the touch panel coordinates and outputs them as the output signals Vout. The process performed by the controller 11 is then returned to START, and the controller 11 repeats the touch detection in the first detection mode.

Figure 18:
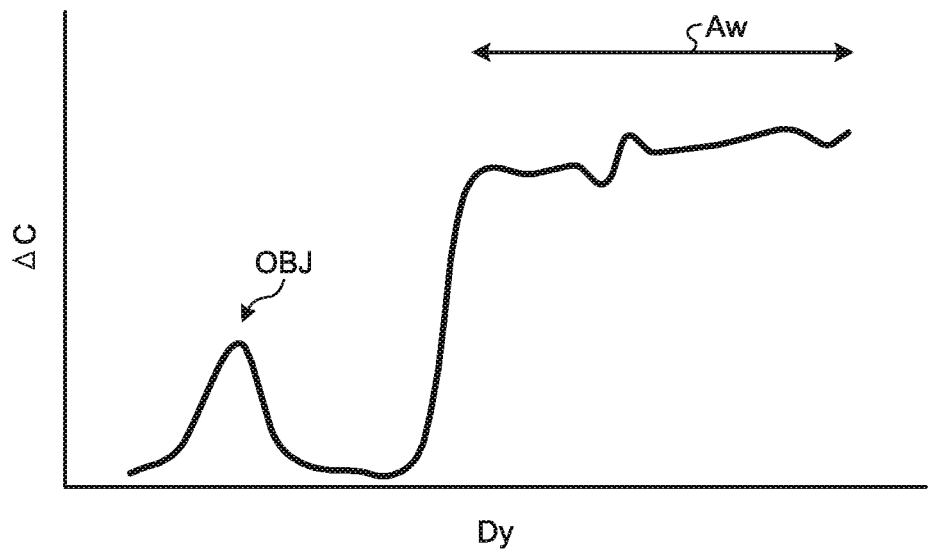
FIG. 18 is a graph schematically illustrating the relation between the position in a second direction and the capacitance change in a first detection mode.

FIG. 18 is a graph schematically illustrating the relation between the position in the second direction and the capacitance change in the first detection mode (mutual capacitance method). In FIG. 18, the horizontal axis indicates the position in the second direction Dy in the display region Ad. The vertical axis ($\Delta C$) indicates the change in the capacitance between the first electrodes COML and the second electrodes TDL. FIG. 18 illustrates a case where water adheres to approximately half of the display region Ad in the second direction Dy. As illustrated in FIG. 18, when water adheres to the detection surface 101a, the capacitance changes in an area Aw to which the water adheres. As a result, the signal processor 44 fails to distinguish the capacitance change caused by the detected object OBJ, such as a finger, from the capacitance change caused by the water.

As illustrated in FIG. 17, if the signal processor 44 fails to detect the position of a finger in the touch detection in the first detection mode (No at Step ST12), the controller 11 determines that water adheres to the detection surface 101a and performs touch detection in the second detection mode (Step ST14). The signal processor 44 determines whether the position of a water drop is detected (Step ST15).

If the signal processor 44 detects the position of a water drop in the second detection mode (Yes at Step ST15), the coordinate extractor 45 calculates the coordinates of the water drop as the position where the water drop adheres to the detection surface 101a (Step ST16). In this case, the controller 11 determines that no water adheres to a wide area unlike the example illustrated in FIG. 18 and that a water drop adheres to the detection surface 101a. The coordinate extractor 45 outputs the coordinates of the water drop as the output signals Vout (Step ST17). The process performed by the controller 11 is then returned to START, and the controller 11 repeats the touch detection in the first detection mode. In this case, the display device 1 can distinguish the capacitance change caused by the water drop from the capacitance change caused by the contact of the finger based on the coordinates of the water drop obtained in the second detection mode and the result of the capacitance change obtained in the first detection mode.

Figure 19:
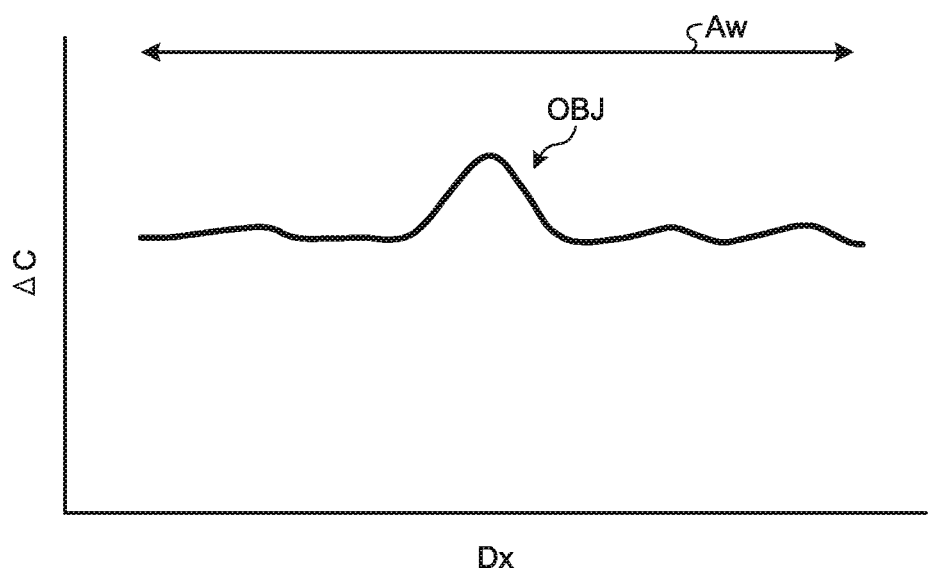
FIG. 19 is a graph schematically illustrating the relation between the position in a first direction and the capacitance change in a second detection mode.
Figure 20:
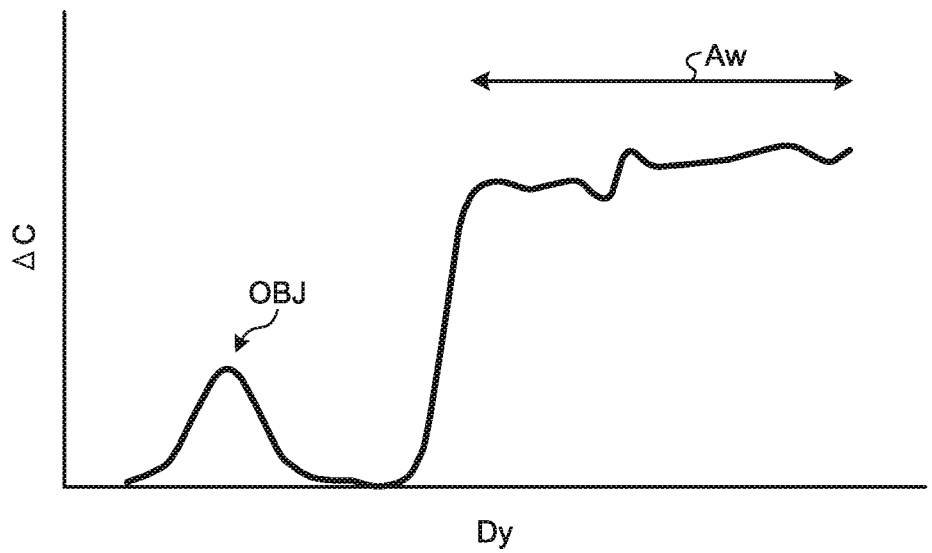
FIG. 20 is a graph schematically illustrating the relation between the position in the second direction and the capacitance change in the second detection mode.

FIG. 19 is a graph schematically illustrating the relation between the position in the first direction and the capacitance change in the second detection mode. FIG. 20 is a graph schematically illustrating the relation between the position in the second direction, the second electrodes, and the capacitance change in the second detection mode. FIG. 19 illustrates the capacitance change $\Delta C$ in the first electrodes COML when using the first electrodes COML as detection electrodes in the self-capacitance method. FIG. 20 illustrates the capacitance change $\Delta C$ in the second electrodes TDL when using the second electrodes TDL as detection electrodes in the self-capacitance method. FIGS. 19 and 20 illustrate a case where water adheres to the whole display region Ad in the first direction DX and to approximately half of the display region Ad in the second direction Dy.

Also in the second detection mode, as illustrated in FIGS. 19 and 20, when water adheres to the detection surface 101a and is not in a floating state, the capacitance changes in the area Aw to which the water adheres. As a result, the signal processor 44 fails to distinguish the capacitance change caused by the detected object OBJ, such as a finger, from the capacitance change caused by the water.

As illustrated in FIG. 17, if the signal processor 44 fails to detect the position of a finger or a water drop in the touch detection in the second detection mode (No at Step ST15), the controller 11 determines that water adheres to the detection surface 101a or that the display device 1 is submerged in water and performs touch detection in the third detection mode (Step ST18). The signal processor 44 determines whether the position of a finger is detected (Step ST19).

Figure 21:
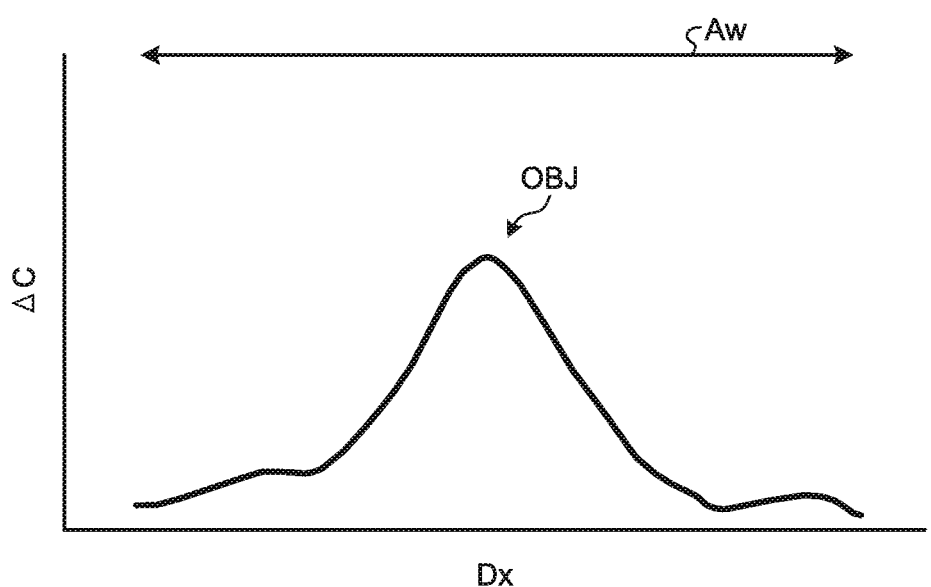
FIG. 21 is a graph schematically illustrating the relation between the position in the first direction and the capacitance change in the third detection mode.
Figure 22:
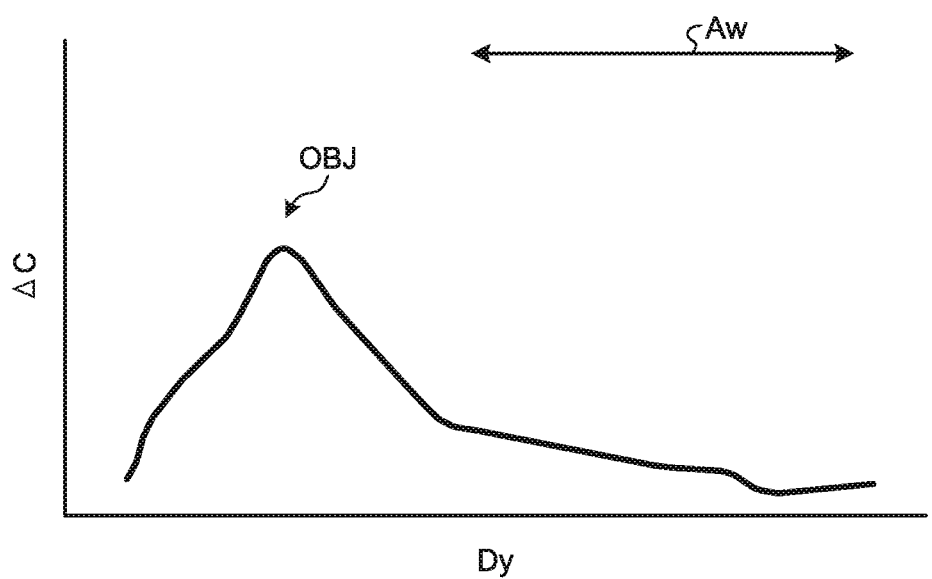
FIG. 22 is a graph schematically illustrating the relation between the position in the second direction and the capacitance change in the third detection mode.

FIG. 21 is a graph schematically illustrating the relation between the position in the first direction and the capacitance change in the third detection mode. FIG. 22 is a graph schematically illustrating the relation between the position in the second direction and the capacitance change in the third detection mode. FIG. 21 illustrates the capacitance change ΔC in the signal lines SGL when using the signal lines SGL as detection electrodes in the self-capacitance method. FIG. 22 illustrates the capacitance change ΔC in the gate lines GCL when using the gate lines GCL as detection electrodes in the self-capacitance method.

As described above, the second driver 14B supplies the guard signals Vgd to the first electrodes COML in the third detection mode. As a result, the first electrodes COML serve as guard signals. As illustrated in FIGS. 21 and 22, this configuration can suppress the capacitance change ΔC caused by the water adhering to the detection surface 101a. As illustrated in FIGS. 21 and 22, the capacitance change ΔC is generated by the force applied from the detected object OBJ to the detection surface 101a. The display device 1 can detect the capacitance change ΔC as the position of the detected object OBJ. In the third detection mode, the peak of the capacitance change ΔC is broader than that in the first detection mode and the second detection mode because the first substrate 21 (refer to FIG. 14) is bent overall by the force from the detected object OBJ.

As illustrated in FIG. 17, if the signal processor 44 fails to detect the position of a finger in the touch detection in the third detection mode (No at Step ST19), the controller 11 determines that no finger is in contact with the detection surface 101a. The process performed by the controller 11 is then returned to START, and the controller 11 repeats the touch detection in the first detection mode. If the signal processor 44 detects the position of a finger (Yes at Step ST19), the coordinate extractor 45 calculates the touch panel coordinates of the position where the finger is in contact with the detection surface 101a and outputs them as the output signals Vout (Step ST20). The process performed by the controller 11 is then returned to START, and the controller 11 repeats the touch detection in the first detection mode.

As described above, the display device 1 according to the present embodiment performs three touch detection modes, that is, the first detection mode, the second detection mode, and the third detection mode. Consequently, the display device 1 can accurately perform touch detection even when water adheres to the detection surface 101a.

Figure 23:
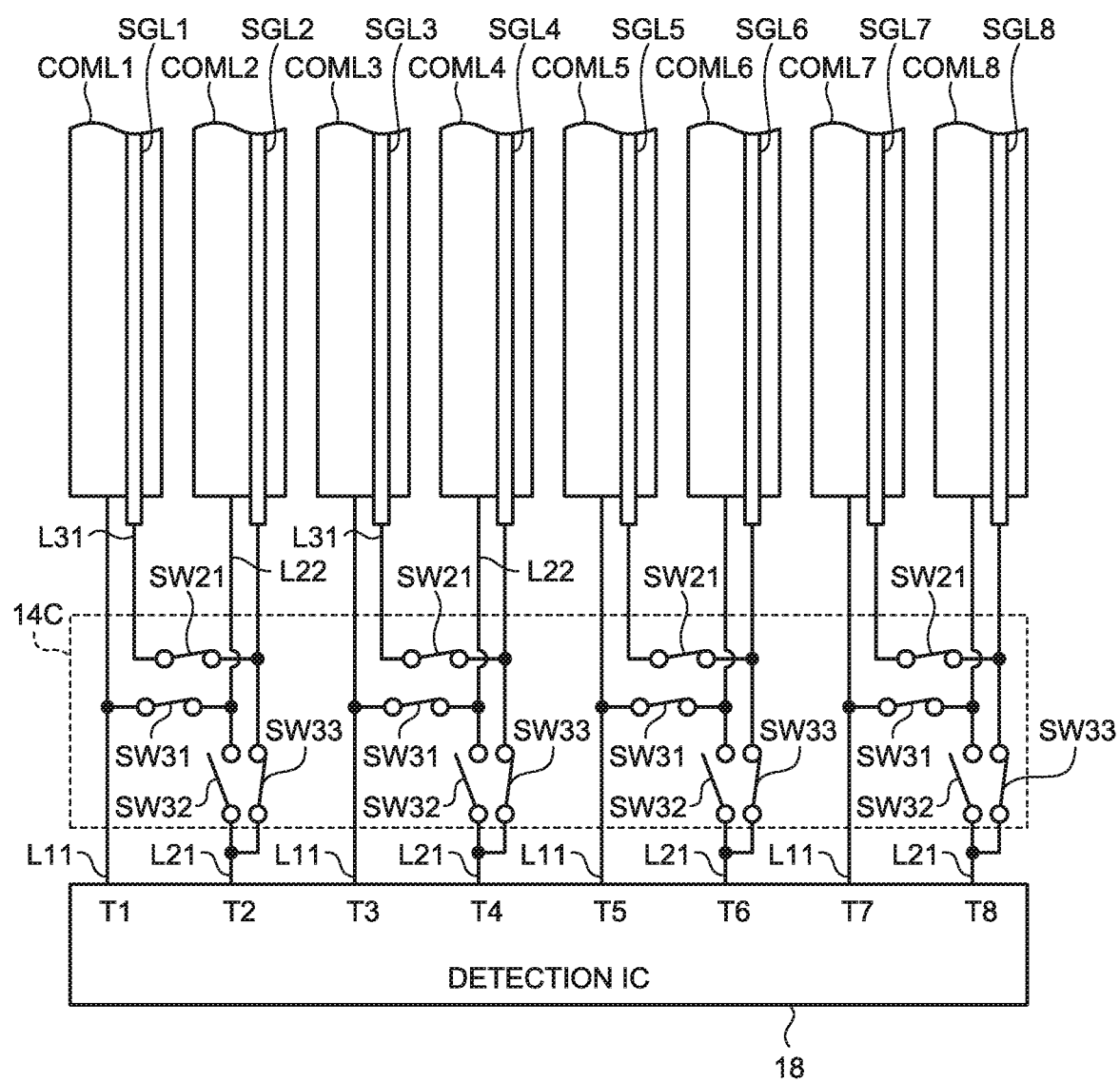
FIG. 23 is a circuit diagram schematically illustrating a coupling configuration of a detection IC and first electrodes and a coupling configuration of the detection IC and the signal lines in the third detection mode.
Figure 24:
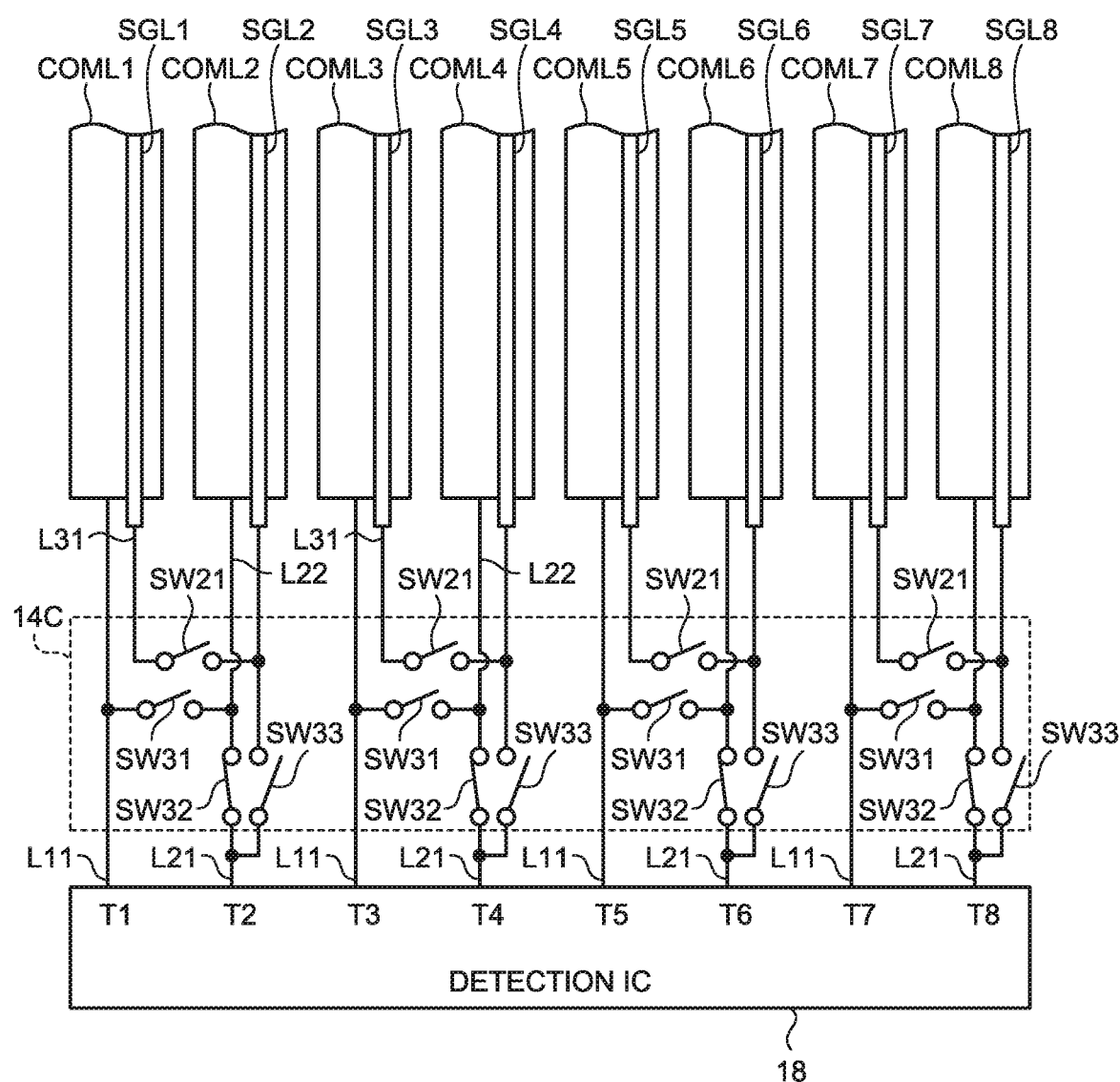
FIG. 24 is a circuit diagram schematically illustrating the coupling configuration of the detection IC and the first electrodes and the coupling configuration of the detection IC and the signal lines in the second detection mode.

The following describes an example of a drive circuit according to the present embodiment. FIG. 23 is a circuit diagram schematically illustrating a coupling configuration of the detection IC and the first electrodes and a coupling configuration of the detection IC and the signal lines in the third detection mode. FIG. 24 is a circuit diagram schematically illustrating the coupling configuration of the detection IC and the first electrodes and the coupling configuration of the detection IC and the signal lines in the second detection mode. To simplify the explanation, FIGS. 23 and 24 simplify the configuration of the scanner 14C and illustrate only the coupling configuration of the first electrodes COML, the signal lines SGL, and the detection IC 18.

As illustrated in FIGS. 23 and 24, first electrodes COML1, COML2, . . . , and COML8 are arrayed. Signal lines SGL1, SGL2, . . . , and SGL8 are disposed overlapping the first electrodes COML1, COML2, . . . , and COML8, respectively in a one-to-one manner. In the following description, the first electrodes COML1, COML2, . . . , and COML8 are referred to as the first electrodes COML when they need not be distinguished from one another. The signal lines SGL1, SGL2, . . . , and SGL8 are referred to as the signal lines SGL when they need not be distinguished from one another. In FIGS. 23 and 24, one signal line SGL is provided corresponding to one first electrode COML for the convenience of explanation. In an actual configuration, however, a number of signal lines SGL are disposed overlapping one first electrode COML.

As illustrated in FIGS. 23 and 24, the detection IC 18 includes output terminals T1, T2, . . . , and T8. The detection IC 18 outputs the drive signals VcomA or the guard signals Vgd from the output terminals T1, T2, . . . , and T8. The sensor output signals are output to the voltage detectors DET (refer to FIG. 12) via the output terminals T1, T2, . . . , and T8. The first electrodes COML1, COML3, COML5, and COML7 are coupled to the output terminals T1, T3, T5, and T7, respectively, via wires L11. The first electrodes COML2, COML4, COML5, and COML6 are coupled to the output terminals T2, T3, T6, and T8, respectively in a one-to-one manner, via wires L21 and L22.

The signal lines SGL1 and SGL2 are coupled to the output terminal T2 via a wire L31 and the wire L21. The signal lines SGL3 and SGL4 are coupled to the output terminal T4 via the wire L31 and the wire L21. The signal lines SGL5 and SGL6 are coupled to the output terminal T6 via the wire L31 and the wire L21. The signal lines SGL7 and SGL8 are coupled to the output terminal T8 via the wire L31 and the wire L21.

The scanner 14C includes switches SW21, SW31, SW32, and SW33. The switch SW21 is disposed between the wire L31 and the wire L31. The switch SW31 is disposed between the wire L11 and the wire L21. The switch SW32 is disposed between the wire L21 and the wire L22. The switch SW33 is disposed between the wire L31 and the wire L21. The scanner 14C includes the switches SW21 (first switch), the switches SW31 (second switch), and the switches SW33 (third switch). The switch SW21 couples the ends of a plurality of signal lines SGL on the same side. The switch SW31 couples the ends of a plurality of first electrodes COML on the same side. The switch SW33 couples the signal lines SGL coupled to each other by the switch SW21 (first switch) to the second driver 14B.

As illustrated in FIG. 23, the switches SW21 and the switches SW33 are turned on in the third detection mode. The switches SW21 each couple the ends of the signal lines SGL on the same side. The signal lines SGL1 and SGL2 coupled by the switch SW21 are coupled to one output terminal T2 via the wire L31, the switch SW33, and the wire L21. Similarly, the signal lines SGL3 and SGL4 are collectively coupled to the output terminal T4, the signal lines SGL5 and SGL6 are collectively coupled to the output terminal T6, and the signal lines SGL7 and SGL8 are collectively coupled to the output terminal T8. The detection IC 18 supplies the drive signals VcomA to the signal lines SGL via the output terminals T2, T4, T6, and T8.

In the third detection mode, the switches SW31 are turned on, and the switches SW32 are turned off. The switches SW31 each couple the ends of the first electrodes COML on the same side. The switches SW32 each cut off the coupling between the wire L21 and the wire L22 and couple the wire L22 to the wire L11. As a result, the first electrodes COML1 and COML2 are collectively coupled to one output terminal T1. Similarly, the first electrodes COML3 and COML4 are collectively coupled to the output terminal T3, the first electrodes COML5 and COML6 are collectively coupled to the output terminal T5, and the first electrodes COML7 and COML8 are collectively coupled to the output terminal T7. The detection IC 18 supplies the guard signals Vgd to the first electrodes COML via the output terminal T1, T3, T5, and T7. In other words, the second driver 14B supplies the guard signals Vsg to the first electrodes COML coupled to the output terminals T1, T3, T5, and T7 (first output terminal). The second driver 14B also supplies the drive signals VcomA (first drive signal) to the signal lines SGL coupled to the output terminals T2, T4, T6, and T8 (second output terminal) different from the output terminals T1, T3, T5, and T7 (first output terminal).

As illustrated in FIG. 24, the switches SW21 and the switches SW33 are turned off in the second detection mode. The switches SW21 each cut off the coupling between the signal lines SGL. The switches SW33 each cut off the coupling between the detection IC 18 and the signal lines SGL.

In the second detection mode, the switches SW31 are turned off, and the switches SW32 are turned on. As a result, the coupling between the wire L11 and the wire L22 is cut off, and the wire L22 is coupled to the wire L21. The first electrodes COML1, COML2, . . . , and COML8 are coupled to the output terminals T1, T2, . . . , and T8, respectively in a one-to-one manner. The detection IC 18 supplies the drive signals Vcom2 to the first electrodes COML via the output terminals T1, T2, . . . , and T8.

As illustrated in FIG. 23, the signal lines SGL are collectively coupled to the output terminals T2, T4, T6, and T8 of the detection IC 18 in the third detection mode, and the first electrodes COML are collectively coupled to the output terminals T2, T4, T6, and T8. With this configuration, the signal lines SGL can be coupled to the detection IC 18 without increasing the number of output terminals T1, T2, . . . , and T8 of the detection IC 18 used in the second detection mode. This configuration can reduce the cost required for the detection IC 18.

To simplify the explanation, FIG. 23 illustrates a configuration in which each two first electrodes COML are coupled to the corresponding output terminals T1, T3, T5, and T7. The configuration is not limited thereto, and the coupling configuration may be appropriately modified. Three or more first electrodes COML, for example, may be coupled to one output terminal T1. Alternatively, all the first electrodes COML may be coupled to one output terminal T1. In this case, the guard signals Vgd are supplied from one output terminal T1, and the drive signals VcomA are supplied from the other output terminals T2, T3, . . . , and T8.

Figure 25:
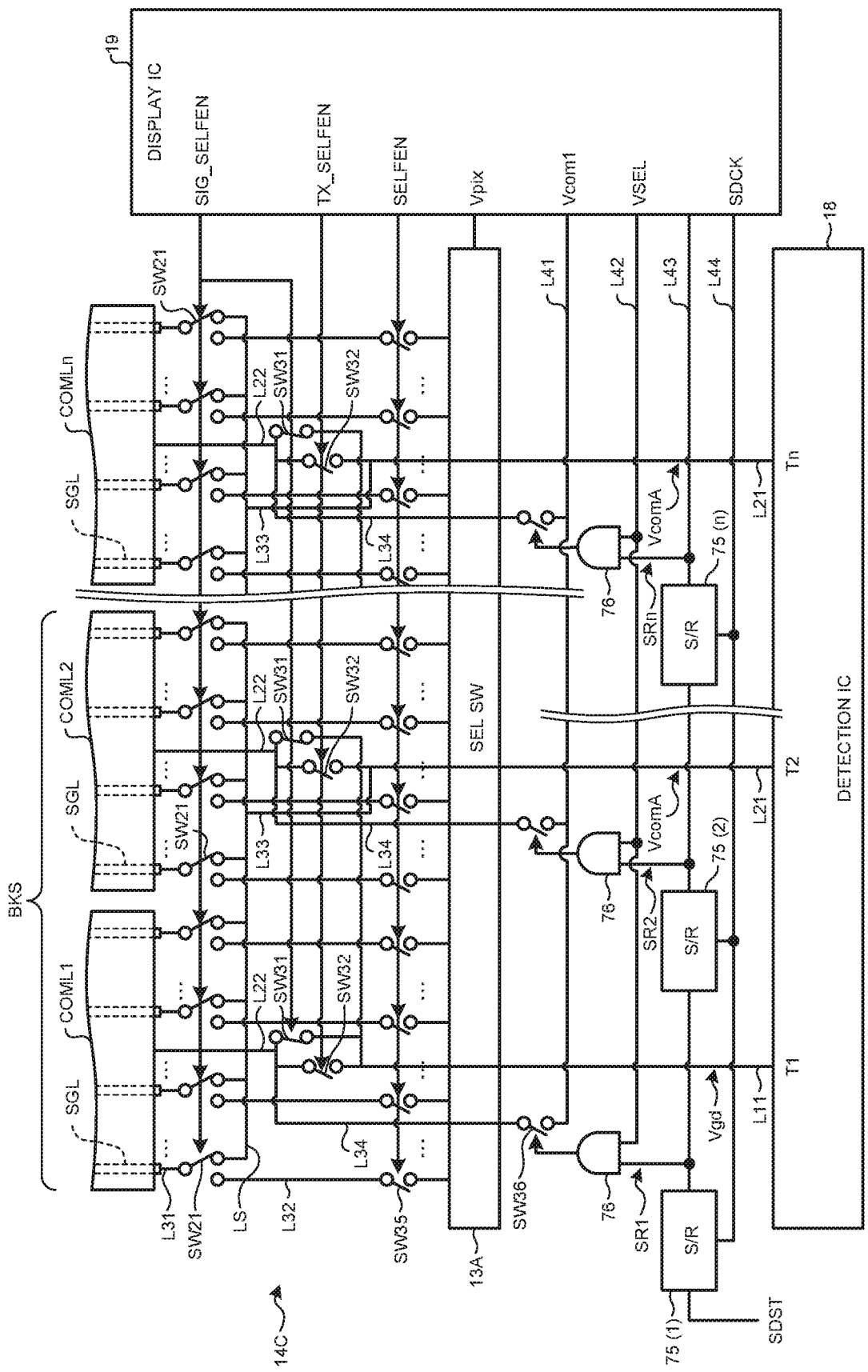
FIG. 25 is a circuit diagram for explaining an operation performed by a scanner in the third detection mode.
Figure 26:
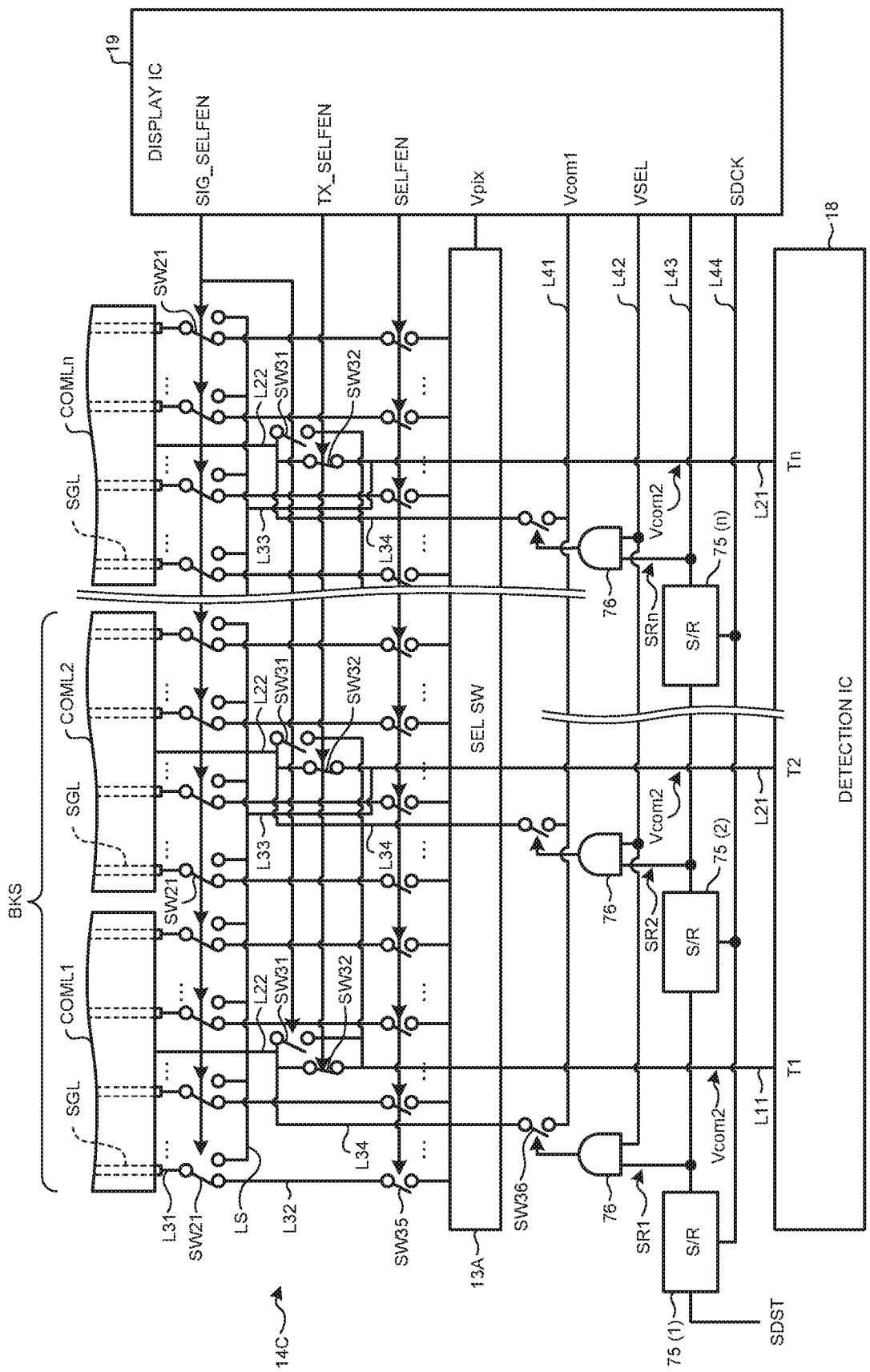
FIG. 26 is a circuit diagram for explaining an operation performed by the scanner in the second detection mode.

FIG. 25 is a circuit diagram for explaining an operation performed by the scanner in the third detection mode. FIG. 26 is a circuit diagram for explaining an operation performed by the scanner in the second detection mode. As illustrated in FIGS. 25 and 26, the display IC 19 outputs control signals SIG_SELFEN, TX_SELFEN, and SELFEN, the pixel signals Vpix, the drive signals Vcom1, selection signals VSEL, scanning start signals SDST, and clock signals SDCK. The control signals SIG_SELFEN, TX_SELFEN, and SELFEN are control signals for controlling the drive of the signal lines SGL, the first electrodes COML, and the second electrodes TDL to perform the second detection mode and the third detection mode. The selection signals VSEL are control signals for selecting the first electrodes COML to be driven in the first detection mode.

The display IC 19 according to the present embodiment includes the functions of the first driver 14A (not illustrated in FIGS. 25 and 26). The detection IC 18 includes the functions of the second driver 14B (not illustrated in FIGS. 25 and 26).

In the first detection mode by the mutual capacitance method, the display IC 19 outputs the control signals SIG_SELFEN, TX_SELFEN, and SELFEN at a low-level voltage. As a result, the switches SW32 are supplied with the control signals TX_SELFEN and turned off to cut off the coupling between the first electrodes COML and the detection IC 18. The switches SW21 are supplied with the control signals SIG_SELFEN and turned off to cut off the coupling between the signal lines SGL and the detection IC 18.

As illustrated in FIGS. 25 and 26, the scanner 14C includes shift registers 75(1), 75(2), . . . , and 75(n) and AND circuits 76. The shift registers 75(1), 75(2), . . . , and 75(n) and the AND circuits 76 are provided corresponding to the first electrodes COML1, COML2, . . . , and COMLn, respectively. In the following description, the shift registers 75(1), 75(2), . . . , and 75(n) are referred to as the shift registers 75 when they need not be distinguished from one another.

In the first detection mode, the display IC 19 supplies the scanning start signals SDST to the shift registers 75 via a wire L43. The display IC 19 also supplies the clock signals SDCK to the shift registers 75 via a wire L44. The shift registers 75 start scanning in response to the scanning start signals SDST serving as a trigger. The shift registers 75 sequentially supply scanning signals SR1, SR2, . . . , and SRn synchronized with the clock signals SDCK to the respective AND circuits 76.

The display IC 19 supplies the selection signals VSEL to the AND circuits 76 via a wire L42. The AND circuits 76 calculate logical products (AND) of the respective scanning signals SR1, SR2, . . . , and SRn and the selection signals VSEL, and output them to respective switches SW36. The operations of the switches SW36 are controlled based on the signals output from the respective AND circuits 76.

If the scanning signal SR and the selection signal VSEL are high-level voltage signals, the switch SW36 is turned on. As a result, the display IC 19 supplies the drive signals Vcom1 to the selected first electrode COML via a wire L41, the switch SW36, a wire L34, and the wire L22. If at least one of the scanning signal SR and the selection signal VSEL is a low-level voltage signal, the switch SW36 is turned off. As a result, the corresponding first electrode COML is not selected. The non-selected first electrode COML may be supplied with the drive signals Vcomdc serving as DC voltage signals.

With this configuration, the scanner 14C sequentially selects the first electrodes COML to be driven based on the scanning signals SR and the selection signals VSEL in the first detection mode. The scanner 14C couples the first electrodes COML to be driven to the display IC 19. As a result, the drive signals Vcom1 are sequentially supplied to the first electrodes COML to be driven, thereby performing mutual capacitance touch detection.

In the second detection mode by the self-capacitance method, as illustrated in FIG. 26, the display IC 19 supplies the control signals TX_SELFEN at a high-level voltage to the switches SW32. As a result, the switches SW32 are turned on. The first electrodes COML are each coupled to the detection IC 18 via the wire L22, the switch SW32, and the wire L11 or the wire L21.

The display IC 19 supplies the control signals SELFEN at a high-level voltage to switches SW35. The display IC 19 also supplies the control signals SIG_SELFEN at a low-level voltage to the switches SW21 and the switches SW31. As a result, the switches SW31 are turned off, whereby the first electrodes COML are coupled to the output terminals T1, T2, . . . , and Tn in a one-to-one manner. The operations of the switches SW35 and the switches SW21 each couple the wire L31 coupled to the signal line SGL to a wire L32. As a result, a plurality of signal lines SGL are not electrically coupled to each other nor to the detection IC 18.

With the coupling configuration described above, the detection IC 18 supplies the drive signals Vcom2 to the first electrodes COML from the respective output terminals T1, T2, . . . , and Tn in the second detection mode. The sensor output signals depending on a change in the capacitance of the first electrodes COML are supplied to the voltage detectors DET via the output terminals T1, T2, . . . , and Tn. The display device 1 thus performs the detection operation in the second detection mode with the first electrodes COML.

In the third detection mode by the self-capacitance method, as illustrated in FIG. 25, the display IC 19 supplies the control signals TX_SELFEN at a low-level voltage to the switches SW32. As a result, the switches SW32 are turned off. The display IC 19 supplies the control signals SELFEN at a high-level voltage to the switches SW35. The display IC 19 also supplies the control signals SIG_SELFEN at a high-level voltage to the switches SW21 and the switches SW31.

A plurality of first electrodes COML are collectively coupled to one output terminal T1 via the respective wires L22, the respective switches SW31, and the wire L11. A plurality of signal lines SGL are collectively coupled to one output terminal T2 via the respective switches SW21, the wire LS, a wire L33, and the wire L21. As a result, the signal line block BKS including the signal lines SGL serves as one detection electrode.

With the coupling configuration described above, the detection IC 18 supplies the guard signals Vgd to the first electrodes COML from the output terminal T1 in the third detection mode. Simultaneously, the detection IC 18 also supplies the drive signals VcomA to the signal lines SGL from the output terminal T2. The sensor output signals depending on a change in the capacitance between the signal lines SGL and the conductor 104 (not illustrated in FIG. 25) are output to the voltage detector DET via the output terminal T2. The display device 1 thus performs the detection operation in the third detection mode with the signal lines SGL.

In the example illustrated in FIG. 25, two first electrodes COML are coupled to one output terminal T1. The signal lines SGL coupled to one output terminal T2 are disposed under the two first electrodes COML coupled to the output terminal T1. The configuration is not limited thereto, and three or more first electrodes COML may be coupled to one output terminal T1.

In the display operation, a signal line selection circuit 13A sequentially selects the signal lines SGL. The display IC 19 supplies the pixel signals Vpix to the selected signal lines SGL via the signal line selection circuit 13A. The display device 1 thus performs the image display operation.

Figure 27:
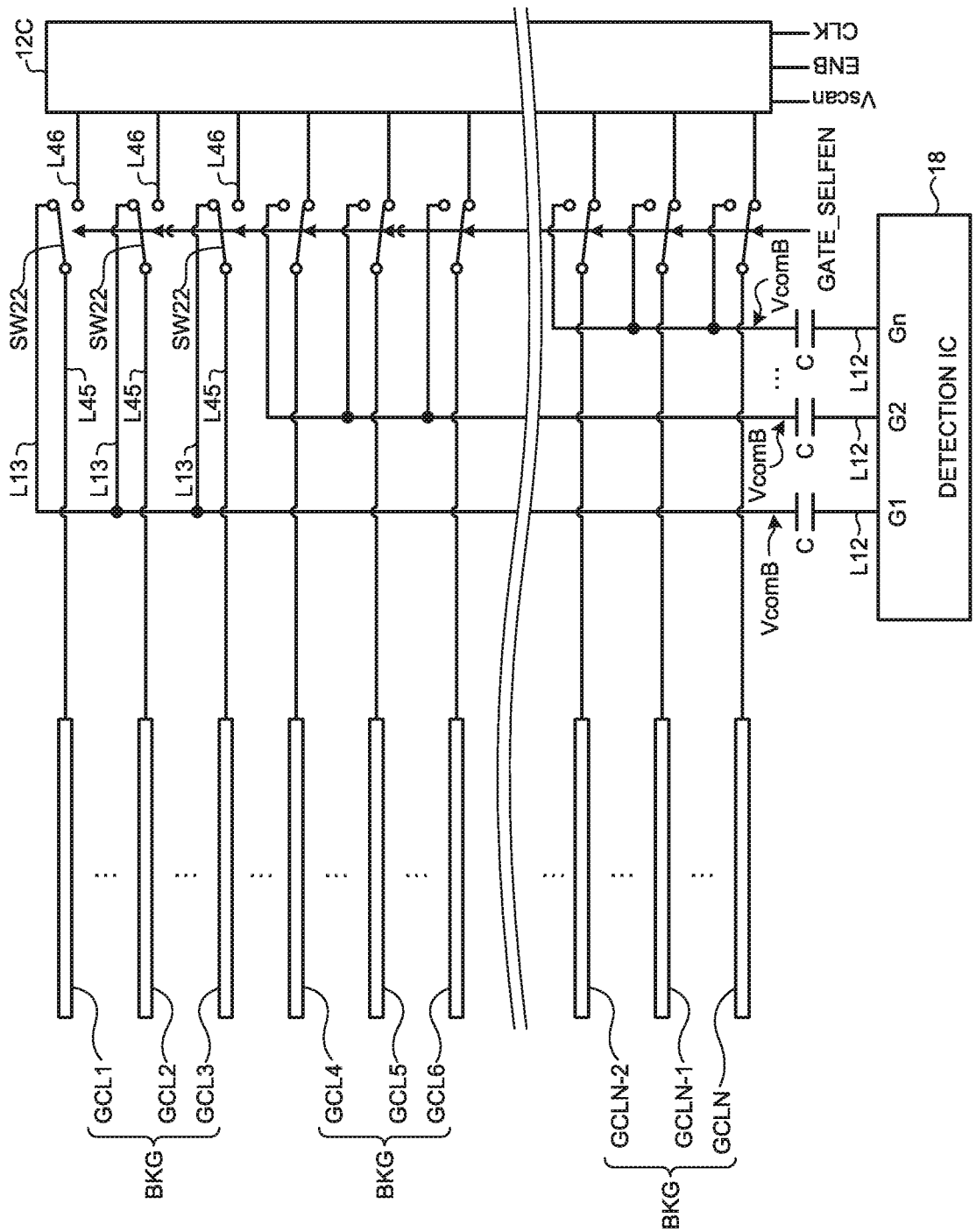
FIG. 27 is a circuit diagram schematically illustrating a coupling configuration of the detection IC and the gate lines and a coupling configuration of a shift register and the gate lines.

FIG. 27 is a circuit diagram schematically illustrating a coupling configuration of the detection IC 18 and the gate lines GCL and a coupling configuration of a shift register 12C and the gate lines GCL. In the display operation, the display IC 19 supplies control signals GATE_SELFEN at a low-level voltage to the switches SW22. The control signals GATE_SELFEN are control signals for controlling the drive of the gate lines GCL to perform the third detection mode. The operations of the switches SW22 each couple a wire L45 to a wire L46. As a result, the gate lines GCL are each coupled to the shift register 12C via the wire L45, the switch SW22, and the wire L46.

The shift register 12C is a circuit that sequentially selects the gate lines GCL in the display operation. The shift register 12C sequentially selects the gate lines GCL based on clock signals CLK and control signals ENB supplied from the display IC 19. The display IC 19 supplies the scanning signals Vscan to the selected gate lines GCL via the shift register 12C. The scanning signals Vscan are applied to the gates of the switching elements Tr (refer to FIG. 10) of the respective sub-pixels SPix via the selected gate lines GCL. The source driver 13 supplies the pixel signals Vpix to the sub-pixels SPix via the signal lines SGL. The display device 1 thus performs the image display operation.

In the detection operation in the third detection mode, the display IC 19 supplies the control signals GATE_SELFEN at a high-level voltage to the switches SW22. The operations of the switches SW22 couple a plurality of gate lines GCL to a wire L12 via the respective wires L45, the respective switches SW22, and respective wires L13. The wires L12 are coupled to respective output terminals G1, G2, . . . , and Gn of the detection IC 18.

As a result, gate lines GCL1, GCL2, and GCL3 are collectively coupled to the output terminal G1 of the detection IC 18. Gate lines GCL4, GCL5, and GCL6 are collectively coupled to the output terminal G2 of the detection IC 18. Gate lines GCLN-2, GCLN-1, and GCLN are collectively coupled to the output terminal Gn of the detection IC 18. With this configuration, the gate line block BKG including the gate lines GCL serves as one detection electrode.

In the third detection mode, the detection IC 18 supplies the drive signals VcomB to the gate lines GCL from the output terminals G1, G2, . . . , and Gn. The sensor output signals based on a change in the capacitance between the gate lines GCL and the conductor 104 (not illustrated in FIG. 27) are output to the voltage detectors DET via the output terminals G1, G2, . . . , and Gn. The display device 1 thus performs the detection operation in the third detection mode with the gate lines GCL.

While the gate line blocks BKG in the example illustrated in FIG. 27 each include three gate lines GCL, the configuration is not limited thereto. The gate line blocks BKG may each include four or more gate lines GCL. In this case, the sets of four or more gate lines GCL are coupled to the respective output terminals G1, G2, . . . , and Gn.

In FIGS. 25 to 27, the display IC 19 generates the control signals SIG_SELFEN, TX_SELFEN, and GATE_SELFEN. The configuration is not limited thereto, and the display device 1 may include another circuit configuration that generates the control signals SIG_SELFEN, TX_SELFEN, and GATE_SELFEN outside the display IC 19.

Figure 28:
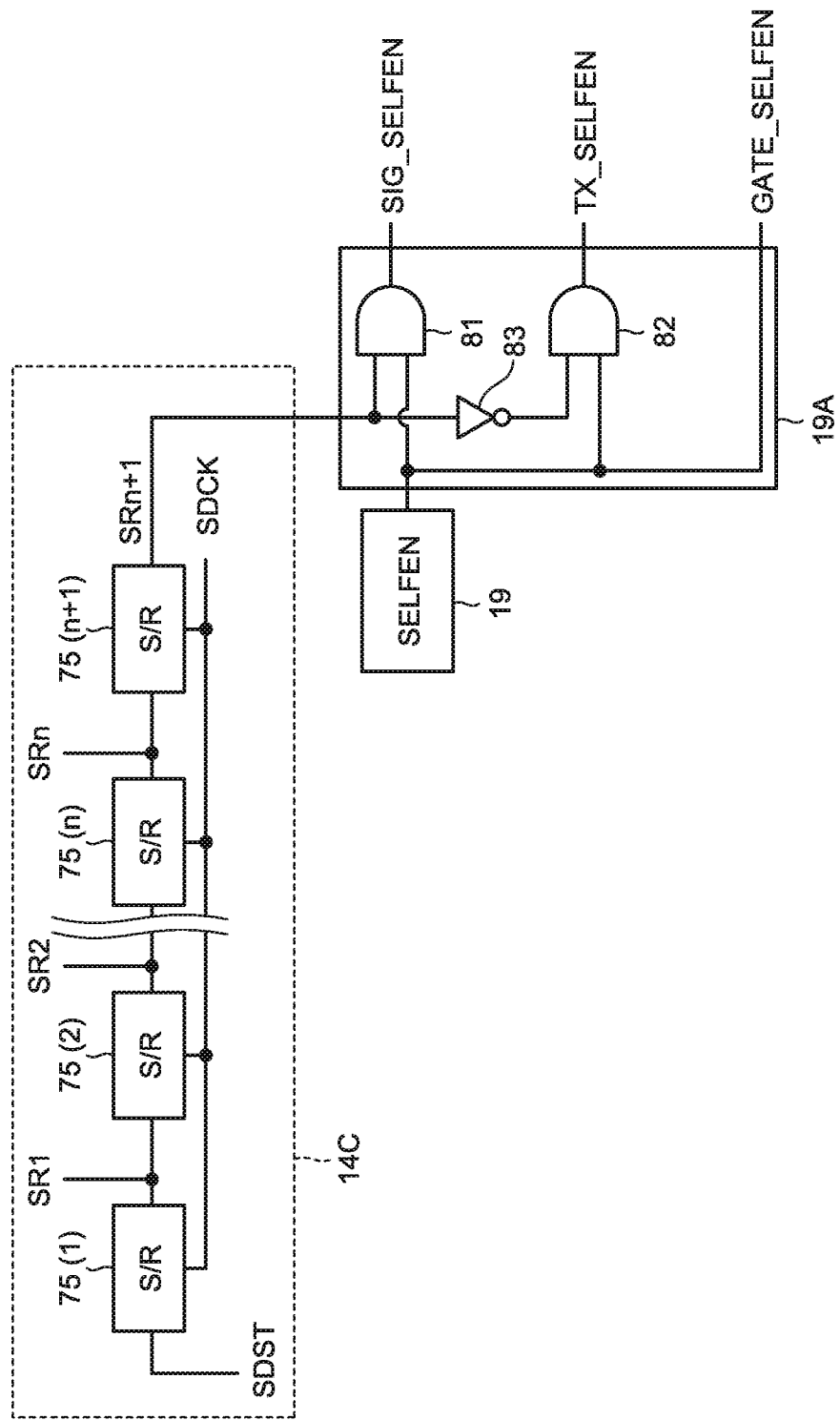
FIG. 28 is a diagram of a circuit that generates control signals.

FIG. 28 is a diagram of a circuit that generates the control signals. A control signal generator 19A generates the control signals SIG_SELFEN, TX_SELFEN, and GATE_SELFEN based on the control signal SELFEN supplied from the display IC 19.

The control signal generator 19A includes AND circuits 81 and 82 and an inverter 83. The scanner 14C includes the shift registers 75(1), 75(2), . . . , and 75(*n*) provided corresponding to the respective first electrodes COML and a shift register 75(*n*+1) provided corresponding to the control signal generator 19A. The shift register 75(*n*+1) supplies scanning signals SRn+1 to the control signal generator 19A.

The AND circuit 81 calculates a logical product (AND) of the control signal SELFEN and the scanning signal SRn+1 and outputs the obtained signal as the control signal SIG_SELFEN. In other words, the control signal SIG_SELFEN is a high-level voltage signal when the control signal SELFEN is at a high-level voltage and when the scanning signal SRn+1 is at a high-level voltage. The control signal SIG_SELFEN is a low-level voltage signal when at least one of the control signal SELFEN and the scanning signal SRn+1 is at a low-level voltage.

The inverter 83 supplies a signal obtained by inverting the voltage level of the scanning signal SRn+1 to the AND circuit 82. The AND circuit 82 calculates a logical product (AND) of the control signal SELFEN and the scanning signal SRn+1 the voltage of which is inverted and outputs the obtained signal as the control signal TX_SELFEN. In other words, the control signal TX_SELFEN is a high-level voltage signal when the control signal SELFEN is at a high-level voltage and when the scanning signal SRn+1 is at a low-level voltage. The control signal TX_SELFEN is a low-level voltage signal when the control signal SELFEN is at a low-level voltage or when the scanning signal SRn+1 is at a high-level voltage.

The control signal generator 19A outputs the same signal as the control signal SELFEN as the control signal GATE_SELFEN. With this circuit configuration, the control signal generator 19A can generate the control signals SIG_SELFEN, TX_SELFEN, and GATE_SELFEN based on the control signal SELFEN and the scanning signal SRn+1. The control signal generator 19A illustrated in FIG. 28 is given by way of example only, and the circuit configuration may be appropriately modified.

Figure 29:
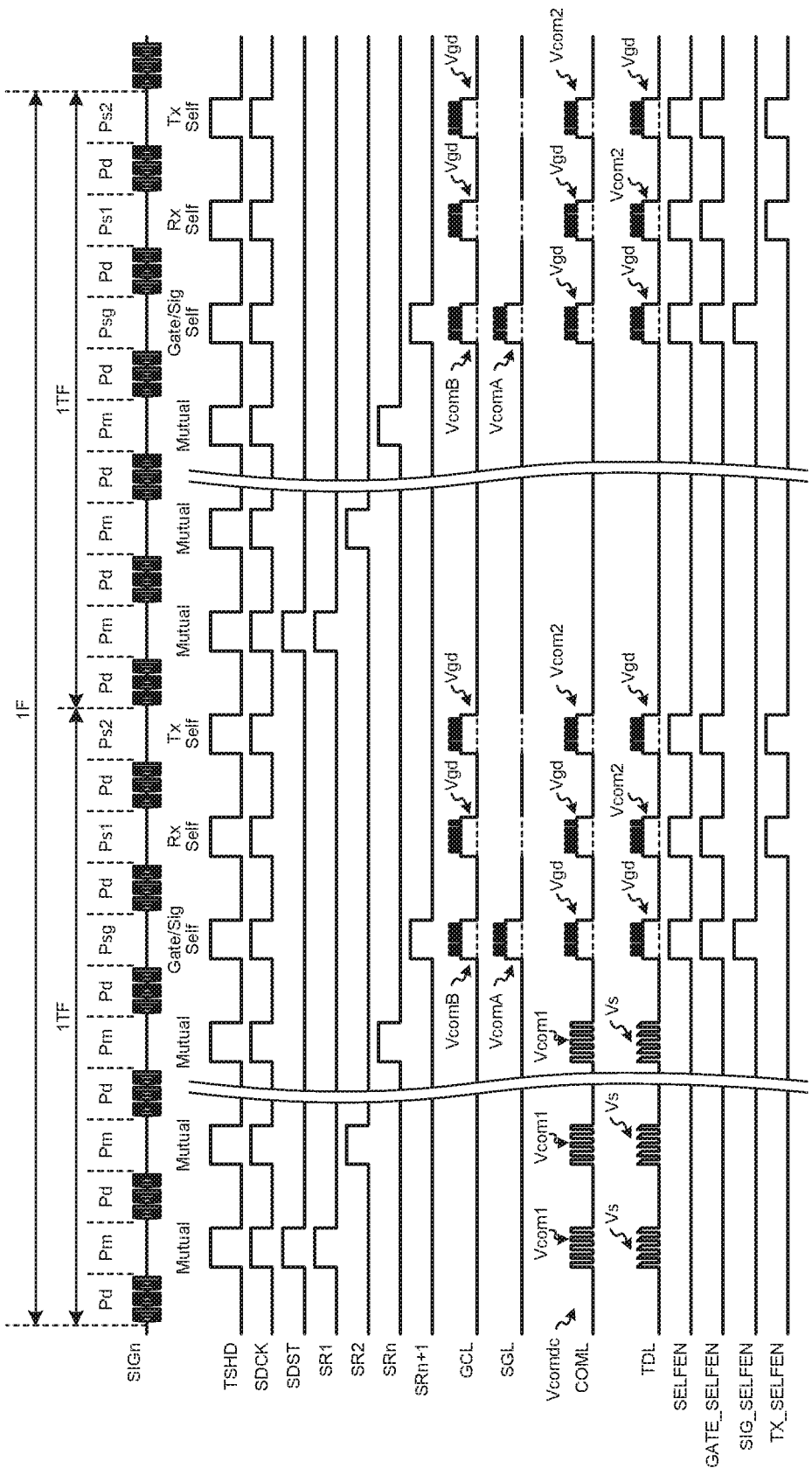
FIG. 29 is a timing waveform chart of an exemplary operation performed by the display device according to the first embodiment.

The following describes an exemplary operation performed by the display device 1 according to the present embodiment. FIG. 29 is a timing waveform chart of an exemplary operation performed by the display device according to the first embodiment.

The display device 1 performs a touch detection operation (detection period) and a display operation (display period) in a time-division manner. The display device 1 may perform the touch detection operation and the display operation in any division manner. The following describes a method for performing touch detection and display in a time-division manner in one frame period 1F of the display panel 10, that is, in a time required to display video information on one screen, for example. In the example illustrated in FIG. 29, two touch frame periods 1TF are included in one frame period 1F. One touch frame period 1TF is a period required to perform a detection operation on one detection screen.

As illustrated in FIG. 29, a plurality of display periods Pd and a plurality of detection periods Pm, Psg, Ps1, and Ps2 are alternately arranged. The display periods Pd and the detection periods Pm, Psg, Ps1, and Ps2 are switched based on control signals TSHD, SELFEN, and other control signals supplied from the controller 11 (refer to FIG. 1).

When the control signal TSHD is at a low-level voltage, that is, in the display periods Pd, the display operation is performed. In the display periods Pd, the controller 11 outputs the control signals to the gate driver 12 and the source driver 13 (refer to FIG. 1). The gate driver 12 applies the scanning signals Vscan to the switching elements Tr via the gate lines GCL. The source driver 13 supplies the pixel signals Vpix to the pixels Pix via the signal lines SGL. The display device 1 thus performs the image display operation.

The first electrodes COML according to the present embodiment also serve as the common electrodes of the display panel 10. As illustrated in FIG. 29, the first driver 14A included in the display IC 19 supplies the drive signals Vcomdc serving as a common potential for display drive to all the first electrodes COML in the display region Ad in the display periods Pd. The second electrodes TDL are supplied with no voltage signal and made into a floating state where their electric potential is not fixed.

In the detection periods Pm, Psg, Ps1, and Ps2, the control signal TSHD is at a high-level voltage, and the detection operations in the first detection mode, the second detection mode, and the third detection mode are performed. In the detection period Pm, the display IC 19 makes the control signal TSHD at a high-level voltage and makes the control signal SELFEN at a low-level voltage. The display device 1 thus performs touch detection in the first detection mode in the detection period Pm.

In the first detection mode, the scanner 14C (refer to FIGS. 25 and 26) selects one first electrode COML as a target to be driven in each detection period Pm. Specifically, the scanner 14C sequentially outputs the scanning signals SR1, SR2, . . . , and SRn to select the first electrodes COML to be driven. The display IC 19 sequentially supplies the drive signals Vcom1 to the first electrodes COML to be driven. In other words, the first driver 14A supplies the drive signals Vcom1 (fourth drive signal) to the first electrodes COML. The second electrodes TDL output the sensor output signals Vs depending on a change in the capacitance between the first electrodes COML and the second electrodes TDL to the voltage detectors DET (refer to FIG. 3). The display device 1 thus detects a touch of the detected object OBJ in contact with or in proximity to the display region Ad.

In the detection period Psg, the display IC 19 makes the control signal TSHD at a high-level voltage and makes the control signal SELFEN at a high-level voltage. The control signal generator 19A (refer to FIG. 28) generates the control signals SIG_SELFEN, TX_SELFEN, and GATE_SELFEN based on the control signal SELFEN and the scanning signal SRn+1. In the detection period Psg, the control signals GATE_SELFEN and SIG_SELFEN are at a high-level voltage, and the control signal TX_SELFEN is at a low-level voltage. The display device 1 thus performs the touch detection in the third detection mode in the detection period Psg.

In the detection operation in the third detection mode, the detection IC 18 supplies the drive signals VcomB to the gate line blocks BKG (refer to FIG. 27) each including a plurality of gate lines GCL. Simultaneously, the detection IC 18 supplies the drive signals VcomA to the signal line blocks BKS (refer to FIG. 25) each including a plurality of signal lines SGL. In other words, the second driver 14B supplies the drive signals VcomA and VcomB (first drive signal) to the gate lines GCL and the signal lines SGL simultaneously. The gate line blocks BKG and the signal line blocks BKS output the sensor output signals depending on a change in their capacitance to the voltage detectors DET. The display device 1 thus can detect the position of the detected object OBJ based on the capacitance change caused by the force applied by the detected object OBJ to the detection surface 101a.

The detection IC 18 supplies the guard signals Vgd to the first electrodes COML and the second electrodes TDL. As a result, the first electrodes COML and the second electrodes TDL serve as guard electrodes. Even when water adheres to the detection surface 101a, the display device 1 can suppress a change in the capacitance of the signal lines SGL and the gate lines GCL caused by the water.

As illustrated in FIGS. 25 and 27, the sets of signal lines SGL are collectively coupled to the respective output terminals T1, T2, . . . , and Tn, and the sets of gate lines GCL are collectively coupled to the respective output terminals G1, G2, . . . , and Gn. With this configuration, the detection IC 18 can drive the signal lines SGL and the gate lines GCL simultaneously in the same detection period Psg.

In the detection periods Ps1 and Ps2, the display IC 19 makes the control signal TSHD at a high-level voltage and makes the control signal SELFEN at a high-level voltage. In the detection periods Ps1 and Ps2, the scanning signal SRn+1 is at a low-level voltage. The control signal generator 19A generates the control signals TX_SELFEN and GATE_SELFEN at a high-level voltage and the control signal SIG_SELFEN at a low-level voltage based on the control signal SELFEN and the scanning signal SRn+1. The display device 1 thus performs the touch detection in the second detection mode in the detection periods Ps1 and Ps2.

In the detection periods Ps1 and Ps2, the detection controller 11A (refer to FIG. 1) included in the detection IC 18 mainly performs self-capacitance touch detection. In the detection period Ps1, the detection IC 18 supplies the drive signals Vcom2 to the second electrodes TDL. In other words, the second driver 14B supplies the drive signals Vcom2 (third drive signal) to the second electrodes TDL. The second electrodes TDL output the sensor output signals depending on a change in the capacitance of the second electrodes TDL to the voltage detectors DET. In the detection period Ps1, the display device 1 calculates the position of the detected object OBJ in the array direction of the second electrodes TDL, that is, in the second direction Dy (refer to FIG. 11).

In the detection period Ps1, the detection IC 18 supplies the guard signals Vgd to the first electrodes COML and the gate lines GCL. The guard signals Vgd are voltage signals synchronized with and having the same electric potential as that of the drive signals Vcom2. As a result, the first electrodes COML and the gate lines GCL are driven at the same electric potential as that of the second electrodes TDL. This mechanism can reduce stray capacitance generated between the switching elements Tr and the various kinds of wiring provided to the first substrate 21 and the second electrodes TDL. The detection IC 18 supplies no voltage signal to the signal lines SGL. As a result, the signal lines SGL are made into a floating state where their electric potential is not fixed.

In the detection period Ps2, the detection IC 18 supplies the drive signals Vcom2 to the first electrodes COML. In other words, the second driver 14B supplies the drive signals Vcom2 (second drive signal) to the first electrodes COML. The first electrodes COML output the sensor output signals depending on a change in the capacitance of the first electrodes COML to the voltage detectors DET. In the detection period Ps2, the display device 1 calculates the position of the detected object OBJ in the array direction of the first electrodes COML, that is, in the first direction Dx (refer to FIG. 11). As described above, the first electrodes COML serve as detection electrodes in the self-capacitance touch detection.

In the detection period Ps2, the detection IC 18 supplies the guard signals Vgd to the second electrodes TDL and the gate lines GCL. As a result, the second electrodes TDL and the gate lines GCL are driven at the same electric potential as that of the first electrodes COML, thereby reducing stray capacitance in the first electrodes COML. The signal lines SGL are supplied with no voltage and made into a floating state where their electric potential is not fixed.

The exemplary operation illustrated in FIG. 29 is given by way of example only and may be appropriately modified. The lengths (widths) of the display period Pd and the detection periods Pm, Psg, Ps1, and Ps2 are schematic ones, for example, and may be equal to or different from one another. The order of the detection periods Pm, Psg, Ps1, and Ps2 may be appropriately changed. While two touch frame periods 1TF are included in one frame period 1F, one or three or more touch frame periods 1TF may be included in one frame period 1F. Any one or more of the detection periods Pm, Psg, Ps1, and Ps2 are not necessarily included in one touch frame period 1TF.

Figure 30:
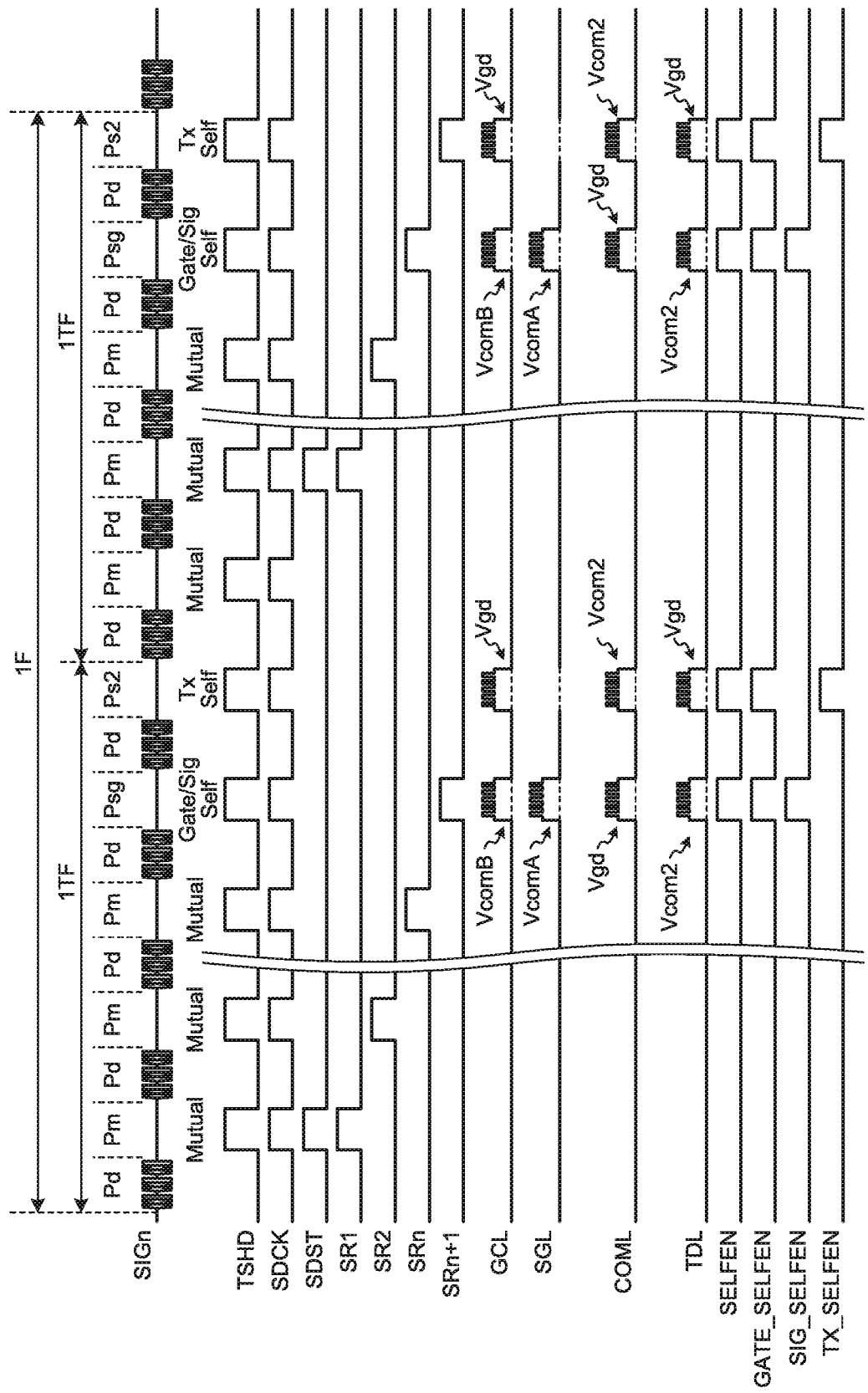
FIG. 30 is a timing waveform chart of an exemplary operation performed by the display device according to a modification of the first embodiment.

FIG. 30 is a timing waveform chart of an exemplary operation performed by the display device according to a modification of the first embodiment. In the detection period Psg, the present modification performs the detection operation in the second detection mode simultaneously with the detection operation in the third detection mode. In other words, the timing waveform chart illustrated in FIG. 30 does not include the detection period Ps1 included in FIG. 29.

Specifically, in the detection period Psg, the detection IC 18 supplies the drive signals VcomB to the gate line blocks BKG (refer to FIG. 27) each including a plurality of gate lines GCL. Simultaneously, the detection IC 18 supplies the drive signals VcomA to the signal line blocks BKS (refer to FIG. 25) each including a plurality of signal lines SGL. Furthermore, the detection IC 18 supplies the drive signals Vcom2 to the second electrodes TDL. In other words, the second driver 14B supplies the drive signals Vcom2 (third drive signal) to the second electrodes TDL in the same period as the detection period Psg when the second driver 14B supplies the drive signals VcomA and VcomB (first drive signal) to at least one of the gate lines GCL and the signal lines SGL. The gate line blocks BKG, the signal line blocks BKS, and the second electrodes TDL output the sensor output signals depending on a change in their capacitance to the voltage detectors DET (refer to FIG. 3). The present modification thus can detect the detected object OBJ based on a change in the capacitance between the second electrodes TDL and the detected object OBJ. At the same time, the present modification can detect the detected object OBJ based on the capacitance change caused by the force applied by the detected object OBJ to the detection surface 101a.

The detection IC 18 according to the present modification supplies the guard signals Vgd to the first electrodes COML. As a result, the first electrodes COML serve as guard signals. As illustrated in FIG. 14, the second electrodes TDL are disposed closer to the detection surface 101a than the first electrodes COML. The signal lines SGL and the gate lines GCL are disposed opposite to the second electrodes TDL across the first electrodes COML. The first electrodes COML serving as guard electrodes can suppress a change in the capacitance of the signal lines SGL and the gate lines GCL even when the capacitance in the second electrodes TDL changes. Consequently, the present modification can perform the detection operation in the second detection mode with the second electrodes TDL simultaneously with the detection operation in the third detection mode with the signal lines SGL and the gate lines GCL.

Second Embodiment

Figure 31:
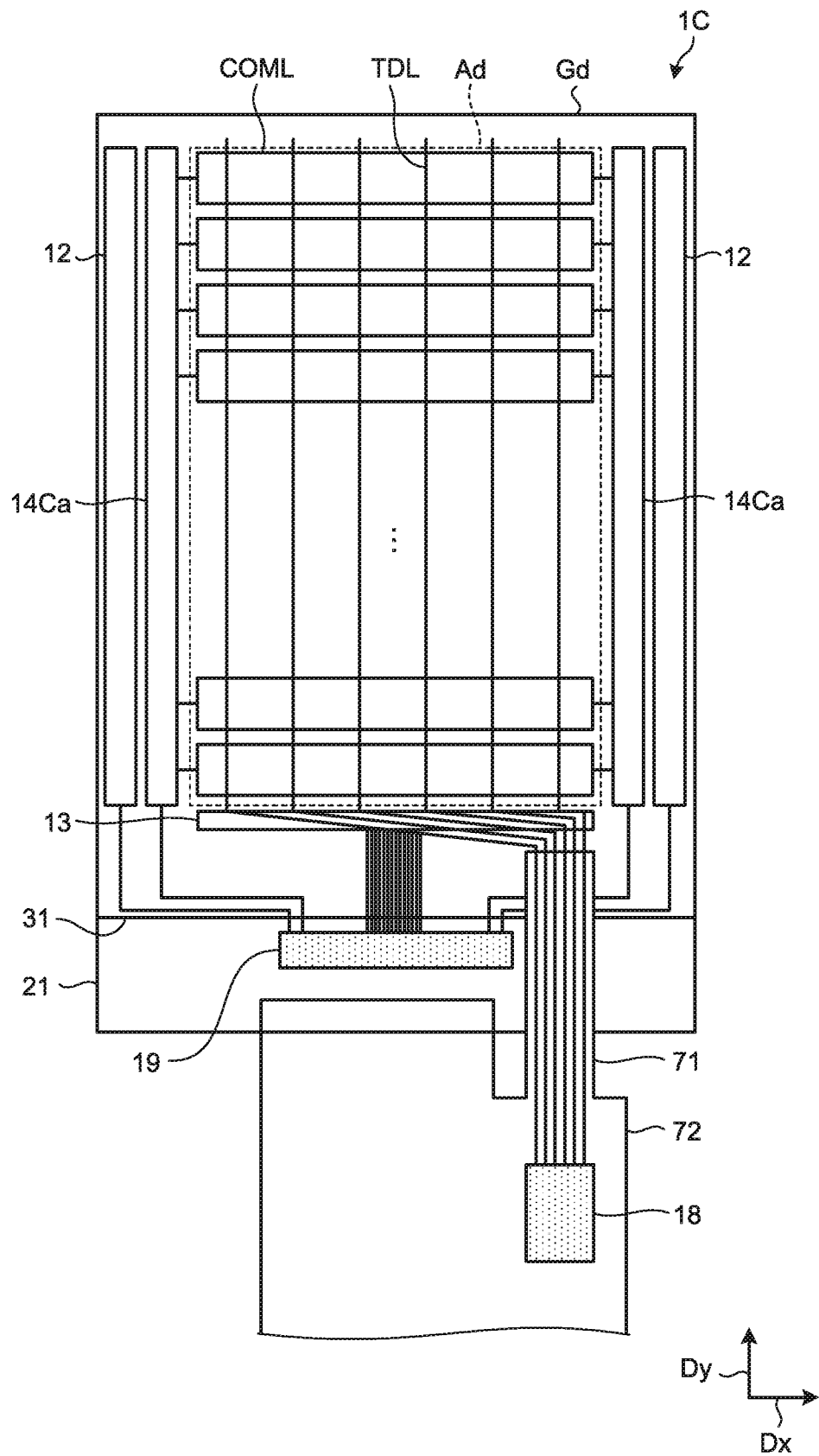
FIG. 31 is a plan view schematically illustrating the display device according to a second embodiment.

FIG. 31 is a plan view schematically illustrating the display device according to a second embodiment. As illustrated in FIG. 31, the first electrodes COML in a display device 1C according to the present embodiment extend in the first direction Dx and a plurality of the first electrodes COML are arrayed in the second direction Dy. In other words, the first electrodes COML extend along the short side of the display region Ad and a plurality of the first electrodes COML are arrayed along the long side thereof. The first electrodes COML have a rectangular shape with their long side extending in the first direction Dx.

The second electrodes TDL extend in the second direction Dy and a plurality of the second electrodes TDL are arrayed in the first direction Dx. The second electrodes TDL intersect the first electrodes COML in planar view. Capacitance is generated at the intersections of the first electrodes COML and the second electrodes TDL.

The first electrodes COML intersect the signal lines SGL in planar view and extend along the gate lines GCL. The second electrodes TDL intersect the gate lines GCL in planar view and extend along the signal lines SGL.

Circuits, such as scanners 14Ca, are provided to the peripheral region Gd at the same position where the gate drivers 12 are provided. Specifically, as illustrated in FIG. 31, for example, the gate drivers 12 are provided on the long sides of the peripheral region Gd, and the circuits, such as the scanners 14Ca, are provided on the long sides of the peripheral region Gd.

The present embodiment is different from the first embodiment in the relation between the positions of the first electrodes COML and the second electrodes TDL and those of the signal lines SGL and the gate lines GCL. The display device 1C according to the present embodiment can also perform the detection operation in the first detection mode, the second detection mode, and the third detection mode.

Figure 32:
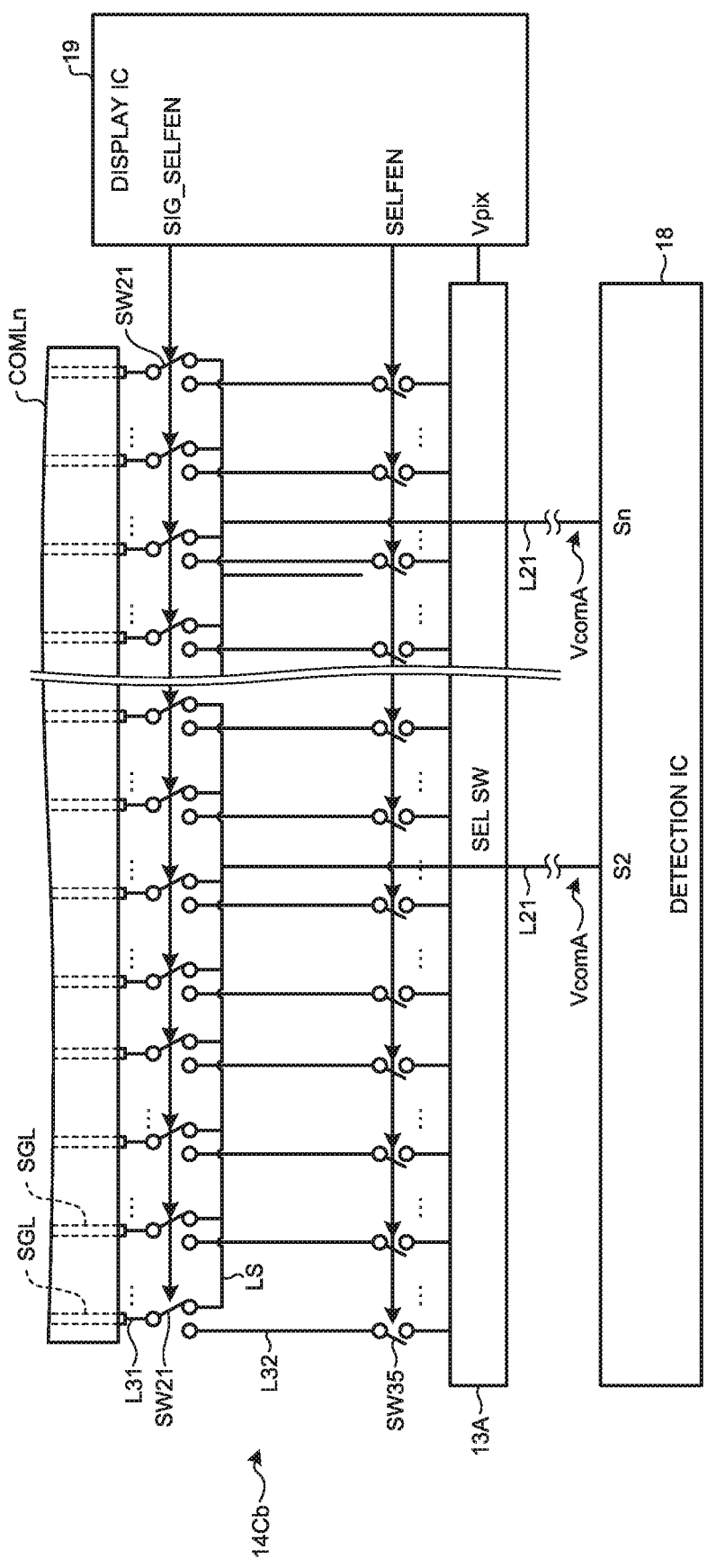
FIG. 32 is a circuit diagram for explaining the coupling configuration of the signal lines and the detection IC in the third detection mode.
Figure 33:
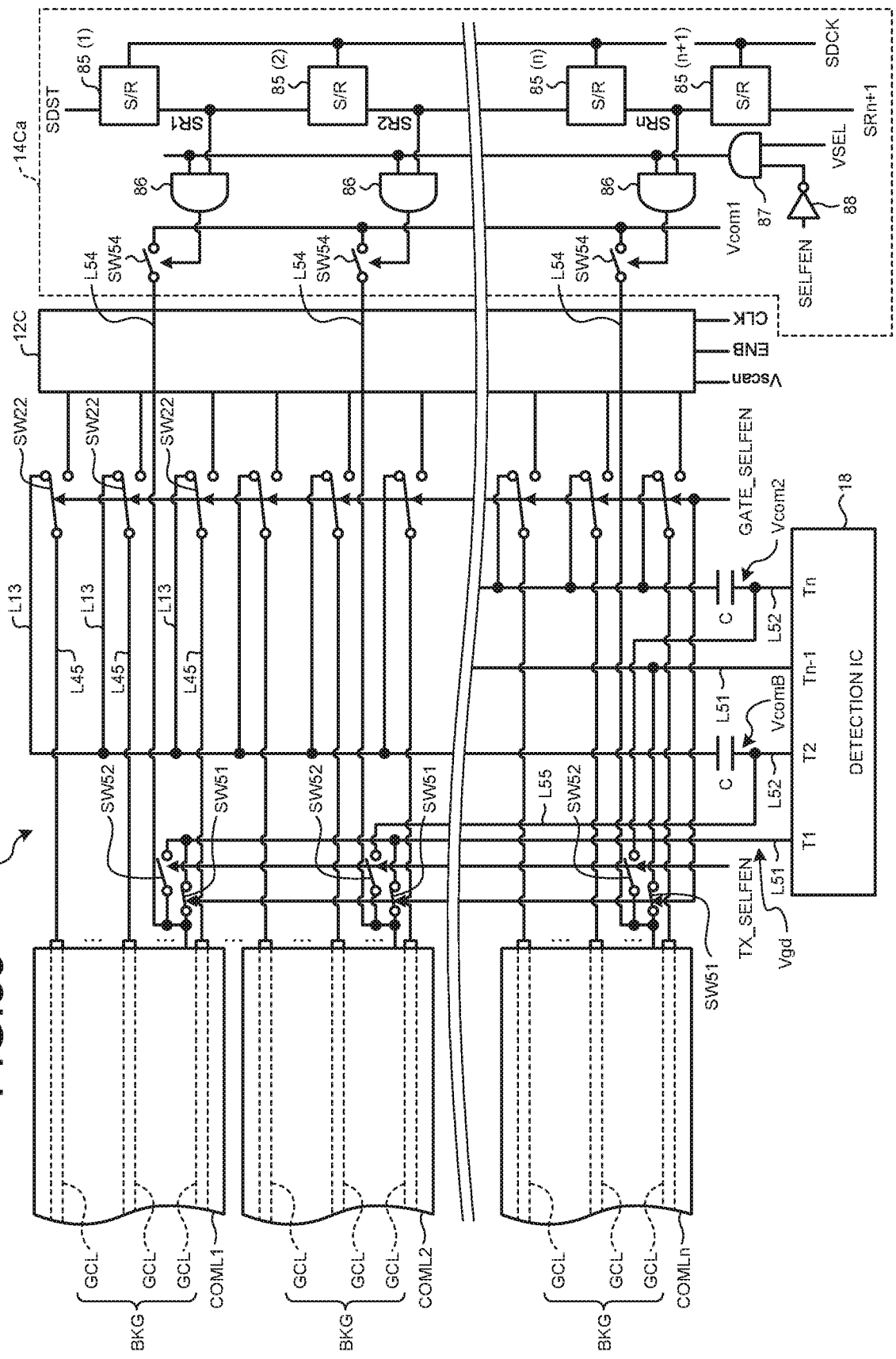
FIG. 33 is a circuit diagram for explaining an exemplary operation performed by the scanner in the third detection mode.
Figure 34:
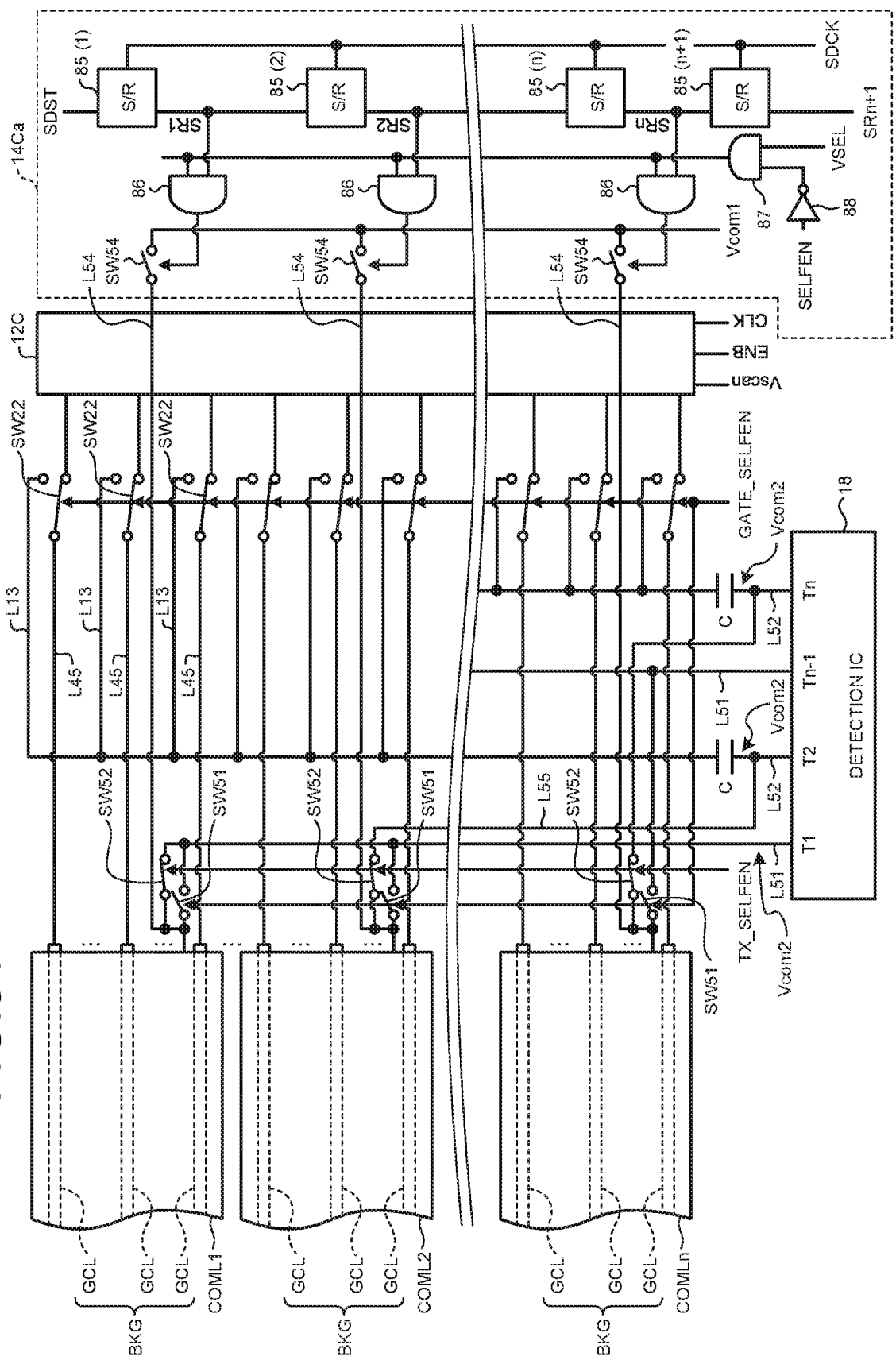
FIG. 34 is a circuit diagram for explaining an exemplary operation performed by the scanner in the second detection mode.

FIG. 32 is a circuit diagram for explaining the coupling configuration of the signal lines and the detection IC in the third detection mode. FIG. 33 is a circuit diagram for explaining an exemplary operation performed by the scanner in the third detection mode. FIG. 34 is a circuit diagram for explaining an exemplary operation performed by the scanner in the second detection mode.

As illustrated in FIG. 32, a signal line scanner 14Cb includes the wires L31, the switches SW21, and the wires LS. The wires L31 are coupled to the respective signal lines SGL. The wires LS each couple a plurality of switches SW21. The signal line scanner 14Cb selects signal lines SGL and couples the signal lines SGL to be driven to the detection IC 18. The signal line scanner 14Cb is not coupled to the first electrodes COML.

In the third detection mode, the display IC 19 supplies the control signals SIG_SELFEN at a high-level voltage to the switches SW21. As a result, the switches SW21 are turned on. A plurality of signal lines SGL are coupled to one wire LS via the respective switches SW21. The sets of signal lines SGL are coupled to respective output terminals S2, . . . , and Sn of the detection IC 18 via the wires L31, the switches SW21, the respective wires LS, and the respective wires L21.

With this coupling configuration, the detection IC 18 supplies the drive signals VcomA to the signal lines SGL from the output terminals S2, . . . , and Sn in the third detection mode. The sensor output signals depending on a change in the capacitance between the signal lines SGL and the conductor 104 (not illustrated in FIG. 32) are supplied to the voltage detectors DET via the output terminals S2, . . . , and Sn. The display device 1C thus performs the detection operation in the third detection mode with the signal lines SGL.

In the display operation and the detection operation in the first detection mode and the second detection mode, the display IC 19 supplies the control signals SIG_SELFEN at a low-level voltage to the switches SW21. As a result, the switches SW21 are turned off to cut off the coupling between the signal lines SGL and the detection IC 18.

In the display operation, the signal line selection circuit 13A sequentially selects the signal lines SGL. The display IC 19 supplies the pixel signals Vpix to the selected signal lines SGL via the signal line selection circuit 13A. The display device 1C thus performs the image display operation.

As illustrated in FIGS. 33 and 34, the scanner 14Ca includes shift registers 85(1), 85(2), 85(n), and 85(n+1), AND circuits 86 and 87, and an inverter 88. The shift registers 85(1), 85(2), and 85(n) and the AND circuits 86 are provided corresponding to the first electrodes COML1, COML2, and COMLn, respectively. The shift register 85(n+1) is provided corresponding to a control signal generator 19Aa (refer to FIG. 35). In the following description, the shift registers 85(1), 85(2), 85(n), and 85(n+1) are referred to as the shift registers 85 when they need not be distinguished from one another.

In the first detection mode, the display IC 19 supplies the scanning start signals SDST to the shift registers 85. The display IC 19 also supplies the clock signals SDCK to the shift registers 85. The shift registers 85 start scanning in response to the scanning start signals SDST serving as a trigger. The shift register 85 sequentially supplies the scanning signals SR1, SR2, . . . , and SRn synchronized with the clock signals SDCK to the respective AND circuits 86.

The display IC 19 supplies the selection signals VSEL to the AND circuit 87. The display IC 19 also supplies the control signals SELFEN to the inverter 88. The inverter 88 supplies a signal obtained by inverting the voltage level of the control signal SELFEN to the AND circuit 87. The AND circuit 87 calculates a logical product (AND) of the selection signal VSEL and the signal obtained by inverting the voltage level of the control signal SELFEN. The signal obtained by the AND circuit 87 is supplied to the AND circuits 86.

The AND circuits 86 calculate logical products (AND) of the scanning signals SR1, SR2, . . . , and SRn and the signal supplied from the AND circuit 87 and supply the obtained signals to respective switches SW54. The operations of the switches SW54 are controlled based on the signals supplied from the respective AND circuits 86.

If the scanning signal SR and the selection signal VSEL are high-level voltage signals, and the control signal SELFEN is a low-level voltage signal, the switch SW54 is turned on. As a result, the first electrodes COML are sequentially selected by the respective shift registers 85. The display IC 19 supplies the drive signals Vcom1 to the first electrode COML to be driven via a wire L54. If at least one of the scanning signal SR and the selection signal VSEL is a low-level voltage signal, the switch SW54 is turned off. As a result, the corresponding first electrode COML is not selected. The non-selected first electrode COML may be supplied with the drive signals Vcomdc serving as DC voltage signals.

With this configuration, the scanner 14Ca sequentially selects the first electrodes COML to be driven based on the scanning signals SR, the selection signals VSEL, and the control signals SELFEN in the first detection mode. The scanner 14Ca couples the first electrodes COML to be driven to the display IC 19. As a result, the drive signals Vcom1 are sequentially supplied to the first electrodes COML to be driven. The display device 1C thus performs mutual capacitance touch detection.

In the second detection mode by the self-capacitance method, as illustrated in FIG. 34, the display IC 19 supplies the control signals TX_SELFEN at a high-level voltage to switches SW52. As a result, the switches SW52 are turned on to cut off the coupling between the first electrodes COML. The first electrode COML1 is coupled to the detection IC 18 via the switch SW52 and a wire L51. The first electrode COML2 is coupled to the detection IC 18 via the switch SW52, a wire L55, and a wire L52.

The display IC 19 supplies the control signals GATE_SELFEN at a low-level voltage to switches SW22 and SW51. As a result, the switches SW51 are turned off to cut off the coupling between the first electrodes COML. Consequently, the first electrodes COML are coupled to the output terminals T1, T2, . . . , and Tn in a one-to-one manner. The operations of the switches SW22 each couple the wire L45 coupled to the gate line GCL to the shift register 12C. As a result, a plurality of gate lines GCL are not electrically coupled to each other nor to the detection IC 18. In other words, a gate line scanner 14Cc includes the switches SW22 (first switch) and the switches SW51 (second switch). The switch SW22 couples the ends of a plurality of gate lines GCL on the same side. The switch SW51 couples the ends of a plurality of first electrodes COML on the same side.

With the coupling configuration described above, the detection IC 18 supplies the drive signals Vcom2 to the first electrodes COML from the respective output terminals T1, T2, . . . , and Tn in the second detection mode. The sensor output signals depending on a change in the capacitance of the first electrodes COML are output to the voltage detectors DET via the output terminals T1, T2, . . . , and Tn. The display device 1C thus performs the detection operation in the second detection mode with the first electrodes COML.

The shift register 12C is the same as that illustrated in FIG. 27. In other words, the shift register 12C sequentially selects the gate lines GCL based on the clock signals CLK and the control signals ENB supplied from the display IC 19 in the display operation. The display IC 19 supplies the scanning signals Vscan to the selected gate lines GCL via the shift register 12C. The display device 1C thus performs the image display operation in units of one horizontal line.

In the third detection mode by the self-capacitance method, as illustrated in FIG. 33, the display IC 19 supplies the control signals TX_SELFEN at a low-level voltage to the switches SW52. As a result, the switches SW52 are turned off. The display IC 19 supplies the control signals GATE_SELFEN at a high-level voltage to the switches SW51 and the switches SW22.

The operations of the switches SW51 couple the ends of a plurality of first electrodes COML on the same side. The first electrodes COML are collectively coupled to the output terminal T1 via the respective switches SW51 and the wire L51. The operations of the switches SW22 couple the ends of a plurality of gate lines GCL on the same side. The gate lines GCL are collectively coupled to the output terminal T2 via the respective wires L45, the respective switches SW22, the respective wires L13, and the wire L52. The gate line block BKG including the gate lines GCL serves as one detection electrode.

With the coupling configuration described above, the detection IC 18 supplies the guard signals Vgd to the first electrodes COML from the output terminal T1 in the third detection mode. Simultaneously, the detection IC 18 also supplies the drive signals VcomB to the gate lines GCL from the output terminal T2. In other words, the second driver 14B supplies the guard signals Vgd to the first electrodes COML coupled to one output terminal T1 (first output terminal). The second driver 14B also supplies the drive signals VcomB (first drive signal) to the gate lines GCL coupled to the output terminal T2 (second output terminal) different from the output terminal T1 (first output terminal). The sensor output signals depending on a change in the capacitance between the gate lines GCL and the conductor 104 (not illustrated in FIG. 33) are supplied to the voltage detector DET via the output terminal T2. The display device 1C thus performs the detection operation in the third detection mode with the signal lines SGL.

Figure 35:
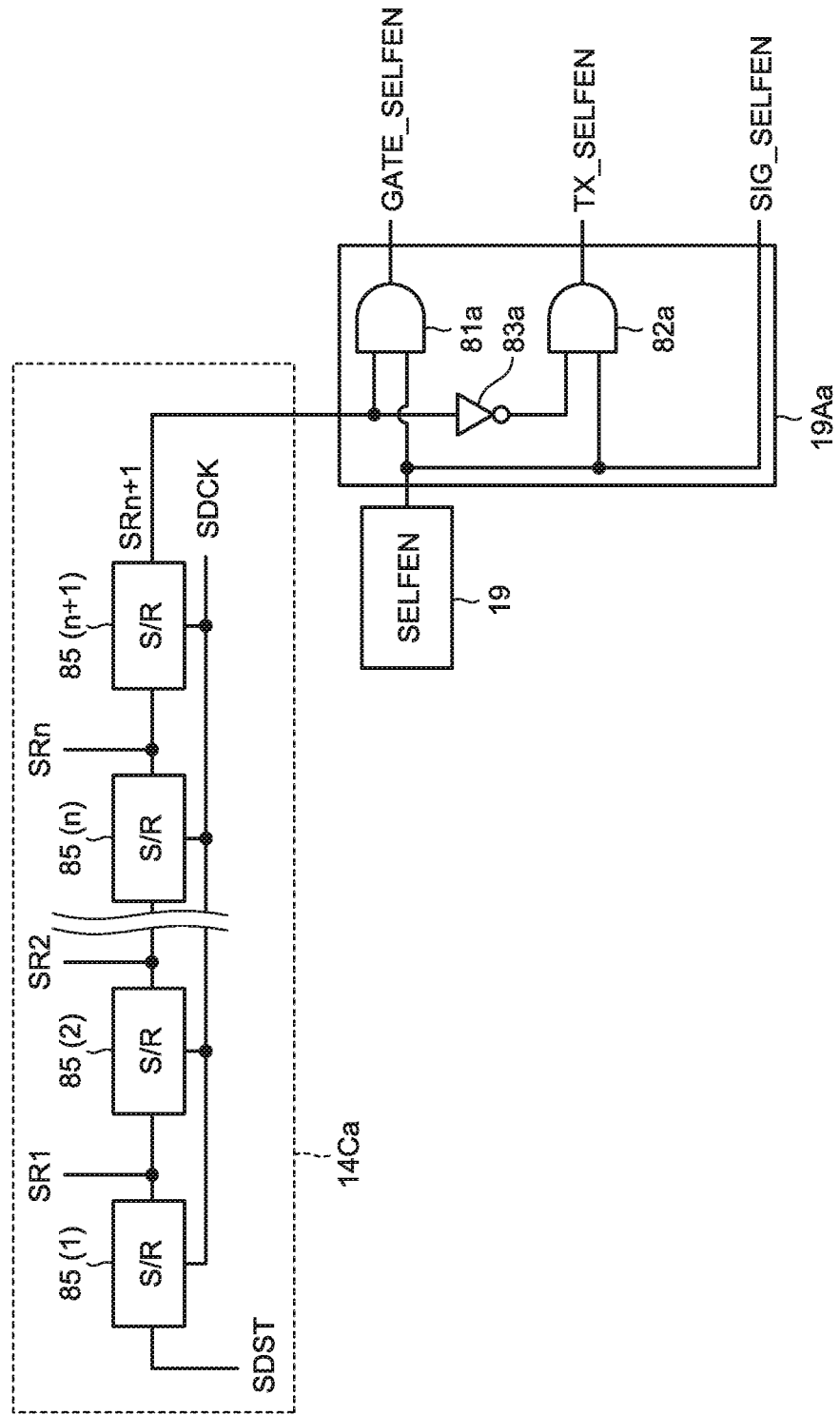
FIG. 35 is a diagram of a circuit that generates control signals according to the second embodiment.

FIG. 35 is a diagram of a circuit that generates control signals according to the second embodiment. The control signal generator 19Aa has a configuration similar to that of the control signal generator 19A illustrated in FIG. 28. The control signal generator 19Aa generates the control signals SIG_SELFEN, TX_SELFEN, and GATE_SELFEN based on the control signal SELFEN supplied from the display IC 19.

The control signal generator 19Aa includes AND circuits 81a and 82a and an inverter 83a. The shift register 85($n$+1) supplies the scanning signals SRn+1 to the control signal generator 19Aa.

The AND circuit 81a calculates a logical product (AND) of the control signal SELFEN and the scanning signal SRn+1 and outputs the obtained signal as the control signal GATE_SELFEN. In other words, the control signal GATE_SELFEN is a high-level voltage signal when the control signal SELFEN is at a high-level voltage and when the scanning signal SRn+1 is at a high-level voltage. The control signal GATE_SELFEN is a low-level voltage signal when at least one of the control signal SELFEN and the scanning signal SRn+1 is at a low-level voltage.

The inverter 83a supplies a signal obtained by inverting the voltage level of the scanning signal SRn+1 to the AND circuit 82a. The AND circuit 82a calculates a logical product (AND) of the control signal SELFEN and the scanning signal SRn+1 the voltage level of which is inverted and outputs the obtained signal as the control signal TX_SELFEN. In other words, the control signal TX_SELFEN is a high-level voltage signal when the control signal SELFEN is at a high-level voltage and when the scanning signal SRn+1 is at a low-level voltage. The control signal TX_SELFEN is a low-level voltage signal when the control signal SELFEN is at a low-level voltage or when the scanning signal SRn+1 is at a high-level voltage.

The control signal generator 19Aa outputs the same signal as the control signal SELFEN as the control signal SIG_SELFEN. With this circuit configuration, the control signal generator 19Aa can generate the control signals SIG_SELFEN, TX_SELFEN, and GATE_SELFEN based on the control signal SELFEN and the scanning signal SRn+1.

The configuration illustrated in FIG. 35 is given by way of example only, and the circuit configuration may be appropriately modified.

Figure 36:
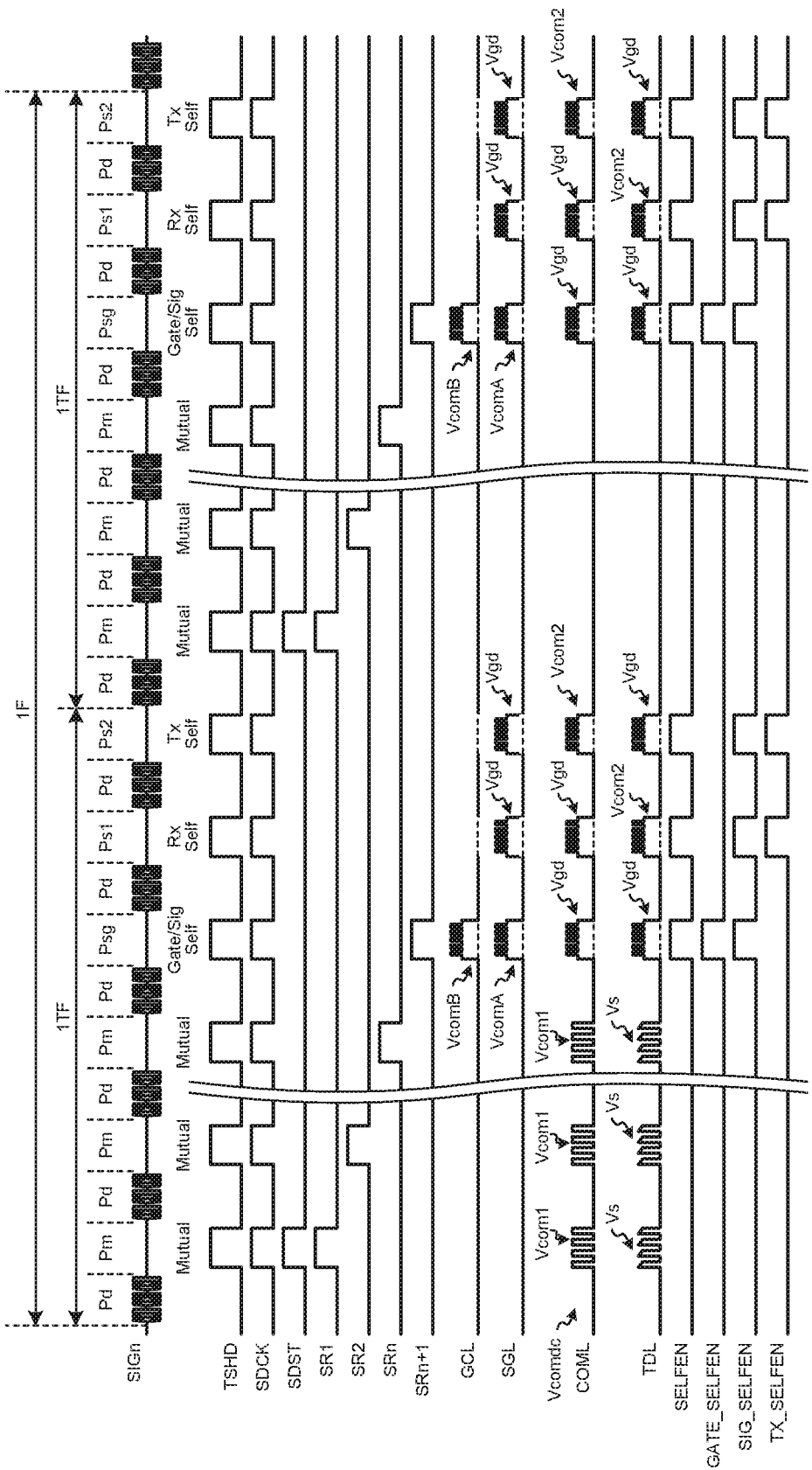
FIG. 36 is a timing waveform chart of an exemplary operation performed by the display device according to the second embodiment.

FIG. 36 is a timing waveform chart of an exemplary operation performed by the display device according to the second embodiment. Also in the present embodiment, a plurality of display periods Pd and a plurality of detection periods Pm, Psg, Ps1, and Ps2 are alternately arranged. Because the display operation performed in the display period Pd and the detection operations in the first detection mode and the third detection mode performed in the detection periods Pm and Psg, respectively, are the same as those in the example illustrated in FIG. 29, the explanation of the operations is omitted.

In the detection periods Ps1 and Ps2, the display IC 19 makes the control signal TSHD at a high-level voltage and makes the control signal SELFEN at a high-level voltage. In the detection periods Ps1 and Ps2, the scanning signal SRn+1 is at a low-level voltage. The control signal generator 19Aa generates the control signals TX_SELFEN and SIG_SELFEN at a high-level voltage and the control signal GATE_SELFEN at a low-level voltage based on the control signal SELFEN and the scanning signal SRn+1. In this case, the display device 1 performs the touch detection in the second detection mode.

In the detection period Ps1, the detection IC 18 supplies the drive signals Vcom2 to the second electrodes TDL. The second electrodes TDL output the sensor output signals depending on a change in the capacitance of the second electrodes TDL to the voltage detectors DET. In the detection period Ps1, the display device 1C calculates the position of the detected object OBJ in the array direction of the second electrodes TDL, that is, in the first direction Dx (refer to FIG. 31).

In the detection period Ps1, the detection IC 18 supplies the guard signals Vgd to the first electrodes COML and the signal lines SGL. The guard signals Vgd are voltage signals synchronized with and having the same electric potential as that of the drive signals Vcom2. As a result, the first electrodes COML and the signal lines SGL are driven at the same electric potential as that of the second electrodes TDL. This mechanism can reduce stray capacitance generated between the switching elements Tr and the various kinds of wiring provided to the first substrate 21 and the second electrodes TDL. The detection IC 18 supplies no voltage signal to the gate lines GCL. As a result, the gate lines GCL are made into a floating state where their electric potential is not fixed.

In the detection period Ps2, the detection IC 18 supplies the drive signals Vcom2 to the first electrodes COML. The first electrodes COML output the sensor output signals depending on a change in the capacitance of the first electrodes COML to the voltage detectors DET. In the detection period Ps2, the display device 1C calculates the position of the detected object OBJ in the array direction of the first electrodes COML, that is, in the second direction Dy (refer to FIG. 31).

In the detection period Ps2, the detection IC 18 supplies the guard signals Vgd to the second electrodes TDL and the signal lines SGL. As a result, the second electrodes TDL and the signal lines SGL are driven at the same electric potential as that of the first electrodes COML, thereby reducing stray capacitance in the first electrodes COML. The gate lines GCL are in a floating state where their electric potential is not fixed.

Third Embodiment

Figure 37:
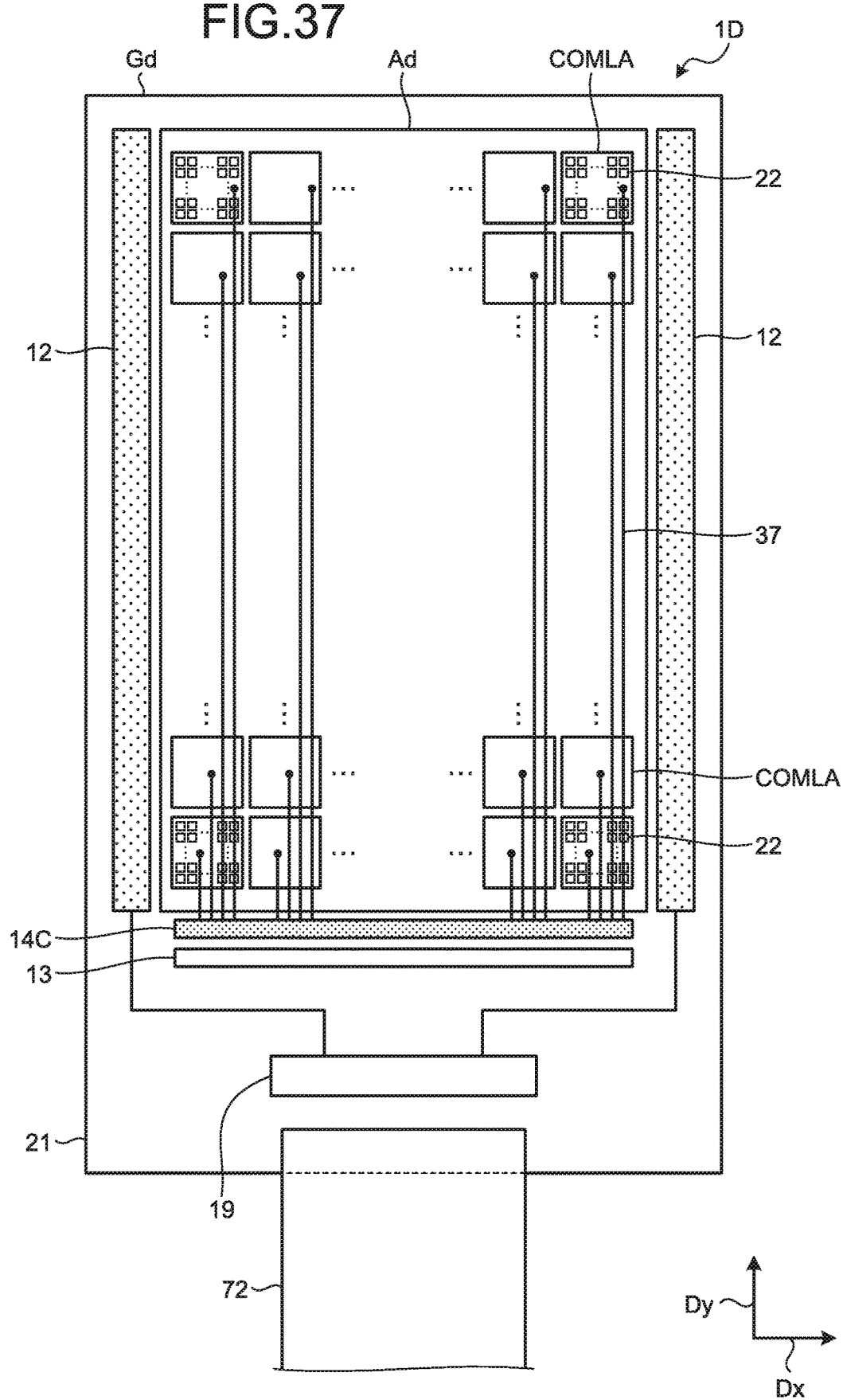
FIG. 37 is a plan view schematically illustrating the display device according to a third embodiment.

FIG. 37 is a plan view schematically illustrating the display device according to a third embodiment. As illustrated in FIG. 37, a plurality of first electrodes COMLA in a display device 1D according to the present embodiment are disposed in a matrix (row-column configuration) in the display region Ad of the first substrate 21. In other words, a plurality of the first electrodes COMLA are arrayed in the first direction Dx and the second direction Dy. A plurality of pixel electrodes 22 are arrayed overlapping each of the first electrodes COMLA. While part of the first electrodes COMLA and the pixel electrodes 22 are illustrated in FIG. 37, the first electrodes COMLA and the pixel electrodes 22 are disposed in a matrix (row-column configuration) in the whole area of the display region Ad.

The first electrodes COMLA are coupled to the scanner 14C via respective wires 37. In the display operation, the first driver 14A (refer to FIG. 1) supplies the display drive signals Vcomdc to all the first electrodes COMLA via the scanner 14C.

In the touch detection in the second detection mode, the second driver 14B (refer to FIG. 1) simultaneously or sequentially supplies the drive signals Vcom2 to the first electrodes COMLA. The first electrodes COMLA output the sensor output signals depending on a change in the capacitance of the first electrodes COMLA to the voltage detectors DET. Based on the sensor output signals from the first electrodes COMLA, the display device 1D performs touch detection on the touch detection surface. In other words, the first electrodes COMLA serve not only as common electrodes in the display operation but also as detection electrodes in the touch detection in the second detection mode by the self-capacitance method.

Also in the present embodiment, the signal lines SGL extend in the second direction Dy and a plurality of the signal lines SGL are arrayed in the first direction Dx similarly to the example illustrated in FIG. 12. The gate lines GCL extend in the first direction Dx and a plurality of the gate lines GCL are arrayed in the second direction Dy. The signal lines SGL and the gate lines GCL are coupled to the switching elements Tr. Similarly to the exemplary operation illustrated in FIG. 14, the second driver 14B supplies the drive signals VcomA to the signal lines SGL in the third detection mode. The second driver 14B supplies the drive signals VcomB to the gate lines GCL simultaneously or in a time-division manner. With this configuration, the display device 1D can detect the position of the detected object OBJ based on a change in the capacitance between the signal lines SGL and the conductor 104 and a change in the capacitance between the gate lines GCL and the conductor 104. The second driver 14B supplies the guard signals Vgd to the first electrodes COMLA.

The present embodiment includes no second electrode TDL in the counter substrate 3 (refer to FIG. 9). In other words, the display device 1D does not perform touch detection in the first detection mode but performs touch detection in the second detection mode and the third detection mode.

The wires 37 are provided to a layer different from that of the first electrodes COMLA with an insulating layer (not illustrated) interposed therebetween. The wires 37 are provided overlapping the first electrodes COMLA in planar view. The configuration is not limited thereto, and the wires 37 may be provided to the same layer as that of the first electrodes COMLA. In this case, the wires 37 pass between the adjacent first electrodes COMLA and are coupled to the scanner 14C.

Figure 38:
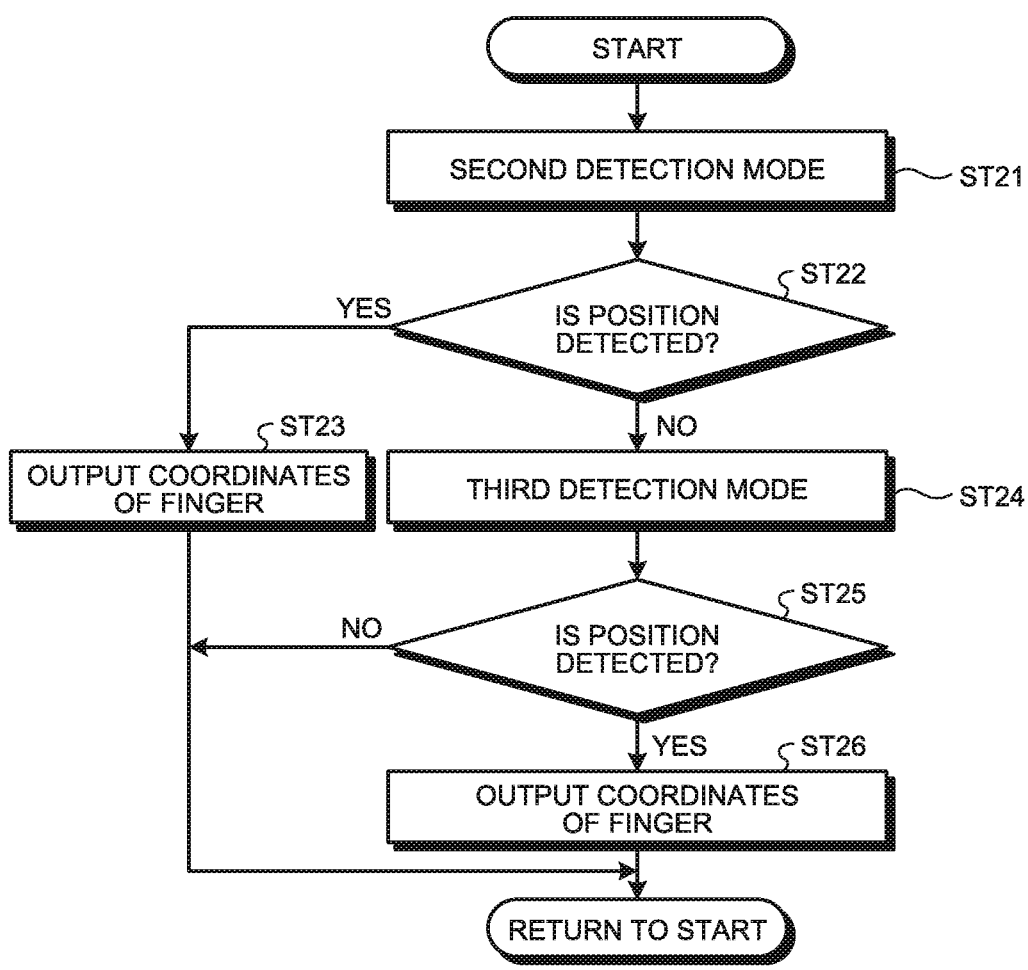
FIG. 38 is a flowchart of an exemplary operation performed by the display device according to the third embodiment.

FIG. 38 is a flowchart of an exemplary operation performed by the display device according to the third embodiment. As described above, the display device 1D according to the present embodiment has two touch detection modes, that is, the second detection mode and the third detection mode. The controller 11 (refer to FIG. 1) performs touch detection in the second detection mode first (Step ST21). In the touch detection in the second detection mode, the display device 1D detects a finger based on a change in the capacitance of the first electrodes COMLA by the self-capacitance method.

The signal processor 44 of the detection device 40 determines whether the position of a finger is detected (Step ST22). If the signal processor 44 detects the position of a finger (Yes at Step ST22), the coordinate extractor 45 (refer to FIG. 1) outputs the coordinates of the finger (Step ST23). The coordinate extractor 45 calculates the touch panel coordinates of the position where the finger is in contact with or in proximity to the detection surface 101a and outputs them as the output signals Vout. The process performed by the controller 11 is then returned to START, and the controller 11 repeats the touch detection in the second detection mode.

If the signal processor 44 fails to detect the position of a finger in the touch detection in the second detection mode (No at Step ST22), the controller 11 determines that water adheres to the detection surface 101a or that the display device 1D is submerged in water and performs touch detection in the third detection mode (Step ST24). The signal processor 44 determines whether the position of a finger is detected (Step ST25).

If the signal processor 44 fails to detect the position of a finger in the touch detection in the third detection mode (No at Step ST25), the controller 11 determines that no finger is in contact with the detection surface 101a. The process performed by the controller 11 is then returned to START, and the controller 11 repeats the touch detection in the second detection mode.

If the signal processor 44 detects the position of a finger (Yes at Step ST25), the coordinate extractor 45 calculates the touch panel coordinates of the position where the finger is in contact with the detection surface 101a and outputs them as the output signals Vout (Step ST26). The process performed by the controller 11 is then returned to START, and the controller 11 repeats the touch detection in the second detection mode.

As described above, the force applied from the detected object OBJ to the detection surface 101a causes a change in the capacitance between the signal lines SGL and the conductor 104 and a change in the capacitance between the gate lines GCL and the conductor 104 in the third detection mode. Based on the capacitance change, the display device 1D can detect the position of the detected object OBJ. The second driver 14B according to the present embodiment also supplies the guard signals Vgd to the first electrodes COMLA. As a result, the first electrodes COMLA serve as guard electrodes. With this configuration, the display device 1D can suppress the capacitance change caused by water adhering to the detection surface 101a. Consequently, the display device 1D can accurately perform touch detection even when water adheres to the detection surface 101a.

Fourth Embodiment

Figure 39:
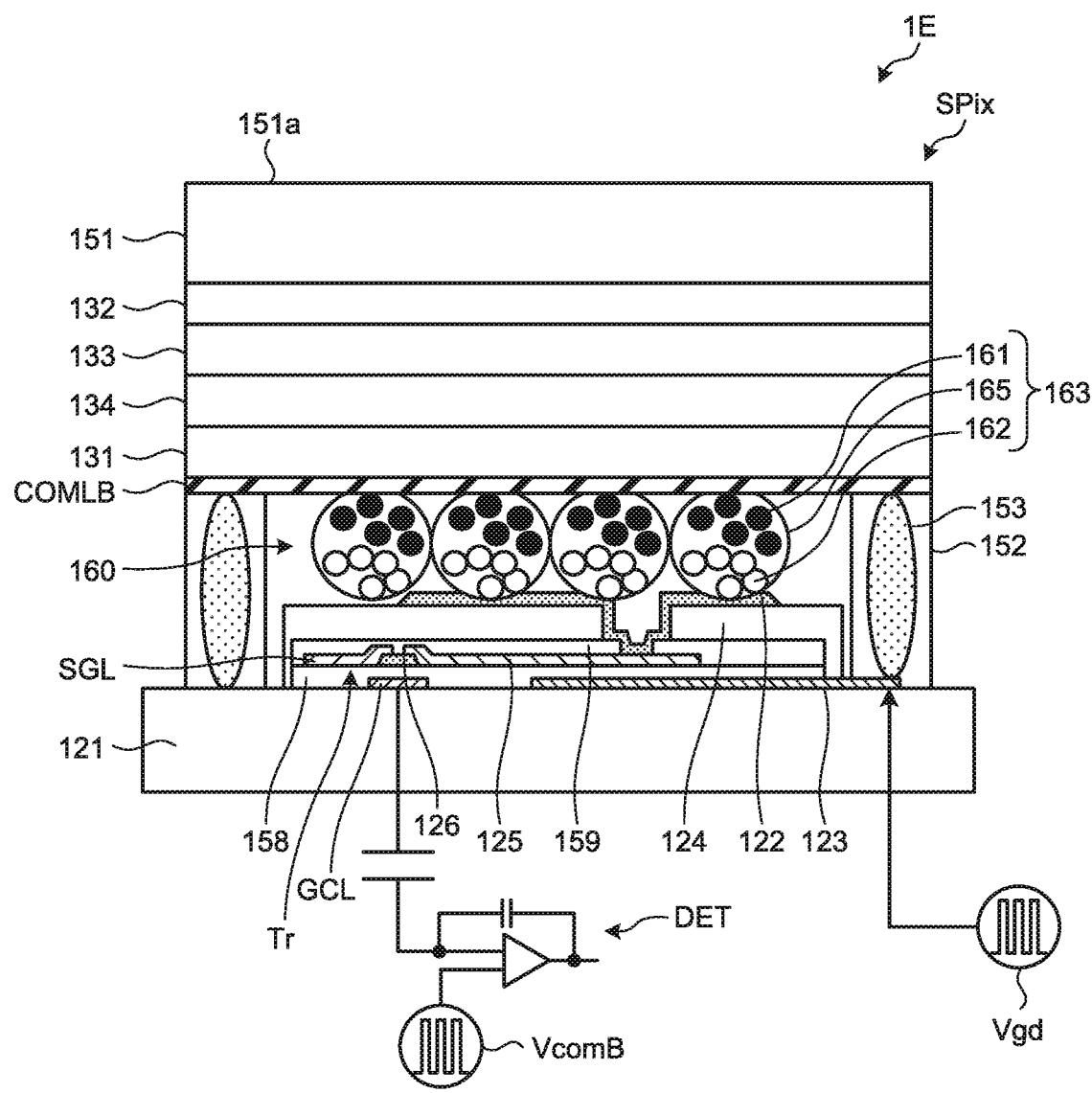
FIG. 39 is a sectional view of a schematic sectional structure of the display device according to a fourth embodiment.

FIG. 39 is a sectional view of a schematic sectional structure of the display device according to a fourth embodiment. As illustrated in FIG. 39, a display device 1E according to the present embodiment includes a first substrate 121, a second substrate 131, and an electrophoretic layer 160. The display device 1E according to the present embodiment is an electrophoretic display panel including the electrophoretic layer 160 serving as a display functional layer. FIG. 39 is an enlarged view of one sub-pixel SPix (refer to FIG. 10).

The second substrate 131 is disposed facing the first substrate 121. A sealing portion 152 is provided between the second substrate 131 and the first substrate 121. The electrophoretic layer 160 is sealed in the space surrounded by the second substrate 131, the first substrate 121, and the sealing portion 152. The first substrate 121 is a translucent glass substrate or a translucent resin substrate. The second substrate 131 is a translucent resin film.

A third substrate 151 is provided above the second substrate 131. A color filter 132, an optical film 133, and a barrier film 134 are disposed in this order between the third substrate 151 and the second substrate 131. The third substrate 151 and the color filter 132 are not necessarily provided. In this case, the display device 1E performs monochromatic display.

The gate line GCL and a holding capacitance electrode 123 are provided to the first substrate 121. The signal line SGL, a semiconductor layer 126, and a drain electrode 125 are provided above the gate line GCL and the holding capacitance electrode 123 with an insulating layer 158 interposed therebetween. An insulating layer 159 and a planarization layer 124 are provided on or above the signal line SGL, the semiconductor layer 126, and the drain electrode 125. A pixel electrode 122 is provided on the planarization layer 124. The pixel electrode 122 is coupled to the drain electrode 125 via a through hole formed in the insulating layer 159 and the planarization layer 124.

Part of the signal line SGL is used as a source electrode, and the source electrode is coupled to the semiconductor layer 126. A portion of the gate line GCL positioned under the semiconductor layer 126 is used as a gate electrode. The switching element Tr includes the source electrode (signal line SGL), the drain electrode 125, the semiconductor layer 126, and the gate electrode (gate line GCL).

The holding capacitance electrode 123 is disposed under the drain electrode 125 with the insulating layer 158 interposed therebetween. Capacitance is generated between the holding capacitance electrode 123 and the drain electrode 125.

A first electrode COMLB is provided to the surface of the second substrate 131 facing the first substrate 121. The first electrode COMLB is disposed facing the pixel electrode 122. The electrophoretic layer 160 is provided between the first electrode COMLB and the pixel electrode 122.

The electrophoretic layer 160 includes a plurality of microcapsules 163. The microcapsules 163 each include a plurality of black fine particles 161, a plurality of white fine particles 162, and a dispersion 165. The black fine particles 161 and the white fine particles 162 are dispersed in the dispersion 165.

The dispersion 165 is a translucent liquid, such as silicon oil. The black fine particles 161 are electrophoretic particles and are negatively charged graphite, for example. The white fine particles 162 are electrophoretic particles and are positively charged titanium oxide ($TiO_2$), for example.

An electric field generated between the pixel electrode 122 and the first electrode COMLB changes the dispersion state of the black fine particles 161 and the white fine particles 162. The transmission state of light passing through the electrophoretic layer 160 changes depending on the dispersion state of the black fine particles 161 and the white fine particles 162. As a result, an image is displayed on the display surface. When a positive potential is applied to the first electrode COMLB, and a negative potential is applied to the pixel electrode 122, for example, the black fine particles 161 move toward the second substrate 131, and the white fine particles 162 move toward the first substrate 121. In this case, the sub-pixel SPix displays black.

In the display operation, the pixel electrode 122 according to the present embodiment is supplied with a pixel signal via the signal line SGL and the switching element Tr. The first electrode COMLB is electrically coupled to the holding capacitance electrode 123 of the first substrate 121 via a coupling member 153 provided to the sealing portion 152. The first driver 14A supplies the display drive signal Vcomdc to the first electrode COMLB via the holding capacitance electrode 123. As a result, an electric field is generated between the pixel electrode 122 and the first electrode COMLB.

Similarly to the first embodiment, a plurality of sub-pixels SPix are arrayed in a matrix (row-column configuration) (refer to FIG. 10). The signal lines SGL and the gate lines GCL are coupled to the switching elements Tr provided corresponding to the respective sub-pixels SPix.

The display device 1E according to the present embodiment can also perform touch detection in the third detection mode with the signal lines SGL and the gate lines GCL. In other words, the second driver 14B supplies the drive signals VcomA to the signal lines SGL and supplies the drive signals VcomB to the gate lines GCL. The signal lines SGL and the gate lines GCL output the sensor output signals based on a change in the capacitance between the signal lines SGL and the conductor 104 and a change in the capacitance between the gate lines GCL and the conductor 104 to the voltage detectors DET. The display device 1E can thus detect the detected object OBJ in contact with a detection surface 151a.

The second driver 14B supplies the guard signals Vgd to the first electrodes COMLB at a timing when it supplies the drive signals VcomA and VcomB. As a result, the first electrodes COMLB serve as guard signals. With this configuration, the display device 1E suppresses, even when water adheres to the detection surface 151a, a capacitance change in the signal lines SGL and the gate lines GCL caused by the water. Consequently, the display device 1E can accurately perform touch detection even when water adheres to the detection surface 151a.

While exemplary embodiments according to the present invention have been described, the embodiments are not intended to limit the invention. The contents disclosed in the embodiments are given by way of example only, and various modifications may be made without departing from the spirit of the invention. Appropriate modifications made without departing from the spirit of the invention naturally fall within the technical scope of the invention.

The display apparatus according to the present aspect may have the following aspects, for example.

(1) A display device comprising:
 a substrate;
 a plurality of pixel electrodes arrayed in a display region of the substrate;
 first electrodes separated from the pixel electrodes in a direction perpendicular to the substrate;
 gate lines disposed between the substrate and the first electrodes in the direction perpendicular to the substrate and extending in a plane parallel to a surface of the substrate;
 signal lines intersecting the gate lines in planar view;
 switching elements provided at intersections of the gate lines and the signal lines;
 a conductor provided opposite to the gate lines and the signal lines across the substrate in the direction perpendicular to the substrate; and
 a driver configured to supply a first drive signal to at least one of the gate lines and the signal lines and supply a guard signal synchronized with the first drive signal to the first electrodes.

(2) The display device according to (1), wherein the driver supplies the first drive signal to the gate lines and the signal lines simultaneously.

(3) The display device according to (1), wherein at least one of the gate lines and the signal lines output, to a detector, a detection signal based on a capacitance change caused by a change in a space between the conductor and at least one of the gate lines and the signal lines.

(4) The display device according to (1), wherein
 the driver supplies a second drive signal to the first electrodes, and
 the first electrodes output a detection signal based on a capacitance change in the first electrodes to the detector.

(5) The display device according to (1), further comprising:
 second electrodes disposed opposite to the gate lines and the signal lines across the first electrodes in the direction perpendicular to the substrate, wherein
 the second electrodes generate capacitance between the first electrodes and the second electrodes.

(6) The display device according to (5), wherein
 the driver supplies a third drive signal to the second electrodes, and
 the second electrodes output a detection signal based on a capacitance change in the second electrodes to the detector.

(7) The display device according to (6), wherein the driver supplies the third drive signal to the second electrodes in a detection period in which the driver supplies the first drive signal to at least one of the gate lines and the signal lines.

(8) The display device according to (5), wherein
 the driver supplies a fourth drive signal to the first electrodes, and
 the second electrodes output a detection signal based on a capacitance change between the first electrodes and the second electrodes to the detector.

(9) The display device according to (1), wherein
 the first electrodes are arrayed in a first direction and extend in a second direction intersecting the first direction,
 the signal lines extend along a longitudinal direction of the first electrodes,
 the driver supplies the guard signal to the first electrodes coupled to a first output terminal, and
 the driver supplies the first drive signal to the signal lines coupled to a second output terminal different from the first output terminal.

(10) The display device according to (9), further comprising:
 a scanner configured to select the first electrodes, the signal lines, or the gate lines, wherein
 the scanner includes a first switch configured to couple ends of the signal lines on the same side, a second switch configured to couple ends of the first electrodes on the same side, and a third switch configured to couple the signal lines coupled to each other by the first switch to the driver.

(11) The display device according to (10), wherein
 the second switch couples the first electrodes to the first output terminal and the second output terminal, and
 the first switch and the third switch cut off coupling of the signal lines to the driver.

(12) The display device according to (1), wherein
 the first electrodes extend in a first direction and are arrayed in a second direction intersecting the first direction,
 the gate lines extend along a longitudinal direction of the first electrodes, the driver supplies the guard signal to the first electrodes coupled to a first output terminal, and the driver supplies the first drive signal to the gate lines coupled to a second output terminal different from the first output terminal.

(13) The display device according to (12), further comprising:

a scanner configured to select the first electrodes, the signal lines, or the gate lines, wherein the scanner includes a first switch configured to couple ends of the gate lines on the same side and a second switch configured to couple ends of the first electrodes on the same side.

(14) The display device according to (1), further comprising:

a controller configured to control an operation of the first electrodes, the gate lines, and the signal lines;

a control signal generator configured to generate a control signal for controlling the operation of the gate lines and the signal lines; and a scanner configured to select the first electrodes, the signal lines, or the gate lines, wherein the scanner includes shift registers provided corresponding to the respective first electrodes and a shift register provided corresponding to the control signal generator.

(15) The display device according to (1), wherein the first electrodes are disposed in a matrix configuration in the display region.

(16) The display device according to (1), further comprising:

a housing configured to accommodate the substrate, wherein the housing includes the conductor.

(17) The display device according to (1), further comprising:

a controller configured to control an operation of the first electrodes, the gate lines, and the signal lines, wherein the controller detects a position of a detected object based on a capacitance change between the conductor and at least one of the gate lines and the signal lines when the controller determines that water adheres to a detection surface based on a detection signal that is based on a capacitance change in the first electrodes.

(18) A display device comprising:

a substrate;

a plurality of pixel electrodes arrayed in a display region of the substrate;

first electrodes separated from the pixel electrodes in a direction perpendicular to the substrate;

gate lines disposed between the substrate and the first electrodes in the direction perpendicular to the substrate and extending in a plane parallel to a surface of the substrate;

signal lines intersecting the gate lines in planar view;

switching elements provided at intersections of the gate lines and the signal lines;

second electrodes disposed opposite to the gate lines and the signal lines across the first electrodes in the direction perpendicular to the substrate;

a conductor provided opposite to the gate lines and the signal lines across the substrate in the direction perpendicular to the substrate;

a driver configured to supply a first drive signal to at least one of the gate lines and the signal lines and supply a guard signal synchronized with the first drive signal to the first electrodes; and a controller configured to control an operation of the first electrodes, the second electrodes, the gate lines, and the signal lines.

(19) The display device according to (18), wherein the controller has a first detection mode by a mutual capacitance method for detecting a detected object based on a capacitance change between the first electrodes and the second electrodes, a second detection mode by a self-capacitance method for detecting the detected object based on a capacitance change in the first electrodes or a capacitance change in the second electrodes, and a third detection mode by a self-capacitance method for detecting the detected object based on a capacitance change in the signal lines or a capacitance change in the gate lines, and the controller detects a position of the detected object by the third detection mode when the controller performs the first detection mode and the second detection mode and determines that water adheres to a detection surface.

What is claimed is:

1. A display device comprising:

a substrate;

a plurality of pixel electrodes arrayed in a display region of the substrate;

first electrodes separated from the pixel electrodes in a direction perpendicular to the substrate;

gate lines disposed between the substrate and the first electrodes in the direction perpendicular to the substrate and extending in a plane parallel to a surface of the substrate;

signal lines intersecting the gate lines in planar view;

switching elements provided at intersections of the gate lines and the signal lines;

a conductor provided opposite to the gate lines and the signal lines across the substrate in the direction perpendicular to the substrate;

a driver configured to supply a first drive signal to at least one of the gate lines and the signal lines and supply a guard signal synchronized with the first drive signal to the first electrodes; and a scanner configured to select the first electrodes, the signal lines, or the gate lines, wherein the first electrodes are arrayed in a first direction and extend in a second direction intersecting the first direction, the signal lines extend along a longitudinal direction of the first electrodes, the driver supplies the guard signal to the first electrodes coupled to a first output terminal, and the driver supplies the first drive signal to the signal lines coupled to a second output terminal different from the first output terminal, the scanner includes a first switch configured to couple ends of the signal lines on the same side, a second switch configured to couple ends of the first electrodes on the same side, and a third switch configured to couple the signal lines coupled to each other by the first switch to the driver.

2. The display device according to claim 1, wherein the driver supplies the first drive signal to the gate lines and the signal lines simultaneously.

3. The display device according to claim 1, wherein at least one of the gate lines and the signal lines output, to a detector, a detection signal based on a capacitance change caused by a change in a space between the conductor and at least one of the gate lines and the signal lines.

4. The display device according to claim 1, wherein the driver supplies a second drive signal to the first electrodes, and the first electrodes output a detection signal based on a capacitance change in the first electrodes to the detector.

5. The display device according to claim 1, further comprising:
second electrodes disposed opposite to the gate lines and the signal lines across the first electrodes in the direction perpendicular to the substrate, wherein
the second electrodes generate capacitance between the first electrodes and the second electrodes.

6. The display device according to claim 5, wherein
the driver supplies a third drive signal to the second electrodes, and
the second electrodes output a detection signal based on a capacitance change in the second electrodes to the detector.

7. The display device according to claim 6, wherein the driver supplies the third drive signal to the second electrodes in a detection period in which the driver supplies the first drive signal to at least one of the gate lines and the signal lines.

8. The display device according to claim 5, wherein
the driver supplies a fourth drive signal to the first electrodes, and
the second electrodes output a detection signal based on a capacitance change between the first electrodes and the second electrodes to the detector.

9. The display device according to claim 1, wherein
the second switch couples the first electrodes to the first output terminal and the second output terminal, and
the first switch and the third switch cut off coupling of the signal lines to the driver.

10. A display device comprising:
a substrate;
a plurality of pixel electrodes arrayed in a display region of the substrate;
first electrodes separated from the pixel electrodes in a direction perpendicular to the substrate;
gate lines disposed between the substrate and the first electrodes in the direction perpendicular to the substrate and extending in a plane parallel to a surface of the substrate;
signal lines intersecting the gate lines in planar view;
switching elements provided at intersections of the gate lines and the signal lines;
a conductor provided opposite to the gate lines and the signal lines across the substrate in the direction perpendicular to the substrate;
a driver configured to supply a first drive signal to at least one of the gate lines and the signal lines and supply a guard signal synchronized with the first drive signal to the first electrodes; and
a scanner configured to select the first electrodes, the signal lines, or the gate lines, wherein
the first electrodes extend in a first direction and are arrayed in a second direction intersecting the first direction,
the gate lines extend along a longitudinal direction of the first electrodes,
the driver supplies the guard signal to the first electrodes coupled to a first output terminal,
the driver supplies the first drive signal to the gate lines coupled to a second output terminal different from the first output terminal, and
the scanner includes a first switch configured to couple ends of the gate lines on the same side and a second switch configured to couple ends of the first electrodes on the same side.

11. The display device according to claim 1, further comprising:
a controller configured to control an operation of the first electrodes, the gate lines, and the signal lines; and
a control signal generator configured to generate a control signal for controlling the operation of the gate lines and the signal lines, wherein
the scanner includes shift registers provided corresponding to the respective first electrodes and a shift register provided corresponding to the control signal generator.

12. The display device according to claim 1, wherein the first electrodes are disposed in a matrix configuration in the display region.

13. The display device according to claim 1, further comprising:
a housing configured to accommodate the substrate, wherein
the housing includes the conductor.

14. A display device comprising:
a substrate;
a plurality of pixel electrodes arrayed in a display region of the substrate;
first electrodes separated from the pixel electrodes in a direction perpendicular to the substrate;
gate lines disposed between the substrate and the first electrodes in the direction perpendicular to the substrate and extending in a plane parallel to a surface of the substrate;
signal lines intersecting the gate lines in planar view;
switching elements provided at intersections of the gate lines and the signal lines;
a conductor provided opposite to the gate lines and the signal lines across the substrate in the direction perpendicular to the substrate;
a driver configured to supply a first drive signal to at least one of the gate lines and the signal lines and supply a guard signal synchronized with the first drive signal to the first electrodes; and
a controller configured to control an operation of the first electrodes, the gate lines, and the signal lines, wherein
the controller detects a position of a detected object based on a capacitance change between the conductor and at least one of the gate lines and the signal lines when the controller determines that water adheres to a detection surface based on a detection signal that is based on a capacitance change in the first electrodes.

15. A display device comprising:
a substrate;
a plurality of pixel electrodes arrayed in a display region of the substrate;
first electrodes separated from the pixel electrodes in a direction perpendicular to the substrate;
gate lines disposed between the substrate and the first electrodes in the direction perpendicular to the substrate and extending in a plane parallel to a surface of the substrate;
signal lines intersecting the gate lines in planar view;
switching elements provided at intersections of the gate lines and the signal lines;
second electrodes disposed opposite to the gate lines and the signal lines across the first electrodes in the direction perpendicular to the substrate;

a conductor provided opposite to the gate lines and the signal lines across the substrate in the direction perpendicular to the substrate;

a driver configured to supply a first drive signal to at least one of the gate lines and the signal lines and supply a guard signal synchronized with the first drive signal to the first electrodes; and a controller configured to control an operation of the first electrodes, the second electrodes, the gate lines, and the signal lines, wherein the controller has a first detection mode by a mutual capacitance method for detecting a detected object based on a capacitance change between the first electrodes and the second electrodes, a second detection mode by a self-capacitance method for detecting the detected object based on a capacitance change in the first electrodes or a capacitance change in the second electrodes, and a third detection mode by a self-capacitance method for detecting the detected object based on a capacitance change in the signal lines or a capacitance change in the gate lines, and the controller detects a position of the detected object by the third detection mode when the controller performs the first detection mode and the second detection mode and determines that water adheres to a detection surface.

* * * * *